United States Patent
Okazaki et al.

(10) Patent No.: US 9,903,298 B2
(45) Date of Patent: Feb. 27, 2018

(54) INTERNAL COMBUSTION ENGINE

(71) Applicant: TOYOTA JIDOSHA KABUSHIKI KAISHA, Toyota-shi, Aichi-ken (JP)

(72) Inventors: Shuntaro Okazaki, Shizuoka (JP); Norihisa Nakagawa, Susono (JP); Yuji Yamaguchi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/404,720

(22) Filed: Jan. 12, 2017

(65) Prior Publication Data

US 2017/0218874 A1 Aug. 3, 2017

Related U.S. Application Data

(63) Continuation of application No. 15/110,597, filed as application No. PCT/JP2015/050406 on Jan. 8, 2015.

(30) Foreign Application Priority Data

Jan. 10, 2014 (JP) .................................. 2014-003250

(51) Int. Cl.
  *F02D 41/00* (2006.01)
  *F02D 41/24* (2006.01)
  (Continued)

(52) U.S. Cl.
  CPC ....... *F02D 41/2454* (2013.01); *F01N 3/0864* (2013.01); *F01N 3/20* (2013.01);
  (Continued)

(58) Field of Classification Search
  CPC ............. F02D 41/2453; F02D 41/0295; F02D 41/1441; F02D 41/1454; F02D 41/2477; F01N 3/0864
  See application file for complete search history.

(56) References Cited

U.S. PATENT DOCUMENTS

| 4,964,272 A | 10/1990 | Kayanuma |
| 5,052,177 A | 10/1991 | Nada |

(Continued)

FOREIGN PATENT DOCUMENTS

| JP | H04-231636 A | 8/1992 |
| JP | H8-232723 A | 9/1996 |
| JP | 2001-234787 A | 8/2001 |
| JP | 2002-364427 A | 12/2002 |
| JP | 2008-274795 A | 11/2008 |
| JP | 2009-036024 A | 2/2009 |
| JP | 2009-162139 A | 7/2009 |

(Continued)

*Primary Examiner* — Thomas Moulis
(74) *Attorney, Agent, or Firm* — Andrews Kurth Kenyon LLP

(57) ABSTRACT

The internal combustion engine comprises an exhaust purification catalyst able to store oxygen, and a downstream side air-fuel ratio sensor arranged at a downstream side of the exhaust purification catalyst in a direction of exhaust flow. The control system performs feedback control of an amount of fuel fed to a combustion chamber of the internal combustion engine so that an air-fuel ratio of exhaust gas flowing into the exhaust purification catalyst becomes a target air-fuel ratio and performs learning control to correct a parameter relating to the feedback control based on an air-fuel ratio of exhaust gas detected by the downstream side air-fuel ratio sensor. The target air-fuel ratio is alternately switched between a rich set air-fuel ratio and a lean set air-fuel ratio leaner. When a condition for learning acceleration, which is satisfied when it is necessary to accelerate correction of the parameter by the learning control, is satisfied, a rich degree of the rich set air-fuel ratio is increased. Therefore, there is provided an internal combustion engine able to suitably change the speed of updating the learning value.

19 Claims, 22 Drawing Sheets

(51) Int. Cl.
- *F02D 41/14* (2006.01)
- *F01N 3/08* (2006.01)
- *F01N 11/00* (2006.01)
- *F01N 3/20* (2006.01)
- *F01N 9/00* (2006.01)
- *F02D 41/02* (2006.01)
- *F02D 41/26* (2006.01)
- *F01N 13/00* (2010.01)

(52) U.S. Cl.
CPC .............. *F01N 9/00* (2013.01); *F01N 11/007* (2013.01); *F01N 13/008* (2013.01); *F02D 41/0295* (2013.01); *F02D 41/1441* (2013.01); *F02D 41/1454* (2013.01); *F02D 41/2441* (2013.01); *F02D 41/2477* (2013.01); *F02D 41/26* (2013.01); *F01N 2570/16* (2013.01); *F01N 2900/1624* (2013.01); *F02D 41/1474* (2013.01); *F02D 2200/0814* (2013.01); *Y02T 10/20* (2013.01); *Y02T 10/47* (2013.01)

(56) References Cited

U.S. PATENT DOCUMENTS

| | | | |
|---|---|---|---|
| 5,265,581 A * | 11/1993 | Nagaishi | F02D 41/2454 123/675 |
| 5,271,374 A * | 12/1993 | Nagaishi | F02D 41/2441 123/675 |
| 5,758,490 A | 6/1998 | Maki et al. | |
| 2002/0040577 A1 | 4/2002 | Kamoto et al. | |
| 2009/0037078 A1* | 2/2009 | Takagawa | F02D 41/2448 701/103 |
| 2013/0073181 A1 | 3/2013 | Mamada | |
| 2016/0061084 A1 | 3/2016 | Okazaki et al. | |
| 2016/0265465 A1* | 9/2016 | Yamaguchi | F02D 41/2461 |
| 2017/0218868 A1* | 8/2017 | Okazaki | F02D 41/0082 |

FOREIGN PATENT DOCUMENTS

| | | |
|---|---|---|
| JP | 2011-069337 A | 4/2011 |
| JP | 2012-017694 A | 1/2012 |
| JP | 2013-060927 A | 4/2013 |
| WO | 2014/118892 A1 | 8/2014 |

* cited by examiner

INTERNAL COMBUSTION ENGINE

This is a continuation of U.S. patent application Ser. No. 15/110,597, filed on Jul. 8, 2016, which is a national phase application based on the PCT International Patent Application No. PCT/JP2015/050406 filed Jan. 8, 2015, claiming priority to Japanese Patent Application No. 2014-003250 filed Jan. 10, 2014, the entire contents of which are incorporated herein by reference.

TECHNICAL FIELD

The present invention relates to a control system of an internal combustion engine.

BACKGROUND ART

In the past, a control system of an internal combustion engine which provides an air-fuel ratio sensor in an exhaust passage of the internal combustion engine and controls the amount of fuel fed to the internal combustion engine based on the output of this air-fuel ratio sensor has been widely known. As such a control system, one which provides an air-fuel ratio sensor at an upstream side of the exhaust purification catalyst provided in the exhaust passage of the engine and provides an oxygen sensor at the downstream side has been known (for example, PLTs 1 to 4 etc.)

For example, in the system described in PLT 1, feedback control is performed based on the output of the upstream side air-fuel ratio sensor so that the air-fuel ratio of the exhaust gas flowing into the exhaust purification catalyst becomes a stoichiometric air-fuel ratio. In addition, deviation can occur in the output of the upstream side air-fuel ratio sensor, so the output of the upstream side air-fuel ratio sensor is corrected based on the output of the downstream side oxygen sensor. Furthermore, this system obtains the amount of correction of the output of the upstream side air-fuel ratio sensor based on the output of the downstream side oxygen sensor at certain time intervals at a certain ratio as a learning value to thereby update the learning value and uses this learning value for correction of the output of the upstream side air-fuel ratio sensor.

In addition, the system described in PLT 1 shortens the time interval of obtaining the learning value and increases the ratio of obtaining the learning value when a mechanical compression ratio set by a variable compression ratio mechanism is high so as to increase the speed of obtaining the learning value. Due to this, according to the system described in PLT 1, even when the mechanical compression ratio is high and therefore the ratio of the unburned HC contained in the exhaust gas is high, it is considered possible to quickly determine the learning value.

CITATION LIST

Patent Literature

PLT 1. Japanese Patent Publication No. 2012-017694A
PLT 2. Japanese Patent Publication No. 2013-060927A
PLT 3. Japanese Patent Publication No. 2008-274795A
PLT 4. Japanese Patent Publication No. 2002-364427A
PLT 5. Japanese Patent Publication No. 2009-036024A
PLT 6. Japanese Patent Publication No. 4-231636A

SUMMARY OF INVENTION

Technical Problem

In this regard, according to the inventors of the present application etc., a control system performing control different from the control system described in the above-mentioned PLT 1 has been proposed. In this control system, when an air-fuel ratio detected by a downstream side air-fuel ratio sensor becomes a rich judged air-fuel ratio (an air-fuel ratio slightly richer than the stoichiometric air-fuel ratio) or less, a target air-fuel ratio is set to an air-fuel ratio leaner than the stoichiometric air-fuel ratio (below, referred to as a "lean air-fuel ratio"). On the other hand, while the target air-fuel ratio is made a lean air-fuel ratio, when an oxygen storage amount of the exhaust purification catalyst becomes a switching reference storage amount or more, the target air-fuel ratio is set to an air-fuel ratio richer than the stoichiometric air-fuel ratio (below, referred to as a "rich air-fuel ratio"). Here, the switching reference storage amount is made an amount smaller than a maximum storable oxygen amount in the new product state.

If control by such a control system is performed, the target air-fuel ratio is switched from the lean air-fuel ratio to the rich air-fuel ratio before the oxygen storage amount of the exhaust purification catalyst reaches the maximum storable oxygen amount. Therefore, according to such control, exhaust gas of a lean air-fuel ratio will almost never flow out from the exhaust purification catalyst and, as a result, outflow of $NO_x$ from the exhaust purification catalyst can be suppressed.

When performing control in this way to alternately switch the target air-fuel ratio between the rich air-fuel ratio and lean air-fuel ratio, it is not possible to update the learning value by a technique similar to the case of performing control so that the target air-fuel ratio becomes the stoichiometric air-fuel ratio or other certain air-fuel ratio. In the same way, when performing such control, it is not possible to change the speed of updating the learning value by a technique similar to the case of performing control so that the target air-fuel ratio becomes a certain air-fuel ratio.

For this reason, when performing control to alternately switch the target air-fuel ratio between the rich air-fuel ratio and lean air-fuel ratio, it is necessary to study a new method of changing the speed of updating the learning value. Note that, even when performing control to alternately switch the target air-fuel ratio between the rich air-fuel ratio and lean air-fuel ratio, as the method of changing the speed of updating the learning value, the ratio of obtaining the learning value can be changed. However, when using such a method to change the speed of updating the learning value, in some cases, the learning value ends up being excessively obtained and as a result determination of the learning value sometimes ends up being delayed.

Therefore, in view of this problem, an object of the present invention is to provide an internal combustion engine able to suitably change the speed of updating the learning value even when performing control to alternately switch the target air-fuel ratio between the rich air-fuel ratio and lean air-fuel ratio.

Solution to Problem

In order to solve the above problem, in a first invention, there is provided a control system of an internal combustion engine comprising an exhaust purification catalyst arranged in an exhaust passage of the internal combustion engine and able to store oxygen, and a downstream side air-fuel ratio sensor arranged at a downstream side of the exhaust purification catalyst in a direction of exhaust flow and detecting an air-fuel ratio of exhaust gas flowing out from the exhaust purification catalyst, wherein the control system performs feedback control of an amount of fuel fed to a combustion chamber of the internal combustion engine so that an air-fuel ratio of exhaust gas flowing into the exhaust purification catalyst becomes a target air-fuel ratio and performs learning control to correct a parameter relating to the feedback control based on an air-fuel ratio of exhaust gas detected by the downstream side air-fuel ratio sensor, the target air-fuel ratio is alternately switched between a rich set air-fuel ratio richer than a stoichiometric air-fuel ratio and a lean set air-fuel ratio leaner than the stoichiometric air-fuel ratio, and when a condition for learning acceleration, which is satisfied when it is necessary to accelerate correction of the parameter by the learning control, is satisfied, a rich degree of the rich set air-fuel ratio is increased.

In a second invention, the target air-fuel ratio is switched to the lean set air-fuel ratio when an air-fuel ratio detected by the downstream side air-fuel ratio sensor becomes a rich judged air-fuel ratio or less and is switched to the rich set air-fuel ratio when an oxygen storage amount of the exhaust purification catalyst becomes a predetermined switching reference storage amount smaller than a maximum storable oxygen amount or becomes more, and when the condition of learning acceleration is satisfied, the switching reference storage amount is decreased in the first invention.

In order to solve the above problem, in a third invention, there is provided a control system of an internal combustion engine comprising an exhaust purification catalyst arranged in an exhaust passage of the internal combustion engine and able to store oxygen, and a downstream side air-fuel ratio sensor arranged at a downstream side of the exhaust purification catalyst in a direction of exhaust flow and detecting an air-fuel ratio of exhaust gas flowing out from the exhaust purification catalyst, wherein the control system performs feedback control of an amount of fuel fed to a combustion chamber of the internal combustion engine so that an air-fuel ratio of exhaust gas flowing into the exhaust purification catalyst becomes a target air-fuel ratio and performs learning control to correct a parameter relating to the feedback control based on an air-fuel ratio of exhaust gas detected by the downstream side air-fuel ratio sensor, the target air-fuel ratio is switched to a lean set air-fuel ratio leaner than a stoichiometric air-fuel ratio when an air-fuel ratio detected by the downstream side air-fuel ratio sensor becomes a rich judged air-fuel ratio or less and is switched to a rich set air-fuel ratio richer than the stoichiometric air-fuel ratio when an oxygen storage amount of the exhaust purification catalyst becomes a predetermined switching reference storage amount smaller than a maximum storable oxygen amount or becomes more, and when a condition for learning acceleration, which is satisfied when it is necessary to accelerate correction of the parameter by the learning control, is satisfied, the switching reference storage amount is decreased.

In a forth invention, when the condition for learning acceleration is satisfied, a lean degree of the lean set air-fuel ratio is increased in the second or third invention.

In a fifth invention, even when the condition for learning acceleration is satisfied, the lean set air-fuel ratio is maintained at its value as it is in the second or third invention.

In a sixth invention, in the learning control, based on a first oxygen cumulative value which is an absolute value of a cumulative oxygen excess/deficiency in a first time period from when switching the target air-fuel ratio to the lean set air-fuel ratio to when the oxygen storage amount of the exhaust purification catalyst becomes the switching reference amount or more, and a second oxygen cumulative value which is an absolute value of a cumulative oxygen excess/deficiency in a second time period from when switching the target air-fuel ratio to the rich set air-fuel ratio to when an air-fuel ratio detected by the downstream side air-fuel ratio sensor becomes the rich judged air-fuel ratio or less, a parameter relating to an air-fuel ratio is corrected so that a difference between these first oxygen cumulative value and second oxygen cumulative value becomes smaller in any one of the second to fifth inventions.

In a seventh invention, the condition for learning acceleration is satisfied if a difference between the first oxygen amount cumulative value and the second oxygen amount cumulative value is a predetermined accelerated judgment reference value or more in the sixth invention.

In an eighth invention, the condition for learning acceleration is satisfied if the target air-fuel ratio is made the rich set air-fuel ratio and the air-fuel ratio detected by the downstream side air-fuel ratio sensor is maintained in an air-fuel ratio region near the stoichiometric air-fuel ratio between a rich judged air-fuel ratio richer than the stoichiometric air-fuel ratio and a lean judged air-fuel ratio leaner than the stoichiometric air-fuel ratio over a predetermined stoichiometric air-fuel ratio accelerated judgment time or more in any one of the second to seventh inventions.

In a ninth invention, the condition for learning acceleration is satisfied if the target air-fuel ratio is made a rich air-fuel ratio and the air-fuel ratio detected by the downstream side air-fuel ratio sensor is maintained at an air-fuel ratio leaner than the lean judged air-fuel ratio over a lean air-fuel ratio maintenance judgment time shorter than the stoichiometric air-fuel ratio accelerated judgment time or over more in the eighth invention.

In a tenth invention, in the learning control, when the target air-fuel ratio is made the rich set air-fuel ratio, if the air-fuel ratio detected by the downstream side air-fuel ratio sensor is maintained in an air-fuel ratio region near the stoichiometric air-fuel ratio between a rich judged air-fuel ratio richer than the stoichiometric air-fuel ratio and a lean judged air-fuel ratio leaner than the stoichiometric air-fuel ratio over a predetermined stoichiometric air-fuel ratio maintenance judgment time or more, in the feedback control, the parameter relating to the air-fuel ratio is corrected so that the air-fuel ratio of the exhaust gas flowing into the exhaust purification catalyst changes to a rich side in any one of the second to ninth inventions.

In an eleventh invention, in the learning control, if an absolute value of a cumulative oxygen excess/deficiency from when switching the target air-fuel ratio to the rich set air-fuel ratio becomes a predetermined value or more larger than a first oxygen cumulative value which is an absolute value of a cumulative oxygen excess/deficiency in a first time period from when switching the target air-fuel ratio to the lean set air-fuel ratio to when the oxygen storage amount of the exhaust purification catalyst becomes the switching reference amount or more, in the feedback control, the parameter relating to the air-fuel ratio is corrected so that the air-fuel ratio of the exhaust gas flowing into the exhaust purification catalyst changes to a rich side in any one of the second to ninth inventions.

In a twelfth invention, the parameter relating to the air-fuel ratio is any one of the target air-fuel ratio, fuel feed amount, and control center air-fuel ratio in any one of the first to eleventh inventions.

In a thirteenth invention, the control system further comprises an upstream side air-fuel ratio sensor arranged at an upstream side of the exhaust purification catalyst in the direction of exhaust flow and detecting an air-fuel ratio of exhaust gas flowing into the exhaust purification catalyst and performs feedback control of an amount of fuel fed to a combustion chamber of the internal combustion engine so that the air-fuel ratio detected by the upstream side air-fuel ratio sensor becomes the target air-fuel ratio, and the parameter relating to the air-fuel ratio is an output value of the upstream side air-fuel ratio sensor in any one of the first to twelfth inventions.

Advantageous Effects of Invention

According to the present invention, there is provided an internal combustion engine able to suitably change the speed of updating the learning value even when performing control to alternately switch the target air-fuel ratio between the rich air-fuel ratio and lean air-fuel ratio.

DESCRIPTION OF EMBODIMENTS

Figure 1:
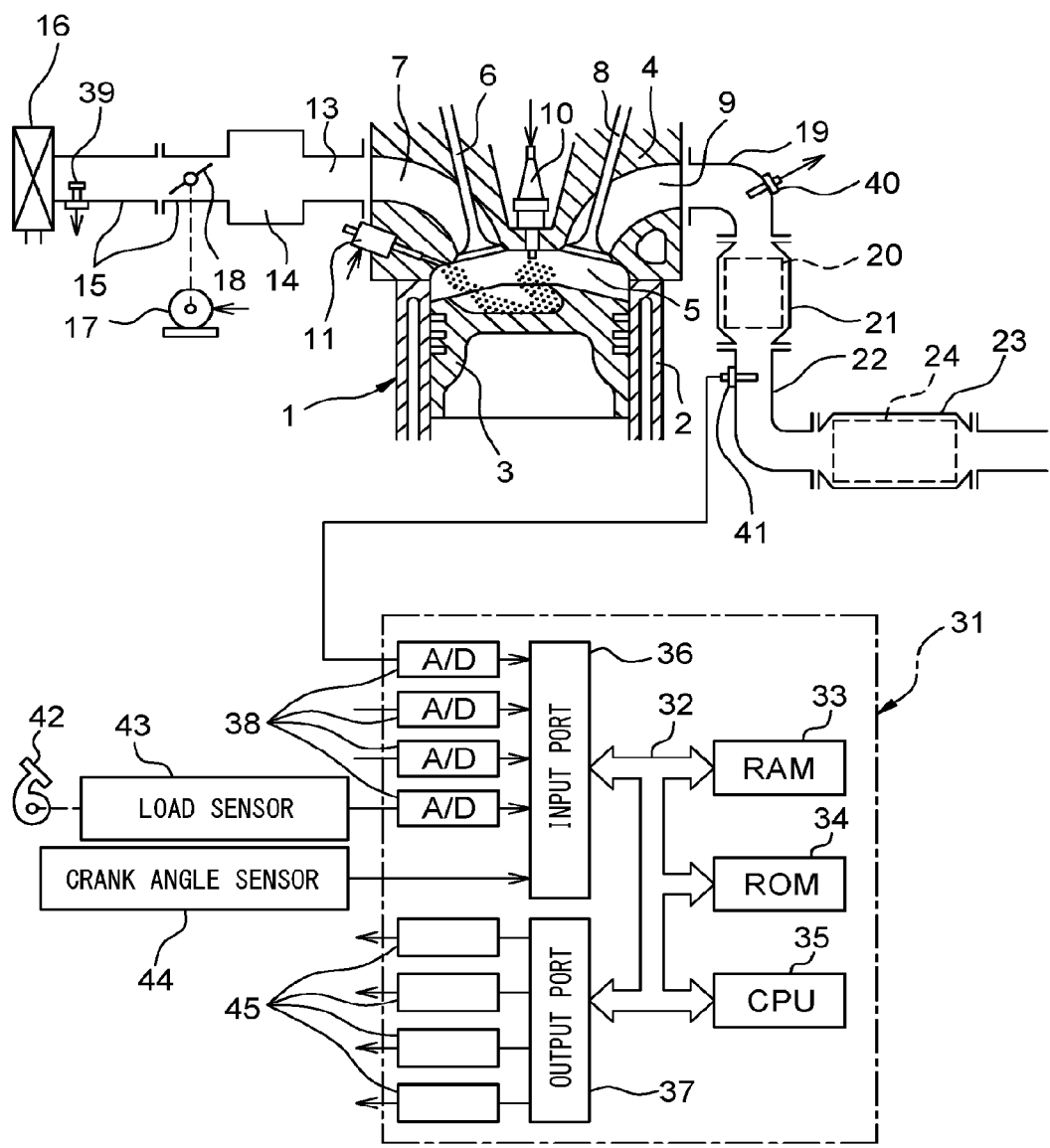
FIG. 1 is a view schematically showing an internal combustion engine in which a control system of the present invention is used.

Referring to the drawings, an embodiment of the present invention will be explained in detail below. Note that, in the following explanation, similar component elements are assigned the same reference numerals.

<Explanation of Internal Combustion Engine as a Whole>

FIG. 1 is a view which schematically shows an internal combustion engine wherein a control system according to the first embodiment of the present invention is used. In FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. Note that, the fuel injector 11 may be arranged so as to inject fuel inside the intake port 7. Further, in the present embodiment, as the fuel, gasoline with a stoichiometric air-fuel ratio of 14.6 is used. However, the internal combustion engine in the present embodiment may use the other fuel.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side exhaust purification catalyst 20 built into it. The upstream side casing 21 is connected through an exhaust pipe 22 to a downstream side casing 23 which has a downstream side exhaust purification catalyst 24 built into it. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor (an upstream side air-fuel ratio detection device) 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 (a downstream side air-fuel ratio detection device) is arranged which detects the air-fuel ratio of the exhaust gas flowing through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a control system for controlling the internal combustion engine.

Note that, although the internal combustion engine according to the present embodiment is a non-supercharged internal combustion engine using gasoline as a fuel, the construction of the internal combustion engine according to the present invention is not limited to the above construction. For example, an arrangement of cylinders, a method of injecting a fuel, constructions of intake and exhaust system, constructions of valve gears, presence or absence of a supercharger, a construction of a supercharge, etc. in the internal combustion engine according to the present invention may be different form the above internal combustion engine.

<Explanation of Exhaust Purification Catalyst>

The upstream side exhaust purification catalyst 20 and downstream side exhaust purification catalyst 24 have similar configurations. The exhaust purification catalysts 20 and 24 are three-way catalysts which have oxygen storage abilities. Specifically, the exhaust purification catalysts 20 and 24 are comprised of carriers which are comprised of ceramic on which a precious metal which has a catalytic action (for example, platinum (Pt)) and a substance which has an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_x$) when reaching a predetermined activation temperature and, in addition, an oxygen storage ability.

According to the oxygen storage ability of the exhaust purification catalysts 20 and 24, the exhaust purification catalysts 20 and 24 store the oxygen in the exhaust gas when the air-fuel ratio of the exhaust gas which flows into the exhaust purification catalysts 20 and 24 is leaner than the stoichiometric air-fuel ratio (lean air-fuel ratio). On the other hand, the exhaust purification catalysts 20 and 24 release the oxygen which is stored in the exhaust purification catalysts 20 and 24 when the inflowing exhaust gas has an air-fuel ratio which is richer than the stoichiometric air-fuel ratio (rich air-fuel ratio).

Figure 2A:
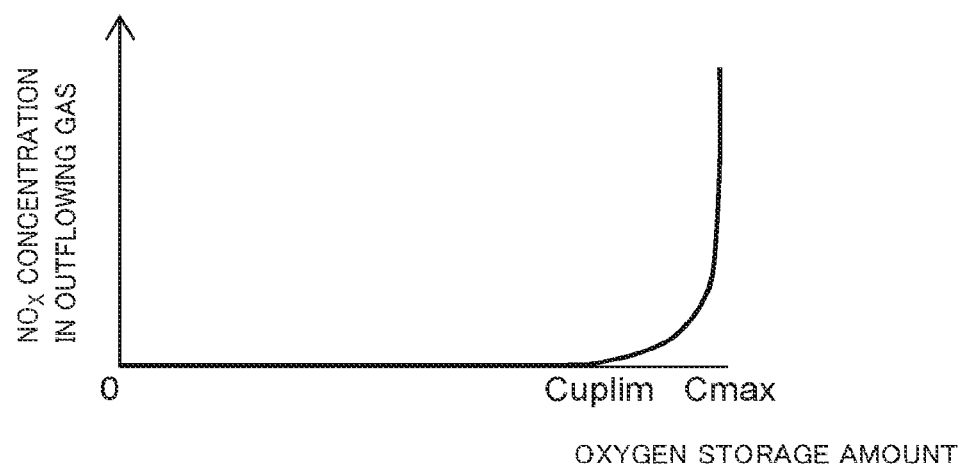
FIG. 2A and FIG. 2B are views showing a relationship between an oxygen storage amount of an exhaust purification catalyst and a concentration of $NO_x$ or concentration of HC and CO in exhaust gas flowing out from the exhaust purification catalyst.

The exhaust purification catalysts 20 and 24 have a catalytic action and oxygen storage ability and thereby have the action of removing $NO_x$ and unburned gas according to the stored amount of oxygen. That is, as shown in FIG. 2A, if the air-fuel ratio of the exhaust gas which flows into the exhaust purification catalysts 20 and 24 is a lean air-fuel ratio, when the stored amount of oxygen is small, the exhaust purification catalysts 20 and 24 store the oxygen in the exhaust gas. Further, along with this, the $NO_x$ in the exhaust gas is removed by reduction. On the other hand, if the stored amount of oxygen becomes larger, the exhaust gas which flows out from the exhaust purification catalysts 20 and 24 rapidly rises in concentration of oxygen and $NO_x$ at a certain stored amount near the maximum storable oxygen amount Cmax (in the figure, Cuplim).

Figure 2B:
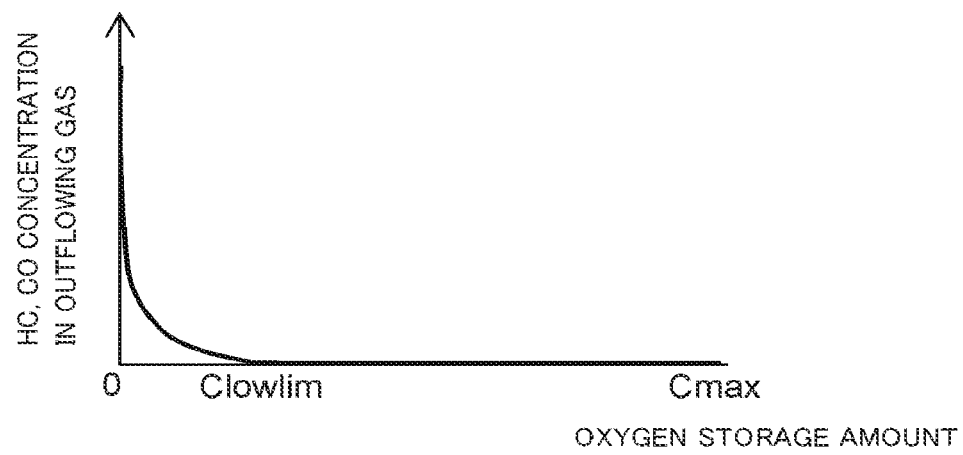

On the other hand, as shown in FIG. 2B, if the air-fuel ratio of the exhaust gas which flows into the exhaust purification catalysts 20 and 24 is the rich air-fuel ratio, when the stored amount of oxygen is large, the oxygen which is stored in the exhaust purification catalysts 20 and 24 is released, and the unburned gas in the exhaust gas is removed by oxidation. On the other hand, if the stored amount of oxygen becomes small, the exhaust gas which flows out from the exhaust purification catalysts 20 and 24 rapidly rises in concentration of unburned gas at a certain stored amount near zero (in the figure, Clowlim).

In the above way, according to the exhaust purification catalysts 20 and 24 which are used in the present embodiment, the characteristics of removal of $NO_x$ and unburned gas in the exhaust gas change depending on the air-fuel ratio of the exhaust gas which flows into the exhaust purification catalysts 20 and 24 and stored amount of oxygen. Note that, if having a catalytic action and oxygen storage ability, the exhaust purification catalysts 20 and 24 may also be catalysts different from the three-way catalyst.

<Output Characteristics of Air-Fuel Ratio Sensors>

Figure 3:
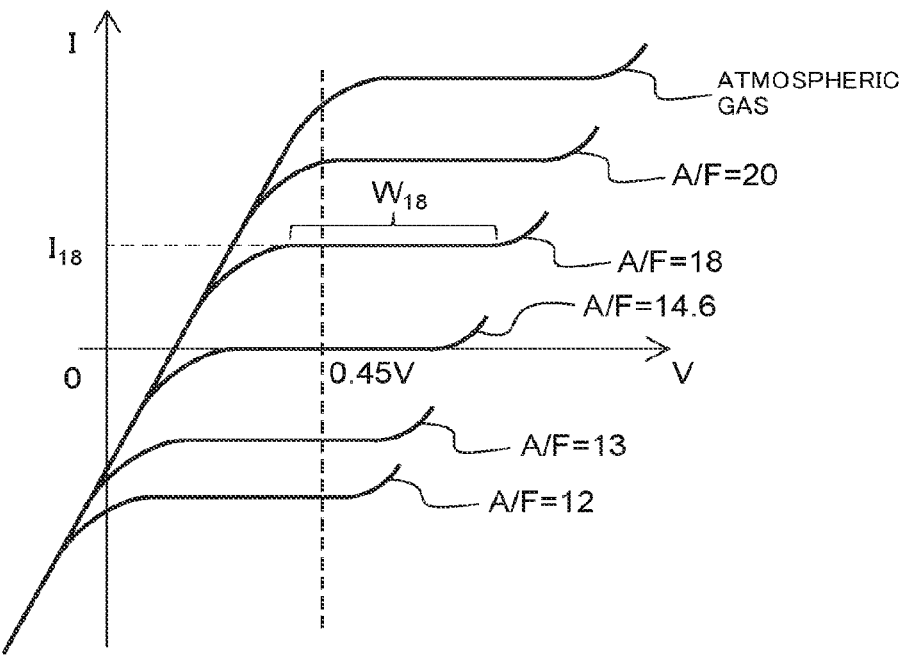
FIG. 3 is a view showing a relationship between a sensor applied voltage and output current at different exhaust air-fuel ratios.
Figure 4:
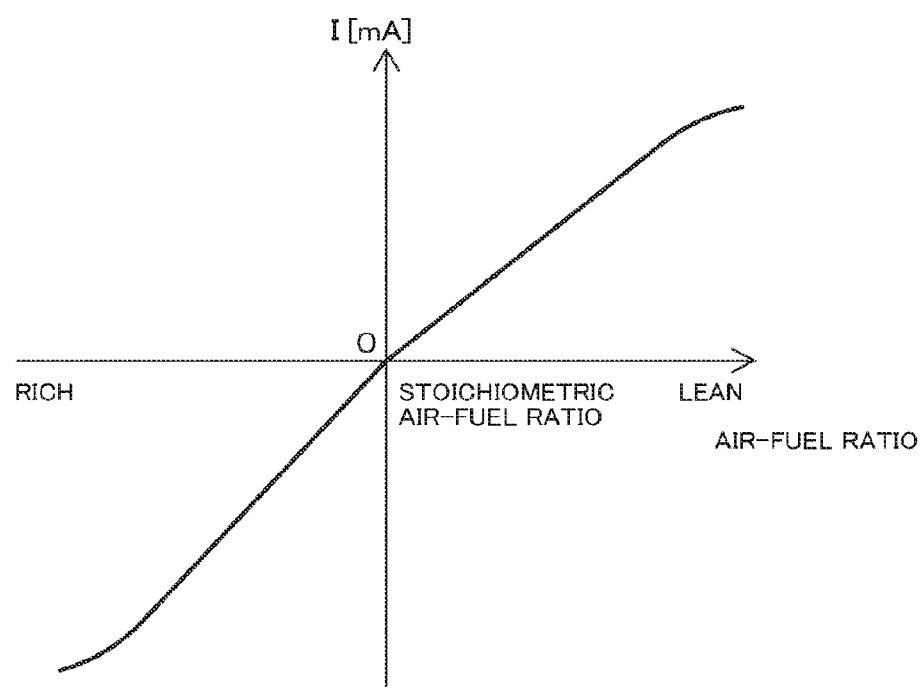
FIG. 4 is a view showing a relationship between an exhaust air-fuel ratio and output current when making a sensor applied voltage constant.

Next, referring to FIG. 3 and FIG. 4, the output characteristics of the air-fuel ratio sensors 40, 41 in the present embodiment will be explained. FIG. 3 is a view showing the voltage-current (V-I) characteristics of the air-fuel ratio sensors 40, 41 in the present embodiment, while FIG. 4 is a view showing the relationship between the air-fuel ratio of the exhaust gas circulating around the air-fuel ratio sensors 40, 41 (below, referred to as the "exhaust air-fuel ratio") and the output current I when maintaining the applied voltage constant. Note that, in the present embodiment, as the air-fuel ratio sensors 40, 41, the same configurations of air-fuel ratio sensors are used.

As will be understood from FIG. 3, in the air-fuel ratio sensors 40, 41 of the present embodiment, the output current I becomes larger the higher the exhaust air-fuel ratio (the leaner). Further, in the V-I line of each exhaust air-fuel ratio, there is a region substantially parallel to the V-axis, that is, a region where the output current does not change much at all even if the applied voltage changes. This voltage region is called the "limit current region". The current at this time is called the "limit current". In FIG. 3, the limit current region and the limit current when the exhaust air-fuel ratio is 18 are respectively shown by $W_{18}$ and $I_{18}$. Therefore, the air-fuel ratio sensors 40, 41 can be said to be limit current type air-fuel ratio sensors.

FIG. 4 is a view showing the relationship between the exhaust air-fuel ratio and the output current I when making the applied voltage 0.45V or so. As will be understood from FIG. 4, in the air-fuel ratio sensors 40, 41, the output current changes linearly (proportionally) with respect to the exhaust air-fuel ratio so that the higher the exhaust air-fuel ratio (that is, the leaner), the greater the output current I of the air-fuel ratio sensors 40, 41 becomes. In addition, the air-fuel ratio sensors 40, 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or less, the ratio of the change of the output current with respect to the change of the exhaust air-fuel ratio becomes smaller.

Note that, in the above example, as the air-fuel ratio sensors 40, 41, limit current type air-fuel ratio sensors are used. However, so long as the output current linearly changes with respect to the exhaust air-fuel ratio, as the air-fuel ratio sensors 40, 41, it is also possible to use any other air-fuel ratio sensors such as air-fuel ratio sensors not the limit current type. Further, the air-fuel ratio sensors 40, 41 may also be air-fuel ratio sensors of structures different from each other.

<Basic Air Fuel Ratio Control>

Next, an outline of the basic air-fuel ratio control in a control device of an internal combustion engine of the present embodiment will be explained. In an air-fuel control of the present embodiment, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio. Note that, the "output air-fuel ratio" means the air-fuel ratio which corresponds to the output value of the air-fuel ratio sensor.

On the other hand, in the present embodiment, control for setting the target air-fuel ratio is performed based on the output current of the downstream side air-fuel ratio sensor 41 etc. In the control for setting the target air-fuel ratio, when the output current of the downstream side air-fuel ratio sensor 41 becomes a rich air-fuel ratio, the target air-fuel ratio is made a lean set air-fuel ratio. After this, it is maintained at this air-fuel ratio. In this regard, the "lean set air-fuel ratio" is a predetermined air-fuel ratio which is leaner than the stoichiometric air-fuel ratio (air-fuel ratio serving as center of control) by a certain extent, and, for example, is 14.65 to 20, preferably 14.65 to 18, more preferably 14.65 to 16 or so. Further, the lean set air-fuel ratio can be expressed as an air-fuel ratio of the air-fuel ratio forming the center of control (in the present embodiment, stoichiometric air-fuel ratio) plus a lean correction amount. Further, in the present embodiment, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

If the target air-fuel ratio is changed to the lean set air-fuel ratio, the oxygen excess/deficiency of the exhaust gas flowing into the upstream side exhaust purification catalyst 20 is cumulatively added. The "oxygen excess/deficiency" means the amount of oxygen becoming in excess or the amount of oxygen becoming deficient (amount of excess unburned gas etc.) when trying to make the air-fuel ratio of the exhaust gas flowing into the upstream side exhaust purification catalyst 20 the stoichiometric air-fuel ratio. In particular, when the target air-fuel ratio becomes the lean set air-fuel ratio, the oxygen in the exhaust gas flowing into the upstream side exhaust purification catalyst 20 becomes excessive. This excess oxygen is stored in the upstream side exhaust purification catalyst 20. Therefore, the cumulative value of the oxygen excess/deficiency (below, referred to as the "cumulative oxygen excess/deficiency") can be said to express the oxygen storage amount OSA of the upstream side exhaust purification catalyst 20.

Note that, the oxygen excess/deficiency is calculated based on the output air-fuel ratio of the upstream side air-fuel ratio sensor 40 and the estimated value of the intake air amount to a combustion chamber 5 calculated based on the output of the air flowmeter 39, etc. or the amount of feed of fuel from a fuel injector 11 etc. Specifically, the oxygen excess/deficiency OED is, for example, calculated by the following formula (1).

$$ODE = 0.23 \cdot Qi/(AFup - AFR) \qquad (1)$$

Here, 0.23 is the concentration of oxygen in the air, Qi is the amount of fuel injection, AFup is the output air-fuel ratio of the upstream side air-fuel ratio sensor 40, and AFR is the air-fuel ratio serving as the center of control (in the present embodiment, the stoichiometric air-fuel ratio).

If the cumulative oxygen excess/deficiency which was obtained by cumulatively adding the oxygen excess/deficiency which was calculated in this way becomes a predetermined switching reference value (corresponding to a predetermined switching reference storage amount Cref) or more, the target air-fuel ratio which had up to then been the lean set air-fuel ratio is made the rich set air-fuel ratio and after that is maintained at that air-fuel ratio. The rich set air-fuel ratio is a predetermined air-fuel ratio which is richer than the stoichiometric air-fuel ratio (air-fuel ratio forming center of control) by a certain extent. For example, it is made 12 to 14.58, preferably 13 to 14.57, more preferably 14 to 14.55 or so. In particular, the rich set air-fuel ratio is made an air-fuel ratio richer than the above-mentioned rich judged air-fuel ratio. Further, the rich set air-fuel ratio can be expressed as an air-fuel ratio of the air-fuel ratio forming the center of control (in the present embodiment, stoichiometric air-fuel ratio) minus a rich correction amount. Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or less.

After that, when the output air-fuel ratio of the downstream side air-fuel ratio sensor 41 again becomes the rich judged air-fuel ratio or less, the target air-fuel ratio is again made the lean set air-fuel ratio. After that, a similar operation is repeated. In this way, in the present embodiment, the target air-fuel ratio of the exhaust gas flowing into the upstream side exhaust purification catalyst 20 is alternately set to the lean set air-fuel ratio and the rich set air-fuel ratio.

However, even if performing the above-mentioned such control, sometimes the actual oxygen storage amount of the upstream side exhaust purification catalyst 20 reaches the maximum storable oxygen amount before the cumulative oxygen excess/deficiency reaches the switching reference value. As the reason for this, for example, the maximum storable oxygen amount of the upstream side exhaust purification catalyst 20 falling and the air-fuel ratio of the exhaust gas flowing into the upstream side exhaust purification catalyst 20 temporarily suddenly changing may be mentioned. If the oxygen storage amount reaches the maximum storable oxygen amount in this way, exhaust gas of the lean air-fuel ratio flows out from the upstream side exhaust purification catalyst 20. Therefore, in the present embodiment, when the output air-fuel ratio of the downstream side air-fuel ratio sensor 41 becomes the lean air-fuel ratio, the target air-fuel ratio is switched to the rich set air-fuel ratio. In particular, in the present embodiment, when the output air-fuel ratio of the downstream side air-fuel ratio sensor 41 becomes a lean judged air-fuel ratio which is slightly leaner than the stoichiometric air-fuel ratio (for example, 14.65) or more, it is judged that the output air-fuel ratio of the downstream side air-fuel ratio sensor 41 has become a lean air-fuel ratio. Note that the lean judged air-fuel ratio is made an air-fuel ratio richer than the above-mentioned lean set air-fuel ratio.

<Explanation of Air-Fuel Ratio Control Using Time Chart>

Figure 5:
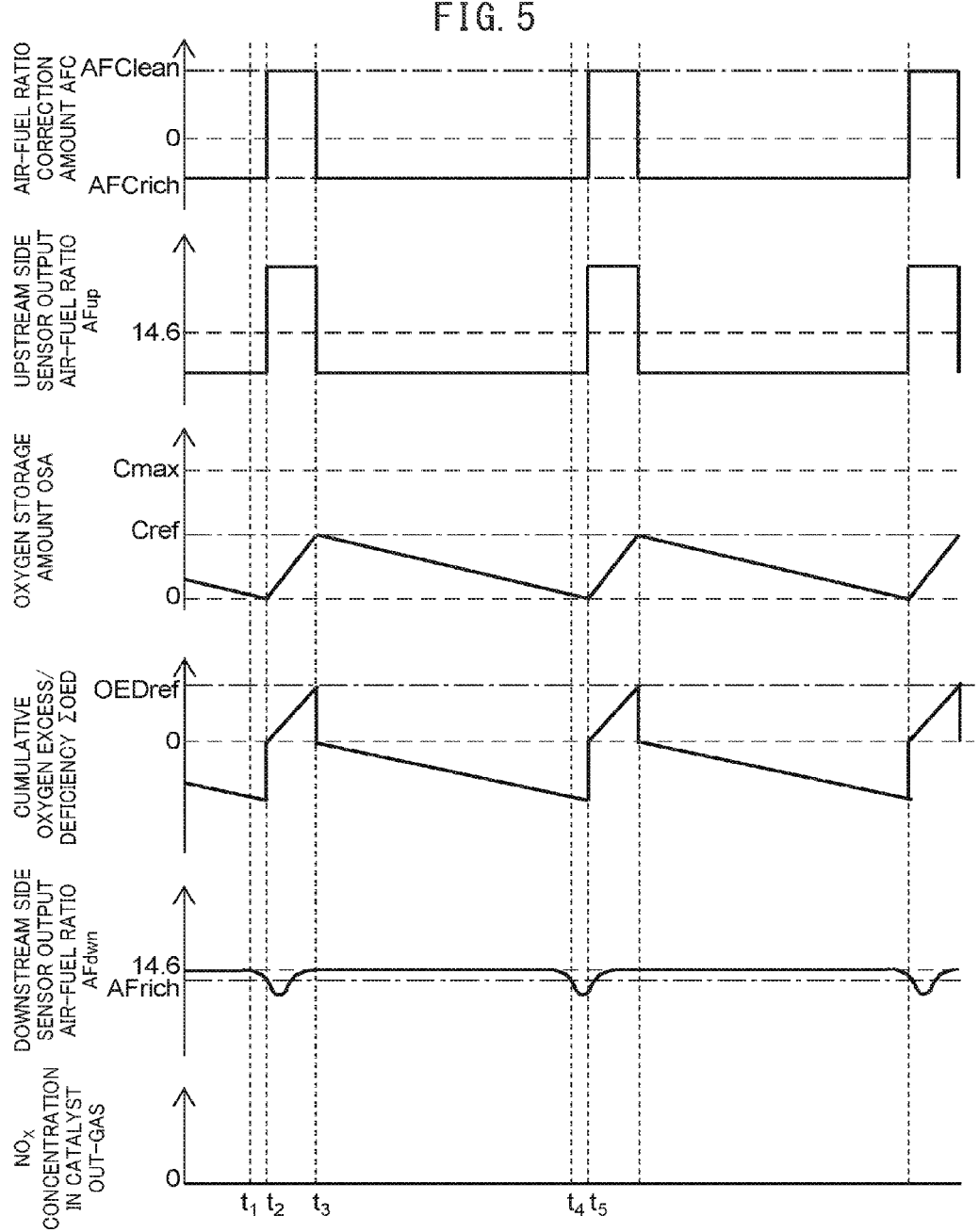
FIG. 5 is a time chart of an air-fuel ratio correction amount etc. when performing air-fuel ratio control.

Referring to FIG. 5, the above-mentioned such operation will be explained in detail. FIG. 5 is a time chart of the air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and concentration of $NO_x$ in the exhaust gas which flows out from the upstream side exhaust purification catalyst 20 when performing the air-fuel ratio control of the present embodiment.

Note that the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is set to an air-fuel ratio which is equal to the air-fuel ratio serving as the control center (below, referred to as the "control center air-fuel ratio") (in the present embodiment, the stoichiometric air-fuel ratio). When the air-fuel ratio correction amount AFC is a positive value, the target air-fuel ratio becomes an air-fuel ratio leaner than the control center air-fuel ratio (in the present embodiment, a lean air-fuel ratio), while when the air-fuel ratio correction amount AFC is a negative value, the target air-fuel ratio becomes an air-fuel ratio richer than the control center air-fuel ratio (in the present embodiment, a rich air-fuel ratio). Further, the "control center air-fuel ratio" means the air-fuel ratio to which of the air-fuel ratio correction amount AFC is added in accordance with the engine operating state, that is, the air-fuel ratio which is the reference when changing the target air-fuel ratio in accordance with the air-fuel ratio correction amount AFC.

In the illustrated example, in the state before the time $t_1$, the air-fuel ratio correction amount AFC is made the rich set correction amount AFCrich (corresponding to the rich set air-fuel ratio). That is, the target air-fuel ratio is made the rich air-fuel ratio. Along with this, the output air-fuel ratio of the upstream side air-fuel ratio sensor 40 becomes a rich air-fuel ratio. The unburned gas contained in the exhaust gas flowing into the upstream side exhaust purification catalyst 20 is purified in the upstream side exhaust purification catalyst 20. Further, along with this, oxygen storage amount OSA of the upstream side exhaust purification catalyst 20 is gradually decreased. Accordingly, the cumulative oxygen excess/deficiency ΣOED is also gradually decreased. Further, the unburned gas is not contained in the exhaust gas flowing out from the upstream side exhaust purification catalyst 20 due to the purification at the upstream side exhaust purification catalyst 20, so the output air-fuel ratio AFdwn of the downstream side air-fuel ratio sensor 41 becomes substantially the stoichiometric air-fuel ratio. The air-fuel ratio of the exhaust gas flowing into the upstream side exhaust purification catalyst 20 becomes the rich air-fuel ratio, so the amount of $NO_x$ which is exhausted from the upstream side exhaust purification catalyst 20 becomes substantially zero.

If the upstream side exhaust purification catalyst 20 gradually decreases in stored amount of oxygen OSA, the stored amount of oxygen OSA approaches zero at the time $t_1$. Along with this, part of the unburned gas which flows into the upstream side exhaust purification catalyst 20 starts to flow out without being purified by the upstream side exhaust purification catalyst 20. Due to this, from the time $t_1$ on, the output air-fuel ratio AFdwn of the downstream side air-fuel ratio sensor 41 gradually falls. As a result, at the time $t_2$, the output air-fuel ratio AFdwn of the downstream side air-fuel ratio sensor 41 reaches the rich judgment air-fuel ratio AFrich.

In the present embodiment, when the output air-fuel ratio AFdwn of the downstream side air-fuel ratio sensor 41 becomes the rich judgment air-fuel ratio or less, to make the stored amount of oxygen OSA increase, the air-fuel ratio correction amount AFC is switched to the lean set correction amount AFClean (corresponding to the lean set air-fuel ratio). Therefore, the target air-fuel ratio is switched from the rich air-fuel ratio to the lean air-fuel ratio. Further, at this time, the cumulative oxygen excess/deficiency ΣOED is reset to 0.

Note that, in the present embodiment, the air-fuel ratio correction amount AFC is switched after the output air-fuel ratio AFdwn of the downstream side air-fuel ratio sensor 41 reaches the rich judgment air-fuel ratio AFrich. This is because even if the stored amount of oxygen of the upstream side exhaust purification catalyst 20 is sufficient, the air-fuel ratio of the exhaust gas flowing out from the upstream side exhaust purification catalyst 20 sometimes ends up being slightly offset from the stoichiometric air-fuel ratio. Conversely speaking, the rich judgment air-fuel ratio is made an air-fuel ratio which the air-fuel ratio of the exhaust gas flowing out from the upstream side exhaust purification catalyst 20 will never reach when the stored amount of oxygen of the upstream side exhaust purification catalyst 20 is sufficient.

At the time $t_2$, when the target air-fuel ratio is switched to the lean air-fuel ratio, the air-fuel ratio of the exhaust gas flowing into the upstream side exhaust purification catalyst 20 changes from the rich air-fuel ratio to the lean air-fuel ratio. Further, along with this, the output air-fuel ratio AFup of the upstream side air-fuel ratio sensor 40 becomes a lean air-fuel ratio (in actuality, a delay occurs from when the target air-fuel ratio is switched to when the air-fuel ratio of the exhaust gas flowing into the upstream side exhaust purification catalyst 20 changes, but in the illustrated example, it is deemed for convenience that the change is simultaneous). If at the time $t_2$ the air-fuel ratio of the exhaust gas flowing into the upstream side exhaust purification catalyst 20 changes to the lean air-fuel ratio, the upstream side exhaust purification catalyst 20 increases in the stored amount of oxygen OSA. Further, along with this, the cumulative oxygen excess/deficiency ΣOED also gradually increases.

Due to this, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 converges to the stoichiometric air-fuel ratio. At this time, the air-fuel ratio of the exhaust gas flowing into the upstream side exhaust purification catalyst 20 becomes the lean air-fuel ratio, but there is sufficient leeway in the oxygen storage ability of the upstream side exhaust purification catalyst 20, so the oxygen in the inflowing exhaust gas is stored in the upstream side exhaust purification catalyst 20 and the $NO_x$ is removed by reduction. For this reason, the exhaust of $NO_x$ from the upstream side exhaust purification catalyst 20 becomes substantially zero.

After this, if the upstream side exhaust purification catalyst 20 increases in stored amount of oxygen OSA, at the time $t_3$, the stored amount of oxygen OSA of the upstream side exhaust purification catalyst 20 reaches the switching reference storage amount Cref. For this reason, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich. Therefore, the target air-fuel ratio is made the rich air-fuel ratio. Further, at this time, the cumulative oxygen excess/deficiency ΣOED is reset to 0.

Here, in the example which is shown in FIG. 5, at the time $t_3$, the target air-fuel ratio is switched and simultaneously the oxygen storage amount OSA falls, but in actuality, a delay occurs from when switching the target air-fuel ratio to when the oxygen storage amount OSA falls. Further, when acceleration of the vehicle mounting the internal combustion engine causes the engine load to become higher and the intake air amount to greatly deviate for an instant etc., the air-fuel ratio of the exhaust gas flowing into the upstream side exhaust purification catalyst 20 sometimes unintentionally greatly deviates from the target air-fuel ratio for an instant.

As opposed to this, the switching reference storage amount Cref is set sufficiently lower than the maximum storable oxygen amount Cmax when the upstream side exhaust purification catalyst 20 is new. For this reason, even if the above mentioned delay occurs or the air-fuel ratio of the actual exhaust gas unintentionally greatly deviates from the target air-fuel ratio for an instant, the stored amount of oxygen OSA does not reach the maximum storable oxygen amount Cmax. Conversely, the switching reference storage amount Cref is made an amount sufficiently small so that the stored amount of oxygen OSA does not reach the maximum storable oxygen amount Cmax even if the above mentioned delay or unintentionally deviation of air-fuel ratio occurs. For example, the switching reference storage amount Cref is made ¾ or less of the maximum storable oxygen amount Cmax when the upstream side exhaust purification catalyst 20 is new, preferably ½ or less, more preferably ⅕ or less.

At the time $t_3$, if the target air-fuel ratio is switched to the rich air-fuel ratio, the air-fuel ratio of the exhaust gas flowing into the upstream side exhaust purification catalyst 20 changes from the lean air-fuel ratio to the rich air-fuel ratio. Along with this, the output air-fuel ratio AFup of the upstream side air-fuel ratio sensor 40 becomes a rich air-fuel ratio (in actuality, a delay occurs from when the target air-fuel ratio is switched to when the exhaust gas flowing into the upstream side exhaust purification catalyst 20 changes in air-fuel ratio, but in the illustrated example, it is deemed for convenience that the change is simultaneous). The inflowing exhaust gas contains unburned gas, so the upstream side exhaust purification catalyst 20 gradually decreases in stored amount of oxygen OSA. At the time $t_4$, in the same way as the time $t_1$, the output air-fuel ratio AFdwn of the downstream side air-fuel ratio sensor 41 starts to fall. At this time as well, the air-fuel ratio of the exhaust gas flowing into the upstream side exhaust purification catalyst 20 is the rich air-fuel ratio, so substantially zero $NO_x$ is exhausted from the upstream side exhaust purification catalyst 20.

Next, at the time $t_5$, in the same way as time $t_2$, the output air-fuel ratio AFdwn of the downstream side air-fuel ratio sensor 41 reaches the rich judgment air-fuel ratio AFrich. Due to this, the air-fuel ratio correction amount AFC is switched to the value AFClean which corresponds to the lean set air-fuel ratio. After this, the cycle of the above mentioned times $t_1$ to $t_5$ is repeated.

As will be understood from the above explanation, according to the present embodiment, it is possible to constantly suppress the amount of discharge of $NO_x$ from the upstream side exhaust purification catalyst 20. That is, so long as performing the above-mentioned control, basically, the amount of discharge of $NO_x$ from the upstream side exhaust purification catalyst 20 can be made substantially zero. Further, the cumulative time when calculating the cumulative oxygen excess/deficiency ΣOED is short, so there is less of a chance of calculation error compared with when calculating the cumulative amount over a long period of time. For this reason, error in calculation of the cumulative oxygen excess/deficiency ΣOED can be kept from causing $NO_x$ to end up being discharged.

Further, in general, if the stored amount of oxygen of the exhaust purification catalyst is maintained constant, the exhaust purification catalyst falls in oxygen storage ability. That is, to maintain the exhaust purification catalyst high in oxygen storage ability, the stored amount of oxygen of the exhaust purification catalyst has to fluctuate. As opposed to this, according to the present embodiment, as shown in FIG. 5, the stored amount of oxygen OSA of the upstream side exhaust purification catalyst 20 constantly fluctuates up and down, so the oxygen storage ability is kept from falling.

Note that, in the above embodiment, at the times $t_2$ to $t_3$, the air-fuel ratio correction amount AFC is maintained at the lean set correction amount AFClean. However, at this time period, the air-fuel ratio correction amount AFC does not necessarily have to be maintained constant. It may be set to gradually decrease or otherwise fluctuate. Alternatively, in the time period of the times $t_2$ to $t_3$, it is also possible to temporarily make the air-fuel ratio correction amount AFC a value smaller than 0 (for example, the rich set correction amount etc). That is, in the time period of the times $t_2$ to $t_3$, the target air-fuel ratio may also temporarily be made the rich air-fuel ratio.

Figure 6:
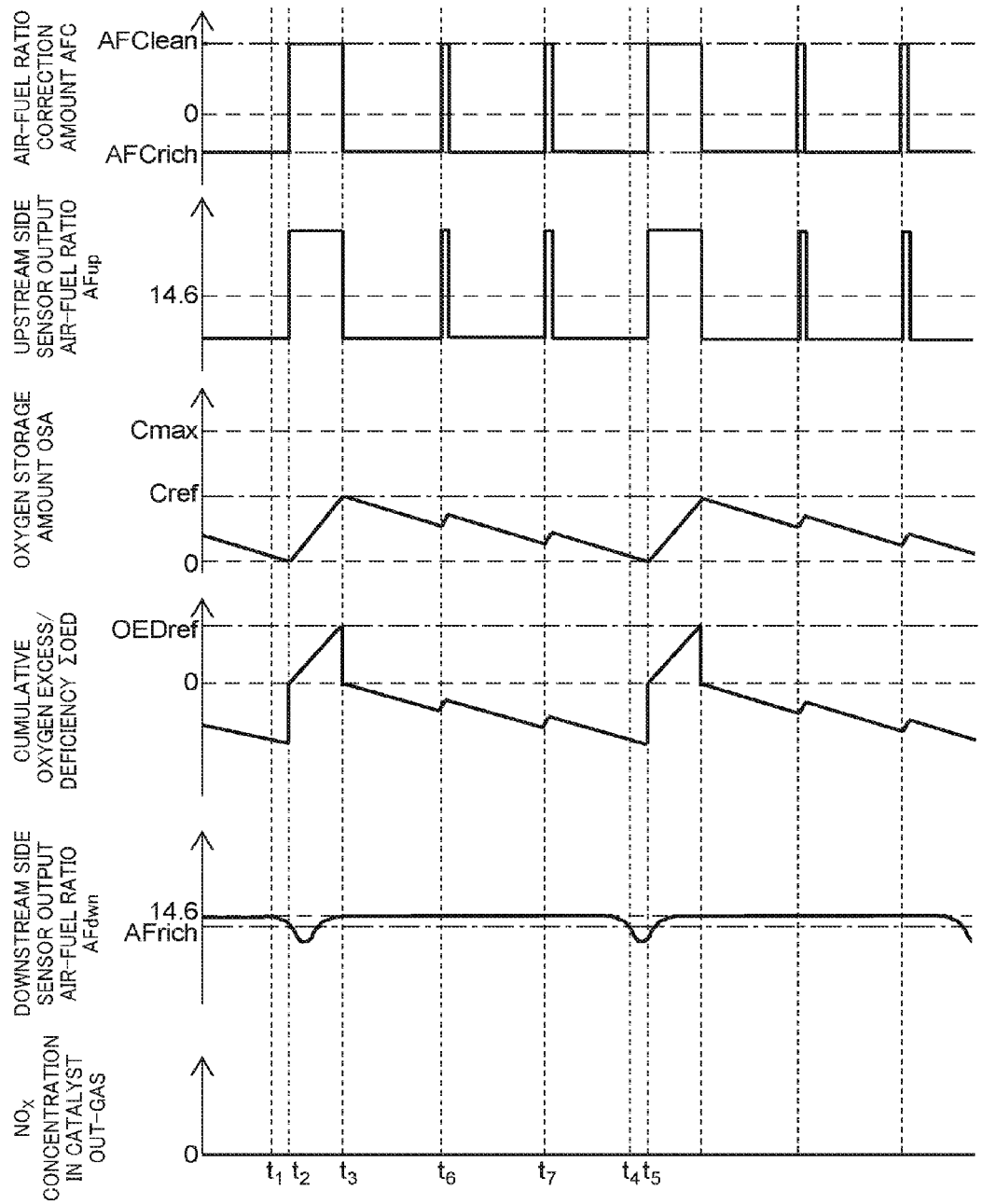
FIG. 6 is a time chart of an air-fuel ratio correction amount etc. when performing air-fuel ratio control.

Similarly, in the above embodiment, at the times $t_3$ to $t_5$, the air-fuel ratio correction amount AFC is maintained at the rich set correction amount AFCrich. However, at this time period, the air-fuel ratio correction amount AFC does not necessarily have to be maintained constant. It may be set to gradually increase or otherwise fluctuate. Alternatively, as shown in FIG. 6, in the time period of the times $t_3$ to $t_5$, it is also possible to temporarily make the air-fuel ratio correction amount AFC a value larger than 0 (for example, the lean set correction amount etc.) (t6, t7, etc., in FIG. 6). That is, in the time period of the times $t_3$ to $t_5$, the target air-fuel ratio may also temporarily be made the lean air-fuel ratio.

However, in this case as well, the air-fuel ratio correction amount AFC at the times $t_2$ to $t_3$ is set so that the difference between the average value of the target air-fuel ratio and the stoichiometric air-fuel ratio at the times $t_2$ to $t_3$ becomes larger than the difference between the average value of the target air-fuel ratio and the stoichiometric air-fuel ratio at the times $t_3$ to $t_5$.

Note that, the air-fuel ratio correction amount AFC in such an embodiment, i.e., the target air-fuel ratio is set by the ECU 31. Therefore, when the air-fuel ratio of the exhaust gas detected by the downstream side air-fuel ratio sensor 41 becomes the rich judged air-fuel ratio or less, the ECU 31 can be said to continuously or intermittently make the target air-fuel ratio of the exhaust gas flowing into the upstream side exhaust purification catalyst 20 the lean air-fuel ratio until the oxygen storage amount OSA of the upstream side exhaust purification catalyst 20 becomes the switching reference storage amount Cref and, when the oxygen storage amount OSA of the upstream side exhaust purification catalyst 20 becomes the switching reference storage amount Cref or more, to continuously or intermittently make the target air-fuel ratio the rich air-fuel ratio until the air-fuel ratio of the exhaust gas detected by the downstream exhaust purification catalyst 20 becomes the rich judged air-fuel ratio or less without the oxygen storage amount OSA reaching the maximum storable oxygen amount Cmax.

More simply speaking, in the present embodiment, the ECU 31 can be said to switch the target air-fuel ratio to the lean air-fuel ratio when the air-fuel ratio detected by the downstream side air-fuel ratio sensor 41 becomes the rich judged air-fuel ratio or less and to switch the target air-fuel ratio to the rich air-fuel ratio when the oxygen storage amount OSA of the upstream side exhaust purification catalyst 20 becomes the switching reference storage amount Cref or more.

Further, in the above embodiment, the cumulative oxygen excess/deficiency ΣOED is calculated based on the output air-fuel ratio AFup, the estimated value of the intake air amount to the combustion chamber 5, etc. However, the stored amount of oxygen OSA may also be calculated based on other parameters in addition to these parameters and may be estimated based on parameters which are different from these parameters. Further, in the above embodiment, if the cumulative oxygen excess/deficiency ΣOED becomes the switching reference value OEDref or more, the target air-fuel ratio is switched from the lean set air-fuel ratio to the rich set air-fuel ratio. However, the timing of switching the target air-fuel ratio from the lean set air-fuel ratio to the rich set air-fuel ratio may, for example, also be based on the engine operating time or the cumulative amount of intake air from when switching the target air-fuel ratio from the rich set air-fuel ratio to the lean set air-fuel ratio or other parameter. However, in this case as well, the target air-fuel ratio has to be switched from the lean set air-fuel ratio to the rich set air-fuel ratio while the stored amount of oxygen OSA of the upstream side exhaust purification catalyst 20 is estimated to be smaller than the maximum storable oxygen amount.

<Deviation at Upstream Side Air Fuel Ratio Sensor>

When the engine body 1 has a plurality of cylinders, sometimes a deviation occurs between the cylinders in the air-fuel ratio of the exhaust gas which is exhausted from the cylinders. On the other hand, the upstream side air-fuel ratio sensor 40 is arranged at the header of the exhaust manifold 19, but depending on the position of arrangement, the extent by which the exhaust gas exhausted from each cylinder is exposed to the upstream side air-fuel ratio sensor 40 differs between cylinders. As a result, the output air-fuel ratio of the upstream side air-fuel ratio sensor 40 is strongly affected by the air-fuel ratio of the exhaust gas exhausted from a certain specific cylinder. Therefore, when the air-fuel ratio of the exhaust gas exhausted from a certain specific cylinder becomes an air-fuel ratio which differs from the average air-fuel ratio of the exhaust gas exhausted from all cylinders, deviation occurs between the average air-fuel ratio and the output air-fuel ratio of the upstream side air-fuel ratio sensor 40. That is, the output air-fuel ratio of the upstream side air-fuel ratio sensor 40 deviates to the rich side or lean side from the average air-fuel ratio of the actual exhaust gas.

Further, hydrogen of the unburned gas passes through the diffusion regulation layer of the air-fuel ratio sensor in fast speed. Therefore, if the concentration of hydrogen in the exhaust gas is high, the output air-fuel ratio of the upstream side air-fuel ratio sensor 40 deviates to the lower side (i.e., the richer side) than the actual air-fuel ratio of the exhaust gas.

If deviation occurs in the output air-fuel ratio of the upstream side air-fuel ratio sensor 40 in this way, even if the above mentioned control is performed, sometimes $NO_x$ and oxygen flow out from the upstream side exhaust purification catalyst 20 or a frequency of the unburned gas flowing out therefrom becomes higher. This phenomenon will be explained with reference to FIGS. 7 and 8 below.

Figure 7:
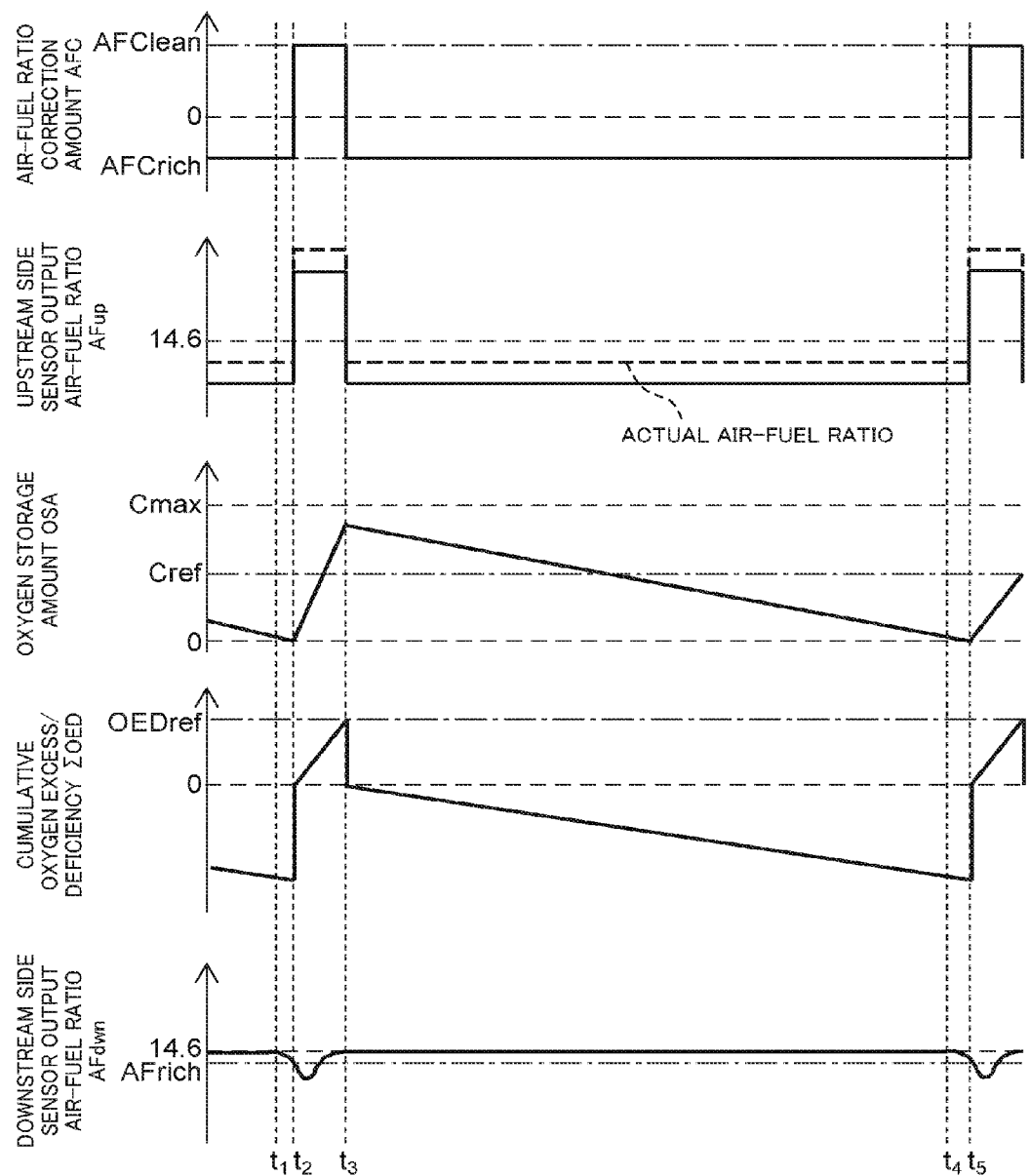
FIG. 7 is a time chart of an air-fuel ratio correction amount etc. when deviation occurs in an output value of an upstream side air-fuel ratio sensor.

FIG. 7 is a time chart of the oxygen storage amount OSA of the upstream side exhaust purification catalyst 20, etc., similar to FIG. 5. FIG. 7 shows the case where the output air-fuel ratio of the upstream side air-fuel ratio sensor 40 deviates to the rich side. In the figure, the solid line in the output air-fuel ratio AFup of the upstream side air-fuel ratio sensor 40 shows the actual output air-fuel ratio of the upstream side air-fuel ratio sensor 40. On the other hand, the broken line shows the actual air-fuel ratio of the exhaust gas flowing around the upstream side air-fuel ratio sensor 40.

In the example shown in FIG. 7 as well, in the state before the time $t_1$, the air-fuel ratio correction amount AFC is set to the rich set correction amount AFCrich, and therefore the target air-fuel ratio is set to the rich set air-fuel ratio. Along with this, the output air-fuel ratio AFup of the upstream side air-fuel ratio sensor 40 becomes an air-fuel ratio equal to the rich set air-fuel ratio. However, since, as explained above, the output air-fuel ratio of the upstream side air-fuel ratio sensor 40 deviates to the rich side, the actual air-fuel ratio of the exhaust gas becomes an air-fuel ratio leaner than the rich set air-fuel ratio. That is, the output air-fuel ratio AFup of the upstream side air-fuel ratio sensor 40 becomes lower (richer) than the actual air-fuel ratio (broken line in the figure). For this reason, that is, since the actual air-fuel ratio of the exhaust gas deviates to the lean side, the decreasing speed of the oxygen storage amount OSA of the upstream side exhaust purification catalyst 20 is slower.

Further, in the example shown in FIG. 7, at the time $t_2$, the output air-fuel ratio AFdown of the downstream side air-fuel ratio sensor 41 reaches the rich judged air-fuel ratio AFrich. Therefore, as explained above, at the time $t_2$, the air-fuel ratio correction amount AFC is switched to the lean set correction amount AFClean. Accordingly, the target air-fuel ratio is switched to the lean set air-fuel ratio.

Along with this, the output air-fuel ratio AFup of the upstream side air-fuel ratio sensor 40 becomes an air-fuel ratio equal to the lean set air-fuel ratio. However, as explained above, the output air-fuel ratio of the upstream side air-fuel ratio sensor 40 deviates to the rich side, and therefore the actual air-fuel ratio of the exhaust gas becomes an air-fuel ratio leaner than the lean set air-fuel ratio. That is, the output air-fuel ratio AFup of the upstream side air-fuel ratio sensor 40 becomes lower (richer) than the actual air-fuel ratio (broken line in the drawing) Therefore, the increasing speed of the oxygen storage amount OSA of the upstream side exhaust purification catalyst 20 becomes faster, and the actual oxygen amount supplied to the upstream side exhaust purification catalyst 20 while the target air-fuel ratio is set to the lean set air-fuel ratio becomes larger than the switching reference oxygen amount Cref.

Figure 8:
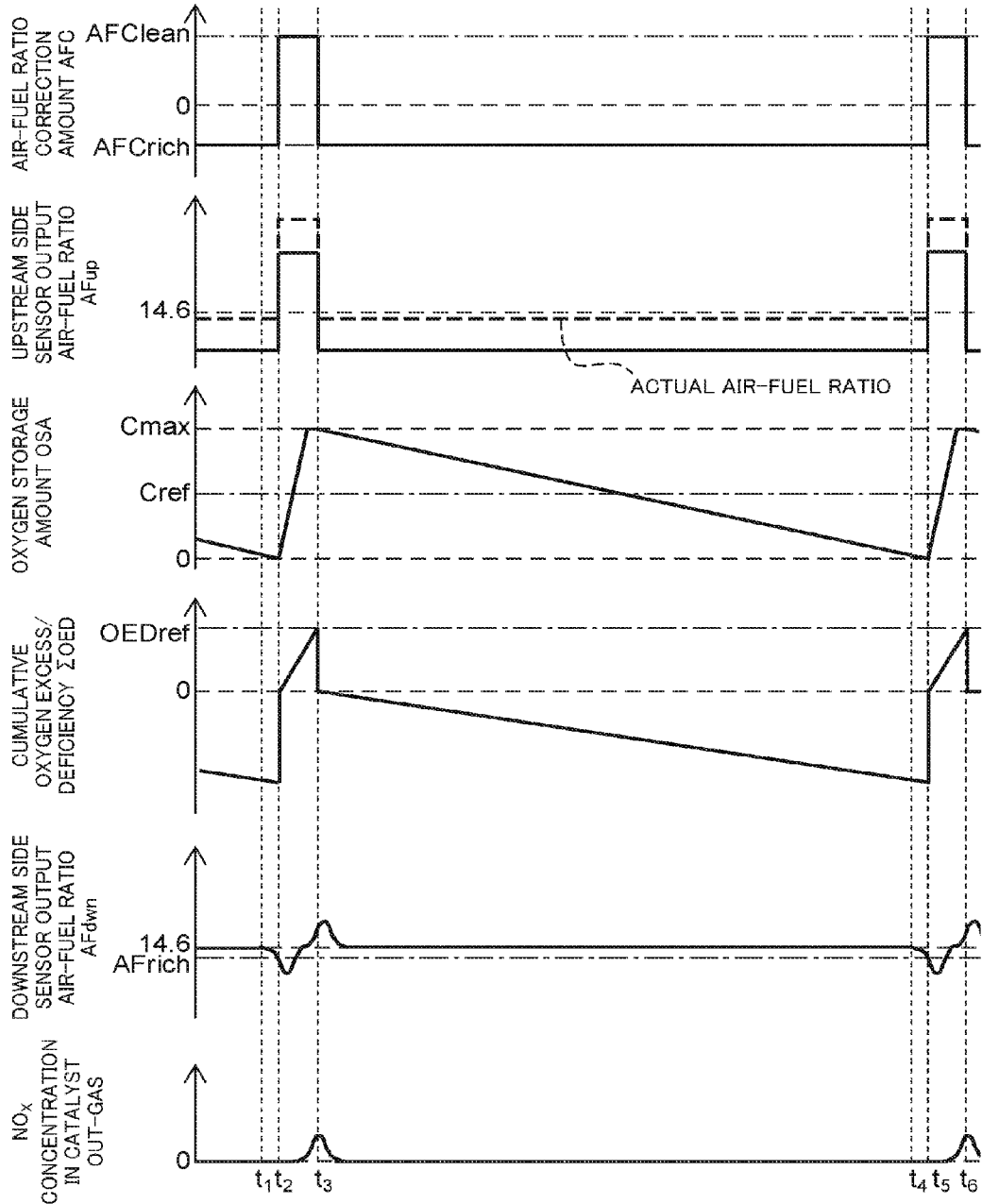
FIG. 8 is a time chart of an air-fuel ratio correction amount etc. when deviation occurs in an output value of an upstream side air-fuel ratio sensor.

In addition, if the deviation of the output air-fuel ratio of the upstream side air-fuel ratio sensor 40 is large, the speed of increase of the oxygen storage amount OSA of the upstream side exhaust purification catalyst 20 will become extremely fast. Therefore, in this case, as shown in FIG. 8, the actual oxygen storage amount OSA will reach the maximum storable oxygen amount Cmax before the cumulative oxygen excess/deficiency ΣOED calculated based on the output air-fuel ratio AFup of the upstream side air-fuel ratio sensor 4 reaches the switching reference value OEDref. As a result, $NO_x$ and oxygen will flow out from the upstream side exhaust purification catalyst 20.

On the other hand, opposite to the above-mentioned example, if the output air-fuel ratio of the upstream side air-fuel ratio sensor 40 deviates to the lean side, the speed of increase of the oxygen storage amount OSA will become slower and the speed of decrease of the oxygen storage amount OSA will become faster. In this case, the cycle from the time $t_2$ to the time $t_5$ becomes faster and the frequency of output of unburned gas from the upstream side exhaust purification catalyst 20 becomes higher.

From the above, it becomes necessary to detect deviation in the output air-fuel ratio of the upstream side air-fuel ratio sensor 40 and is necessary to correct the output air-fuel ratio etc. based on the detected deviation.

<Normal Learning Control>

Therefore, in this embodiment of the present invention, to compensate for deviation of the output air-fuel ratio of the upstream side air-fuel ratio sensor 40, during normal operation (that is, when feedback control is carried out based on the above-mentioned target air-fuel ratio), learning control is performed. First, this normal learning control will be explained.

Figure 9:
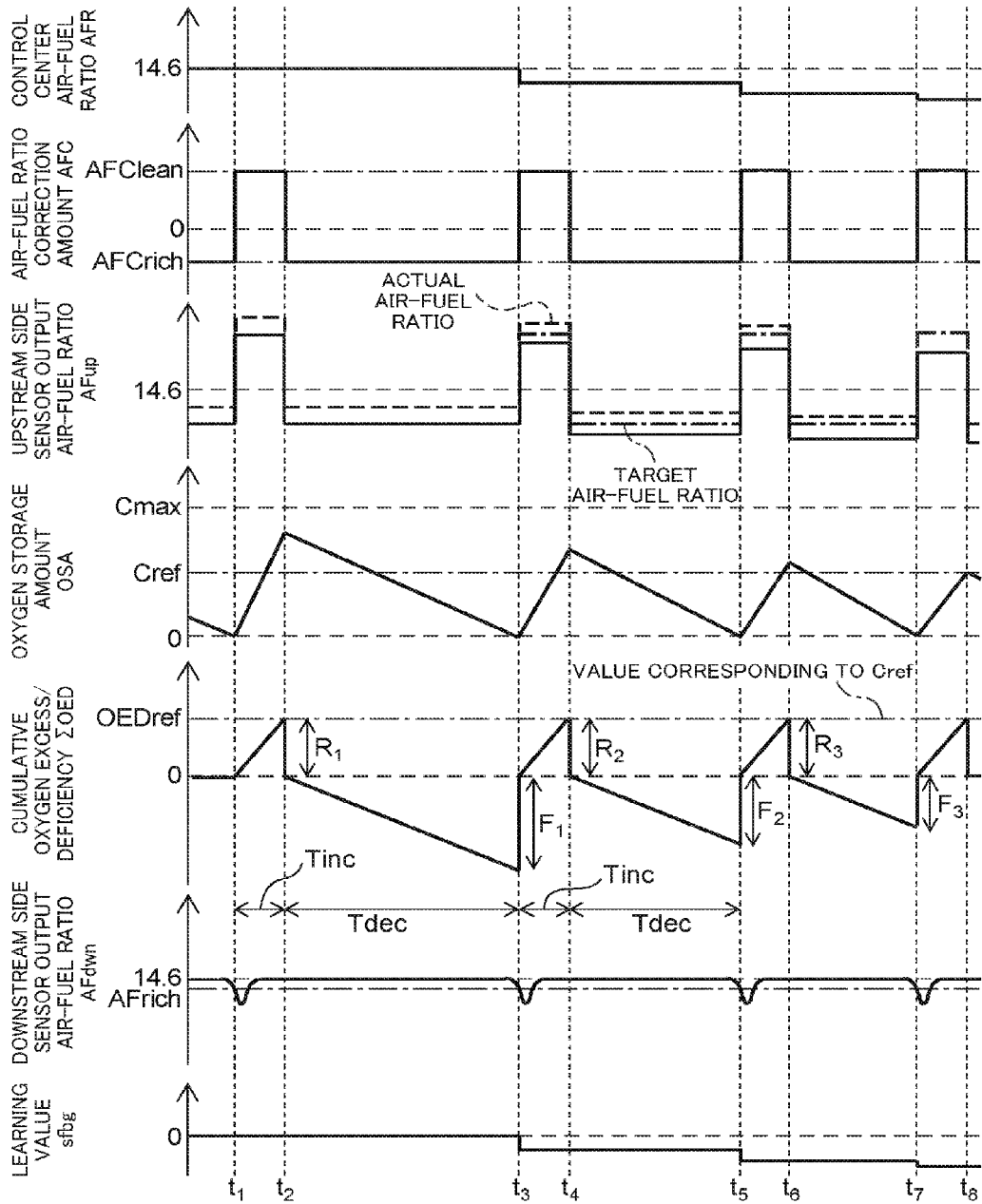
FIG. 9 is a time chart of an air-fuel ratio correction amount etc. when performing learning control.

Here, the time period from when switching the target air-fuel ratio to the lean air-fuel ratio to when the cumulative oxygen excess/deficiency ΣOED becomes the switching reference value OEDref or more will be defined as the "oxygen increasing time period (first time period)". Similarly, the time period from when switching the target air-fuel ratio to the rich air-fuel ratio to when the output air-fuel ratio of the downstream side air-fuel ratio sensor 41 becomes the rich judged air-fuel ratio or less will be defined as the "oxygen decreasing time period (second time period)". In the normal learning control of the present embodiment, a lean oxygen cumulative value (a first oxygen cumulative value) is calculated as the absolute value of the cumulative oxygen excess/deficiency ΣODE in the oxygen increasing time period. In addition, a rich oxygen cumulative value (a second oxygen cumulative value) is calculated as the absolute value of the cumulative oxygen excess/deficiency in the oxygen decreasing time period. Further, the control center air-fuel ratio AFR is corrected so that the difference of these lean oxygen cumulative value and rich oxygen cumulative value becomes smaller. FIG. 9 shows this state.

FIG. 9 is a time chart of the control center air-fuel ratio AFR, the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the learning value sfbg. FIG. 9 shows the case, like FIG. 7, where the output air-fuel ratio AFup of the upstream side air-fuel ratio sensor 40 deviates to the low side (rich side). Note that, the learning value sfbg is a value which changes in accordance with the deviation of the output air-fuel ratio of the upstream side air-fuel ratio sensor 40 and is used for correction of the control center air-fuel ratio AFR in the present embodiment. Further, in the figure, the solid line in the output air-fuel ratio AFup of the upstream side air-fuel ratio sensor 40 indicates the air-fuel ratio corresponding to the output detected by the upstream side air-fuel ratio sensor 40, and the broken line indicates the actual air-fuel ratio of the exhaust gas flowing around the upstream side air-fuel ratio sensor 40. Further, the one-dot chain line indicates the target air-fuel ratio, i.e., an air-fuel ratio corresponding to the air-fuel ratio correction amount AFC.

In the example shown in the figure, similarly to FIGS. 5 and 7, in the state before the time $t_1$, the control center air-fuel ratio is set to the stoichiometric air-fuel ratio, and the air-fuel ratio correction amount AFC is set to the rich set correction amount AFCrich. At this time, the output air-fuel ratio AFup of the upstream side air-fuel ratio sensor 40, as shown by the solid line, becomes an air-fuel ratio corresponding to the rich set air-fuel ratio. However, since the output air-fuel ratio of the upstream side air-fuel ratio sensor 40 deviates, the actual air-fuel ratio of the exhaust gas is an air-fuel ratio leaner than the rich set air-fuel ratio (the broken line in FIG. 9). However, in the example shown in FIG. 9, as will be understood from the broken line of FIG. 9, the actual air-fuel ratio of the exhaust gas before the time $t_1$ becomes a rich air-fuel ratio leaner than the rich set air-fuel ratio. Therefore, the oxygen storage amount of the upstream side exhaust purification catalyst 20 is gradually decreased.

At the time $t_1$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. After the time $t_1$, the output air-fuel ratio of the upstream side air-fuel ratio sensor 40 becomes an air-fuel ratio corresponding to the lean set air-fuel ratio. However, due to deviation of the output air-fuel ratio of the upstream side air-fuel ratio sensor 40, the actual air-fuel ratio of the exhaust gas becomes an air-fuel ratio leaner than the lean set air-fuel ratio, that is, an air-fuel ratio with a great lean degree (see broken line of FIG. 9). Therefore, the oxygen storage amount OSA of the upstream side exhaust purification catalyst 20 rapidly increases.

On the other hand, the oxygen excess/deficiency is calculated based on the output air-fuel ratio AFup of the upstream side air-fuel ratio sensor 40 (to be more precise, the difference between the output air-fuel ratio AFup and the control center air-fuel ratio AFR). However, as explained above, deviation occurs in the output air-fuel ratio AFup of the upstream side air-fuel ratio sensor 40. Therefore, the calculated oxygen excess/deficiency becomes a value smaller than the actual oxygen excess/deficiency (i.e., a smaller amount of oxygen). As a result, the cumulative oxygen excess/deficiency ΣOED becomes smaller than the actual amount.

At the time $t_2$, the cumulative oxygen excess/deficiency ΣOED reaches the switching reference value OEDref. Therefore, the air-fuel ratio correction amount AFC is switched to the rich set correction amount AFCrich. Therefore, the target air-fuel ratio is set to the rich air-fuel ratio.

At this time, the actual oxygen storage amount OSA, as shown in FIG. 9, becomes greater than the switching reference storage amount Cref.

After the time $t_2$, similarly to the state before the time $t_1$, the air-fuel ratio correction amount AFC is set to the rich set correction amount AFCrich and accordingly the target air-fuel ratio is set to the rich air-fuel ratio. At this time as well, the actual air-fuel ratio of the exhaust gas is an air-fuel ratio leaner than the rich set air-fuel ratio. As a result, the upstream side exhaust purification catalyst 20 becomes slower in speed of decrease of the oxygen storage amount OSA. In addition, as explained above, at the time $t_2$, the actual oxygen storage amount of the upstream side exhaust purification catalyst 20 becomes greater than the switching reference storage amount Cref. Therefore, time is taken until the actual oxygen storage amount of the upstream side exhaust purification catalyst 20 reaches zero.

At the time $t_3$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. Therefore, the target air-fuel ratio is switched from the rich set air-fuel ratio to the lean set air-fuel ratio.

In the present embodiment, as explained above, the cumulative oxygen excess/deficiency $\Sigma$OED is calculated from the time $t_1$ to the time $t_2$. In this regard, if referring to the time period from when the target air-fuel ratio is switched to the lean air-fuel ratio (time $t_1$) to when the estimated value of the oxygen storage amount OSA of the upstream side exhaust purification catalyst 20 becomes the switching reference storage amount Cref or more (time $t_2$), as the "oxygen increase time period Tinc", in the present embodiment, the cumulative oxygen excess/deficiency $\Sigma$OED is calculated in the oxygen increase time period Tinc. In FIG. 9, the absolute value of the cumulative oxygen excess/deficiency $\Sigma$OED in the oxygen increase time period Tinc from the time $t_1$ to time $t_2$ is shown as $R_1$.

This cumulative oxygen excess/deficiency $\Sigma$OED ($R_1$) in this oxygen increase time period Tinc corresponds to the oxygen storage amount OSA at the time $t_2$. However, as explained above, estimation of the oxygen excess/deficiency uses the output air-fuel ratio AFup of the upstream side air-fuel ratio sensor 40, and deviation occurs in this output air-fuel ratio AFup. Therefore, in the example shown in FIG. 9, the cumulative oxygen excess/deficiency $\Sigma$OED in the oxygen increase time period Tinc from the time $t_1$ to time $t_2$ becomes smaller than the value which corresponds to the actual oxygen storage amount OSA at the time $t_2$.

Further, in the present embodiment, the cumulative oxygen excess/deficiency $\Sigma$OED is also calculated from the time $t_2$ to time $t_3$. In this regard, if referring to the time period from when the target air-fuel ratio is switched to the rich air-fuel ratio (time $t_2$) to when the output air-fuel ratio AFdwn of the downstream side air-fuel ratio sensor 41 reaches the rich judged air-fuel ratio AFrich (time $t_3$), as the "oxygen decrease time period Tdec", in the present embodiment, the cumulative oxygen excess/deficiency $\Sigma$OED is calculated in the oxygen decrease time period Tdec. In FIG. 9, the absolute value of the cumulative oxygen excess/deficiency $\Sigma$OED in the oxygen decrease time period Tdec from the time $t_2$ to time $t_3$ is shown as $F_1$.

This cumulative oxygen excess/deficiency $\Sigma$OED ($F_1$) in this oxygen decrease time period Tdec corresponds to the total oxygen amount released from the upstream side exhaust purification catalyst 20 from the time $t_2$ to the time $t_3$. However, as explained above, deviation occurs in the output air-fuel ratio AFup of the upstream side air-fuel ratio sensor 40. Therefore, in the example shown in FIG. 9, the cumulative oxygen excess/deficiency $\Sigma$OED in the oxygen decrease time period Tdec from the time $t_2$ to time $t_3$ is smaller than the value which corresponds to the total amount of oxygen released from the upstream side exhaust purification catalyst 20 from the time $t_2$ to the time $t_3$.

In this regard, in the oxygen increase time period Tinc, oxygen is stored in the upstream side exhaust purification catalyst 20, while in the oxygen decrease time period Tdec, the stored oxygen is completely released. Therefore, the absolute value $R_1$ of the cumulative oxygen excess/deficiency amount in the oxygen increase time period Tinc and the absolute value $F_1$ of the cumulative oxygen excess/deficiency amount in the oxygen decrease time period Tdec basically should be the same value. However, as explained above, when deviation occurs in the output air-fuel ratio of the upstream side air-fuel ratio sensor 40, the cumulative value changes in accordance with the deviation. As explained above, when the output air-fuel ratio of the upstream side air-fuel ratio sensor 40 deviates to the low side (rich side), the absolute value $F_1$ becomes greater than the absolute value $R_1$. Conversely, when the output air-fuel ratio of the upstream side air-fuel ratio sensor 40 deviates to the high side (lean side), the absolute value $F_1$ becomes smaller compared with the absolute value $R_1$. In addition, the difference $\Delta\Sigma$OED between the absolute value $R_1$ of the cumulative oxygen excess/deficiency amount in the oxygen increase time period Tinc and the absolute value $F_1$ of the cumulative oxygen excess/deficiency amount in the oxygen decrease time period Tdec (=$R_1-F_1$). Below, referred to as the "excess/deficiency error") expresses the extent of deviation at the output air-fuel ratio of the upstream side air-fuel ratio sensor 40. It can be considered that the larger the difference between these absolute values $R_1$ and $F_1$, the greater the deviation in the output air-fuel ratio of the upstream side air-fuel ratio sensor 40.

Therefore, in the present embodiment, based on the excess/deficiency error $\Delta\Sigma$OED, the control center air-fuel ratio AFR is corrected. In particular, in the present embodiment, the control center air-fuel ratio AFR is corrected so that the difference $\Delta\Sigma$OED between the absolute value $R_1$ of the cumulative oxygen excess/deficiency amount in the oxygen increase time period Tinc and the absolute value $F_1$ of the cumulative oxygen excess/deficiency amount in the oxygen decrease time period Tdec becomes smaller.

Specifically, in the present embodiment, the learning value sfbg is calculated by the following formula (2), and the control center air-fuel ratio AFR is corrected by the following formula (3).

$$sfbg(n)=sfbg(n-1)+k_1 \cdot \Delta\Sigma OED \quad (2)$$

$$AFR=AFRbase+sfbg(n) \quad (3)$$

Note that, in the above formula (2), "n" expresses the number of calculations or time. Therefore, sfbg(n) is the current calculated value or current learning value. In addition, "$k_1$" in the above formula (2) is the gain which shows the extent by which the excess/deficiency error $\Delta\Sigma$OED is reflected in the control center air-fuel ratio AFR. The larger the value of the gain "$k_1$", the larger the correction amount of the control center air-fuel ratio AFR. In addition, in the above formula (3), the base control center air-fuel ratio AFRbase is a control center air-fuel ratio which is used as base, and is the stoichiometric air-fuel ratio in the present embodiment.

At the time $t_3$ of FIG. 9, as explained above, the learning value sfbg is calculated based on the absolute value $R_1$ and the absolute value $F_1$. In particular, in the example shown in FIG. 9, since the absolute value $F_1$ of the cumulative oxygen excess/deficiency in the oxygen decrease time period Tdec is larger than the absolute value $R_1$ of the cumulative oxygen excess/deficiency in the oxygen increase time period Tinc, at the time $t_3$, the learning value sfbg is decreased.

At this time, as can be understood from the above formula (3), the control center air-fuel ratio AFR is corrected based on the learning value sfbg. In the example shown in FIG. 9, the learning value sfbg is a negative value, and therefore the control center air-fuel ratio AFR becomes a value smaller than the basic control center air-fuel ratio AFRbase, that is, the rich side value. Accordingly, the air-fuel ratio of the exhaust gas flowing into the upstream side exhaust purification catalyst 20 is corrected to the rich side.

As a result, the deviation of the actual air-fuel ratio of the exhaust gas flowing into the upstream side exhaust purification catalyst 20 with respect to the target air-fuel ratio after the time $t_3$ becomes smaller than before the time $t_3$. Therefore, the difference between the broken line indicating the actual air-fuel ratio and the one-dot chain line indicating the target air-fuel ratio after the time $t_3$ becomes smaller than the difference before the time $t_3$.

Further, after the time $t_3$ as well, an operation similar to the operation during the time $t_1$ to time $t_2$ is performed. Therefore, at the time $t_4$, if the cumulative oxygen excess/deficiency ΣOED reaches the switching reference value OEDref, the target air-fuel ratio is switched from the lean set air-fuel ratio to the rich set air-fuel ratio. Then, at the time $t_5$, when the output air-fuel ratio AFdwn of the downstream side air-fuel ratio sensor 41 reaches the rich judged air-fuel ratio AFrich, the target air-fuel ratio is again switched to the lean set air-fuel ratio.

The period from the time $t_3$ to time $t_4$, as explained above, corresponds to the oxygen increase time period Tinc. Therefore, the absolute value of the cumulative oxygen excess/deficiency ΣOED during this period is expressed by $R_2$ of FIG. 9. Further, the period from the time $t_4$ to time $t_5$, as explained above, corresponds to the oxygen decrease time period Tdec, and therefore the absolute value of the cumulative oxygen excess/deficiency ΣOED during this period is expressed by $F_2$ of FIG. 9. Further, the learning value sfbg is updated based on the difference $\Delta\Sigma OED(=R_2-F_2)$ between these absolute values $R_2$ and $F_2$ by using the above formula (2). In the present embodiment, similar control is repeated after the time $t_5$ and, due to this, the learning value sfbg is repeatedly updated.

By updating the normal learning value sfbg as stated above, the output air-fuel ratio AFup of the upstream side air-fuel ratio sensor 40 is gradually separated away from the target air-fuel ratio, but the actual air-fuel ratio of the exhaust gas flowing into the upstream side exhaust purification catalyst 20 gradually approaches the target air-fuel ratio. Due to this, it is possible to gradually compensate the deviation in the output air-fuel ratio of the upstream side air-fuel ratio sensor 40.

Further, in the embodiment, the target air-fuel ratio is switched before the oxygen storage amount OSA of the upstream side exhaust purification catalyst 20 reaches the maximum storable oxygen amount Cmax. For this reason, compared with switching the target air-fuel ratio after the oxygen storage amount OSA reaches the maximum storable oxygen amount, that is, after the output air-fuel ratio AFdwn of the downstream side air-fuel ratio sensor 41 becomes a lean judged air-fuel ratio AFlean or more, the frequency of updating the learning value can be increased. Further, the cumulative oxygen excess/deficiency ΣOED becomes more susceptible to error the longer the calculation time. According to the present embodiment, the target air-fuel ratio is switched before the oxygen storage amount OSA reaches the maximum storable oxygen amount, so the calculation period can be shortened. For this reason, the error in calculation of the cumulative oxygen excess/deficiency ΣOED can be reduced.

Note that, as explained above, the learning value sfbg is updated based on the cumulative oxygen excess/deficiency ΣOED in the oxygen increasing time period Tinc and the cumulative oxygen excess/deficiency ΣOED in the oxygen decreasing time period Tdec directly following this oxygen increasing time period Tinc. This is because, as explained above, the total amount of oxygen stored at the upstream side exhaust purification catalyst 20 in the oxygen increasing time period Tinc and the total amount of oxygen released from the upstream side exhaust purification catalyst 20 in the directly following oxygen decreasing time period Tdec become equal.

In addition, in the present embodiment, based on the cumulative oxygen excess/deficiency ΣOED in one oxygen increasing time period Tinc and the cumulative oxygen excess/deficiency ΣOED in one oxygen decreasing time period Tdec, the learning value sfbg is updated. However, the learning value sfbg may be updated based on the total value or average value of the cumulative oxygen excess/deficiency ΣOED in a plurality of oxygen increasing time periods Tinc and the total value or average value of the cumulative oxygen excess/deficiency ΣOED in a plurality of oxygen decreasing time periods Tdec.

Further, in the present embodiment, based on the learning value sfbg, the control center air-fuel ratio AFR (i.e., the target air-fuel ratio) is corrected. However, what is corrected based on the learning value sfbg may be another parameter relating to the air-fuel ratio. As the other parameter, for example, the amount of feed of fuel to the combustion chamber 5, the output air-fuel ratio of the upstream side air-fuel ratio sensor 40, the air-fuel ratio correction amount, etc. may be mentioned.

Note that, in the above embodiment, in the base air-fuel ratio control, when the air-fuel ratio detected by the downstream side air-fuel ratio sensor 41 becomes the rich judged air-fuel ratio or less, the target air-fuel ratio is switched to the lean air-fuel ratio. Further, when the cumulative oxygen excess/deficiency ΣOED becomes a predetermined switching reference value OEDref or more, the target air-fuel ratio is switched to the rich air-fuel ratio. However, as basic air-fuel ratio control, other control can be used. As such other control, for example, the target air-fuel ratio is switched to the rich air-fuel ratio when the output air-fuel ratio of the downstream side air-fuel ratio sensor 41 becomes the lean judged air-fuel ratio or more, while the target air-fuel ratio is switched to the lean air-fuel ratio when the output air-fuel ratio of the downstream side air-fuel ratio sensor 41 becomes the rich judged air-fuel ratio or less.

In this case, as the absolute value of the cumulative oxygen excess/deficiency in the oxygen decrease time from when switching the target air-fuel ratio to the rich air-fuel ratio to when the output air-fuel ratio of the downstream side air-fuel ratio sensor 41 becomes the rich judged air-fuel ratio or less, the rich oxygen cumulative value is calculated. In addition, as the absolute value of the cumulative oxygen excess/deficiency in the oxygen increase time from when switching the target air-fuel ratio to the lean air-fuel ratio to when the output air-fuel ratio of the downstream side air-fuel ratio sensor 41 becomes the lean judged air-fuel ratio or more, the lean oxygen cumulative value is calculated. Further, the control center air-fuel ratio etc. are corrected so that the difference between these rich oxygen cumulative value and lean oxygen cumulative value is corrected.

Therefore, summarizing the above, in the present embodiment, the target air-fuel ratio is switched to the lean air-fuel ratio when the output air-fuel ratio of the downstream side air-fuel ratio sensor 41 reaches the rich judged air-fuel ratio. In addition, the target air-fuel ratio is switched to the rich air-fuel ratio when the oxygen storage amount of the upstream side exhaust purification catalyst 20 becomes a predetermined switching reference amount or more or when the output air-fuel ratio of the downstream side air-fuel ratio sensor 41 reaches the lean judged air-fuel ratio. In other words, in the present embodiment, the target air-fuel ratio is switched between a plurality of different air-fuel ratios at the rich side and lean side of the stoichiometric air-fuel ratio. Further, the learning means can be said to use a first oxygen cumulative value which is an absolute value of the cumulative oxygen excess/deficiency in the first time period from when switching the target air-fuel ratio to the lean air-fuel ratio to when the amount of change of the oxygen storage amount becomes the switching reference amount or more or the output air-fuel ratio of the downstream side air-fuel ratio sensor 41 reaches the lean judged air-fuel ratio, and use a second oxygen cumulative value which is an absolute value of the cumulative oxygen excess/deficiency in the second time period from when switching the target air-fuel ratio to the rich air-fuel ratio to when the output air-fuel ratio of the downstream side air-fuel ratio sensor 41 becomes the rich judged air-fuel ratio or less as the basis to perform normal learning control wherein a parameter relating to the air-fuel ratio is corrected so that the difference of these first oxygen cumulative value and second oxygen cumulative value becomes smaller.

<Large Deviation in Upstream Side Air-Fuel Ratio Sensor>

In the example shown in FIGS. 7 and 8, deviation occurs in the output air-fuel ratio of the upstream side air-fuel ratio sensor 40, but the extent thereof is not that large. Therefore, as will be understood from the broken line of FIGS. 7 and 8, when the target air-fuel ratio is set to the rich set air-fuel ratio, the actual air-fuel ratio of the exhaust gas becomes a rich air-fuel ratio while leaner than the rich set air-fuel ratio.

As opposed to this, if the deviation which occurs at the upstream side air-fuel ratio sensor 40 becomes larger, even if the target air-fuel ratio is set to the rich set air-fuel ratio, sometimes the actual air-fuel ratio of the exhaust gas becomes the stoichiometric air-fuel ratio. This state is shown in FIG. 10.

Figure 10:
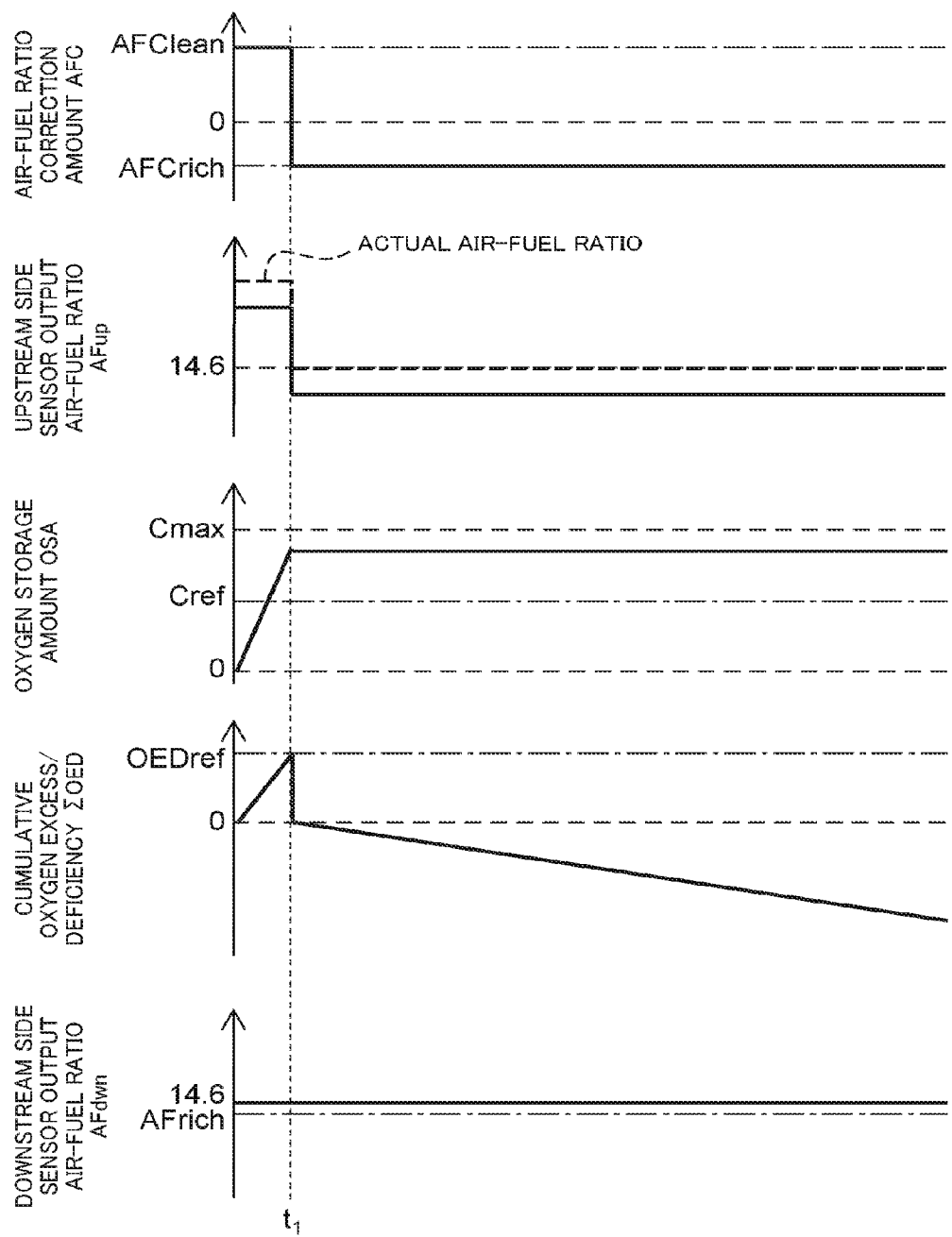
FIG. 10 is a time chart of an air-fuel ratio correction amount etc. when a large deviation occurs in an output value of an upstream side air-fuel ratio sensor.

In FIG. 10, before the time $t_1$, the air-fuel ratio correction amount AFC is set to the lean set correction amount AFClean. Along with this, the output air-fuel ratio AFup of the upstream side air-fuel ratio sensor 40 becomes the lean set air-fuel ratio. However, since the output air-fuel ratio of the upstream side air-fuel ratio sensor 40 greatly deviates to the rich side, the actual air-fuel ratio of the exhaust gas becomes an air-fuel ratio leaner than the lean set air-fuel ratio (broken line in figure).

Then, if, at the time $t_1$, the cumulative oxygen excess/deficiency ΣOED calculated based on the output air-fuel ratio AFup of the upstream side air-fuel ratio sensor 40 reaches the switching reference value OEDref, the air-fuel ratio correction amount AFC is switched to the rich set correction amount AFCrich. Along with this, the output air-fuel ratio AFup of the upstream side air-fuel ratio sensor 40 becomes an air-fuel ratio which corresponds to the rich set air-fuel ratio. However, since the output air-fuel ratio of the upstream side air-fuel ratio sensor 40 greatly deviates to the rich side, the actual air-fuel ratio of the exhaust gas becomes the stoichiometric air-fuel ratio (broken line in figure).

As a result, the oxygen storage amount OSA of the upstream side exhaust purification catalyst 20 does not change, but is maintained at a constant value. Therefore, even if a long time elapses after the air-fuel ratio correction amount AFC is switched to the rich set correction amount AFCrich, since unburned gas is not discharged from the upstream side exhaust purification catalyst 20, the output air-fuel ratio AFdwn of the downstream side air-fuel ratio sensor 41 is maintained at substantially the stoichiometric air-fuel ratio. As explained above, the air-fuel ratio correction amount AFC is switched from the rich set correction amount AFCrich to the lean set correction amount AFClean, when the output air-fuel ratio AFdwn of the downstream side air-fuel ratio sensor 41 reaches the rich judged air-fuel ratio AFrich. However, in the example shown in FIG. 10, since the output air-fuel ratio AFdwn of the downstream side air-fuel ratio sensor 41 is maintained at the stoichiometric air-fuel ratio, the air-fuel ratio correction amount AFC is maintained at the rich set correction amount AFCrich for a long time. In this regard, the above-mentioned normal learning control is predicated on the air-fuel ratio correction amount being alternately switched between the rich set correction amount AFCrich and the lean set correction amount AFClean. Therefore, when the output air-fuel ratio of the upstream side air-fuel ratio sensor 40 greatly deviates, the air-fuel ratio correction amount is not switched, and therefore the above-mentioned normal learning control cannot be performed.

Figure 11:
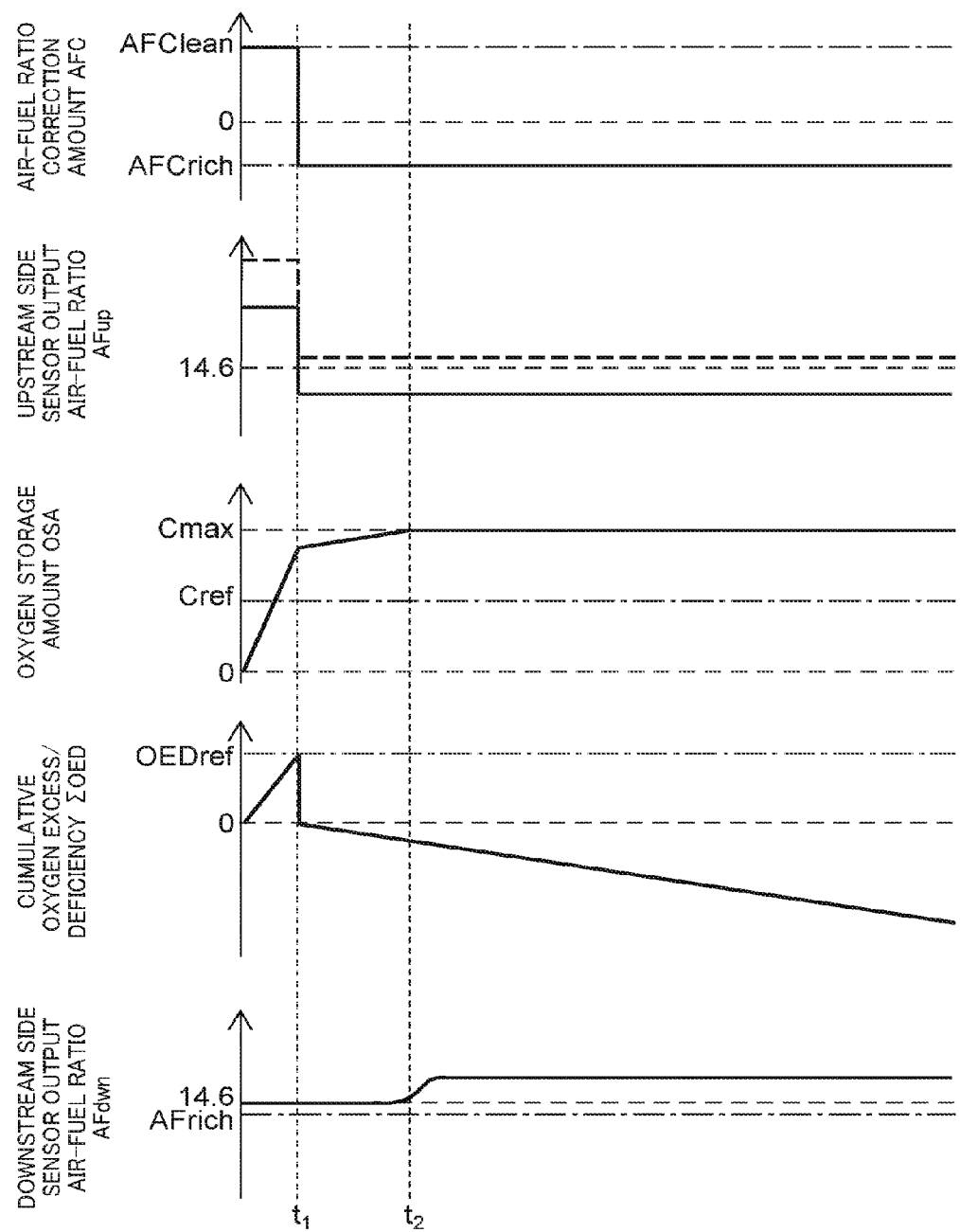
FIG. 11 is a time chart of an air-fuel ratio correction amount etc. when a large deviation occurs in an output value of an upstream side air-fuel ratio sensor.

FIG. 11 is a view similar to FIG. 10, which shows the case where the output air-fuel ratio of the upstream side air-fuel ratio sensor 40 extremely greatly deviates to the rich side. In the example shown in FIG. 11, similarly to the example shown in FIG. 10, at the time $t_1$, the air-fuel ratio correction amount AFC is switched to the rich set correction amount AFCrich. That is, at the time $t_1$, the target air-fuel ratio is set to the rich set air-fuel ratio. However, due to deviation of the output air-fuel ratio of the upstream side air-fuel ratio sensor 40, the actual air-fuel ratio of the exhaust gas becomes a lean air-fuel ratio (broken line in the figure).

As a result, nevertheless the air-fuel ratio correction amount AFC is set to the rich set correction amount AFCrich, exhaust gas of a lean air-fuel ratio flows into the upstream side exhaust purification catalyst 20. Therefore, the oxygen storage amount OSA of the upstream side exhaust purification catalyst 20 gradually increases, and finally reaches the maximum storable oxygen amount Cmax at the time $t_2$. If, in this way, the oxygen storage amount OSA reaches the maximum storable oxygen amount Cmax, the upstream side exhaust purification catalyst 20 cannot store oxygen in the exhaust gas any more. Therefore, oxygen and NOx contained in the inflowing exhaust gas flow out from the upstream side exhaust purification catalyst 20 as it is, and thus the output air-fuel ratio AFdwn of the downstream side air-fuel ratio sensor 41 raises. However, the air-fuel ratio correction amount AFC is switched from the rich set correction amount AFCrich to the lean set correction amount AFClean, when the output air-fuel ratio AFdwn of the downstream side air-fuel ratio sensor 41 reaches the rich judged air-fuel ratio AFrich. Therefore, when the output air-fuel ratio of the upstream side air-fuel ratio sensor 40 deviates extremely greatly, the air-fuel ratio correction amount AFC is not switched, and therefore the above-mentioned normal control cannot be performed.

<Stuck Learning Control>

Therefore, in the present embodiment, even if the deviation of the output air-fuel ratio of the upstream side air-fuel ratio sensor 40 is large, to compensate that deviation, in addition to the above-mentioned normal learning control, stoichiometric air-fuel ratio stuck learning control, lean stuck learning control, and rich stuck learning control are performed.

<Stoichiometric Air-Fuel Ratio Stuck Learning>

First, the stoichiometric air-fuel ratio stuck learning control will be explained. The stoichiometric air-fuel ratio stuck learning control is learning control which is performed when the air-fuel ratio detected by the downstream side air-fuel ratio sensor 41 is stuck at the stoichiometric air-fuel ratio as shown in the example shown in FIG. 10.

Figure 12:
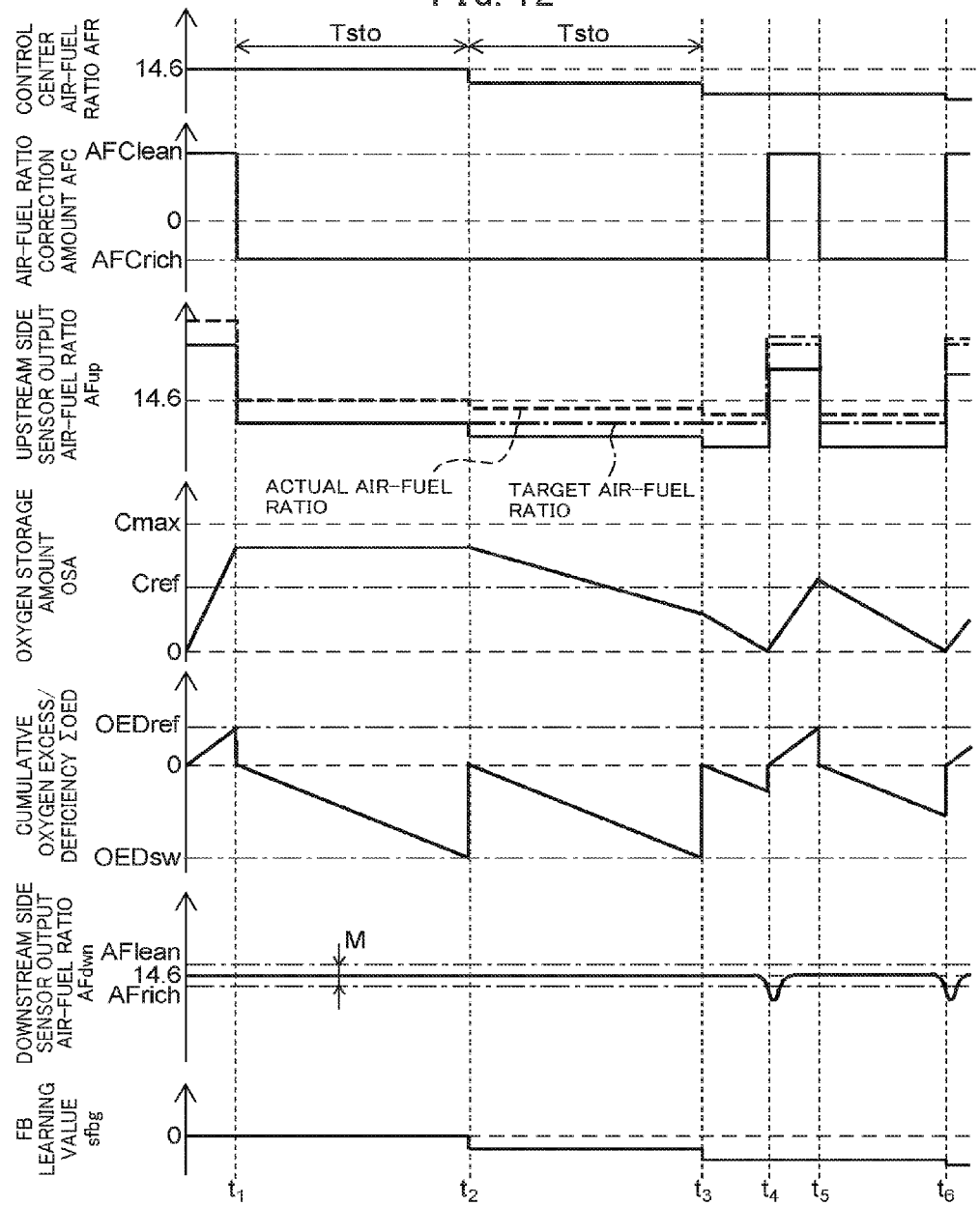
FIG. 12 is a time chart of an air-fuel ratio correction amount etc. when performing stoichiometric air-fuel ratio stuck learning.

In this regard, the region between the rich judged air-fuel ratio AFrich and the lean judged air-fuel ratio AFlean will be referred to as the "the intermediate region M". This intermediate region M corresponds to the stoichiometric air-fuel ratio proximity region which is an air-fuel ratio region between the rich judged air-fuel ratio and the lean judged air-fuel ratio. In stoichiometric air-fuel ratio-stuck learning control, after the air-fuel ratio correction amount AFC is switched to the rich set correction amount AFCrich, that is, after the target air-fuel ratio is switched to the rich set air-fuel ratio, it is judged if the output air-fuel ratio AFdwn of the downstream side air-fuel ratio sensor 41 has been maintained in the intermediate region M for a predetermined stoichiometric air-fuel ratio maintenance judgement time or more. Further, if the output air-fuel ratio AFdwn of the downstream side air-fuel ratio sensor 41 has been maintained in the intermediate region M for the stoichiometric air-fuel ratio maintenance judgement time or more, the learning value sfbg is reduced so that the air-fuel ratio of the exhaust gas flowing into the upstream side exhaust purification catalyst 20 changes to the rich side. FIG. 12 shows this state.

FIG. 12 is a view similar to FIG. 9 which shows a time chart of the air-fuel ratio correction amount AFC, etc. FIG. 12, similarly to FIG. 10, shows the case where the output air-fuel ratio AFup of the upstream side air-fuel ratio sensor 40 greatly deviates to the low side (rich side).

In the example shown in the figure, similarly to FIG. 10, before the time $t_1$, the air-fuel ratio correction amount AFC is set to the lean set correction amount AFClean. Then, at the time $t_1$, the cumulative oxygen excess/deficiency ΣOED reaches the switching reference value OEDref, and the air-fuel ratio correction amount AFC is switched to the rich set correction amount AFCrich. However, since the output air-fuel ratio of the upstream side air-fuel ratio sensor 40 greatly deviates to the rich side, similarly to the example shown in FIG. 10, the actual air-fuel ratio of the exhaust gas is substantially the stoichiometric air-fuel ratio. Therefore, after the time $t_1$, the oxygen storage amount OSA of the upstream side exhaust purification catalyst 20 is maintained at a constant value. As a result, the output air-fuel ratio AFdwn of the downstream side air-fuel ratio sensor 41 is maintained in the stoichiometric air-fuel ratio proximity, that is, intermediate region M, for a long time period.

Therefore, in the present embodiment, if the output air-fuel ratio AFdwn of the downstream side air-fuel ratio sensor 41 is maintained in the intermediate region M for the predetermined stoichiometric air-fuel ratio maintenance judgement time Tsto or more after the air-fuel ratio correction amount AFC is switched to the rich set correction amount AFCrich, the control center air-fuel ratio AFR is corrected. In particular, in the present embodiment, the learning value sfbg is updated so that the air-fuel ratio of the exhaust gas flowing into the upstream side exhaust purification catalyst 20 changes to the rich side.

Specifically, in the present embodiment, the learning value sfbg is calculated by the following formula (4), and the control center air-fuel ratio AFR is corrected by the above formula (3).

$$sfbg(n)=sfbg(n-1)+k_2 \cdot \text{AFCrich} \quad (4)$$

Note that in the above formula (3), $k_2$ is the gain which shows the extent of correction of the control center air-fuel ratio AFR ($0<k_2 \leq 1$). The larger the value of the gain $k_2$, the larger the correction amount of the control center air-fuel ratio AFR becomes.

In this regard, as explained above, if the output air-fuel ratio AFdwn of the downstream side air-fuel ratio sensor 41 is maintained in the intermediate region M for a long period of time after the air-fuel ratio correction amount AFC is switched, the actual air-fuel ratio of the exhaust gas is a value close to substantially the stoichiometric air-fuel ratio. Therefore, the deviation at the upstream side air-fuel ratio sensor 40 is the same extent as the difference between the control center air-fuel ratio (stoichiometric air-fuel ratio) and the target air-fuel ratio (in this case, the rich set air-fuel ratio). In the present embodiment, as shown in the above formula (4), the learning value sfbg is updated based on the air-fuel ratio correction amount AFC corresponding to the difference between the control center air-fuel ratio and the target air-fuel ratio. Due to this, it is possible to more suitably compensate for deviation in the output air-fuel ratio of the upstream side air-fuel ratio sensor 40.

In the example shown in FIG. 12, until the time $t_2$ at which the stoichiometric air-fuel ratio maintenance judgement time Tsto elapses from the time $t_1$, the air-fuel ratio correction amount AFC is set to the rich set correction amount AFCrich. Therefore, if formula (4) is used, at the time $t_2$, the learning value sfbg is decreased. As a result, the actual air-fuel ratio of the exhaust gas flowing into the upstream side exhaust purification catalyst 20 changes to the rich side. Due to this, after the time $t_2$, the deviation of the actual air-fuel ratio of the exhaust gas flowing into the upstream side exhaust purification catalyst 20 from the target air-fuel ratio becomes smaller compared with before the time $t_2$. Therefore, after the time $t_2$, the difference between the broken line which shows the actual air-fuel ratio and the one-dot chain line which shows the target air-fuel ratio becomes smaller than the difference before the time $t_2$.

In the example shown in FIG. 12, the gain $k_2$ is set to a relatively small value. Therefore, even if the learning value sfbg is updated at the time $t_2$, deviation of the actual air-fuel ratio of the exhaust gas flowing into the upstream side exhaust purification catalyst 20, from the target air-fuel ratio, remains. Therefore, the actual air-fuel ratio of the exhaust gas becomes an air-fuel ratio leaner than the rich set air-fuel ratio, that is, an air-fuel ratio with a small rich degree (see broken line of FIG. 12). For this reason, the decreasing speed of the oxygen storage amount OSA of the upstream side exhaust purification catalyst 20 is slow.

As a result, from the time $t_2$ to the time $t_3$ when the stoichiometric air-fuel ratio maintenance judgement time Tsto elapses, the output air-fuel ratio AFdwn of the downstream side air-fuel ratio sensor 41 is maintained in the stoichiometric air-fuel ratio proximity, i.e., intermediate region M. Therefore, in the example shown in FIG. 12, at the time $t_3$ as well, the learning value sfbg is updated by using formula (4).

Then, in the example shown in FIG. 12, at the time $t_4$, the output air-fuel ratio AFdwn of the downstream side air-fuel ratio sensor 41 becomes the rich judged air-fuel ratio AFrich or less. After the output air-fuel ratio AFdwn becomes the rich judged air-fuel ratio AFrich or less in this way, as explained above, the air-fuel ratio correction amount AFC is alternately set to the lean set correction amount AFClean and the rich set correction amount AFCrich. Along with this, the above-mentioned normal learning control is performed.

By updating the learning value sfbg by the stoichiometric air-fuel ratio stuck learning control in this way, the learning value can be updated even if the deviation of the output air-fuel ratio AFup of the upstream side air-fuel ratio sensor 40 is large. Due to this, it is possible to compensate deviation at the output air-fuel ratio of the upstream side air-fuel ratio sensor 40.

Note that in the above embodiment, the stoichiometric air-fuel ratio maintenance judgement time Tsto is a predetermined time. In this case, the stoichiometric air-fuel ratio maintenance judgement time is set to equal to or greater than the time usually taken from when switching the target air-fuel ratio to the rich air-fuel ratio to when the absolute value of the cumulative oxygen excess/deficiency ΣOED reaches the maximum storable oxygen amount of the upstream side exhaust purification catalyst 20 at the time when it is unused. Specifically, it is preferably set to two to four times of that time.

Alternatively, the stoichiometric air-fuel ratio maintenance judgement time Tsto may be changed in accordance with other parameters, such as the cumulative oxygen excess/deficiency ΣOED from when the target air-fuel ratio is switched to the rich air-fuel ratio. Specifically, for example, the greater the cumulative oxygen excess/deficiency ΣOED, the shorter the stoichiometric air-fuel ratio maintenance judgement time Tsto is set. Due to this, it is also possible to update the learning value sfbg as stated above when the cumulative oxygen excess/deficiency ΣOED from when the target air-fuel ratio is switched to the rich air-fuel ratio becomes a given amount (for example, OEDsw in FIG. 12). Further, in this case, it is necessary that the above given amount in the cumulative oxygen excess/deficiency ΣOED is set to the maximum storable oxygen amount when the upstream side exhaust purification catalyst 20 is new or more. Specifically, it is preferably set to two to four times of the maximum storable oxygen amount.

Note that, the stoichiometric air-fuel ratio stuck learning control may also be applied in the case of using the above-mentioned other control as the basic air-fuel ratio control in the same way as the case of the above-mentioned normal learning control. In this case, in stoichiometric air-fuel ratio stuck learning control, when the target air-fuel ratio is switched to the lean air-fuel ratio, then the air-fuel ratio detected by the downstream side air-fuel ratio sensor 41 is maintained in a region of air-fuel ratio near the stoichiometric air-fuel ratio over a stoichiometric air-fuel ratio maintenance judgment time Tsto or more, the learning value sfbg is increased or decreased so that the air-fuel ratio of the exhaust gas flowing into the upstream side exhaust purification catalyst 20 changes to the rich side or the lean side in accordance with the target air-fuel ratio at that time.

Therefore, summarizing these all together, in the present embodiment, it can be said that the learning means performs stoichiometric air-fuel ratio stuck learning wherein if after the target air-fuel ratio is switched to an air-fuel ratio deviated to one side of the stoichiometric air-fuel ratio (corresponding to the rich side in the example shown in FIG. 9), the air-fuel ratio detected by the downstream side air-fuel ratio sensor 41 is maintained in a region of air-fuel ratio near the stoichiometric air-fuel ratio over a stoichiometric air-fuel ratio maintenance judgment time Tsto or more, a parameter relating to an air-fuel ratio is corrected so that the air-fuel ratio of the exhaust gas flowing into the upstream side exhaust purification catalyst 20 changes to that one side in feedback control.

Further, in the above-mentioned stoichiometric air-fuel ratio stuck learning control, the learning value is updated if after the target air-fuel ratio is switched to the lean air-fuel ratio, the air-fuel ratio detected by the downstream side air-fuel ratio sensor 41 is maintained in a region of air-fuel ratio near the stoichiometric air-fuel ratio over a stoichiometric air-fuel ratio maintenance judgment time Tsto or more. However, the stoichiometric air-fuel ratio stuck learning may be performed based on other parameters other than time.

For example, when the air-fuel ratio detected by the downstream side air-fuel ratio sensor 41 ends up stuck at the stoichiometric air-fuel ratio, compared with the absolute value of the cumulative oxygen excess/deficiency in the first time period from when switching the target air-fuel ratio to the lean air-fuel ratio to when the amount of change of the oxygen storage amount becomes the switching reference amount or more or the output air-fuel ratio of the downstream side air-fuel ratio sensor 41 reaches the lean judged air-fuel ratio, that is, the first oxygen cumulative value (for example, $R_1$ of FIG. 14), the absolute value of the cumulative oxygen excess/deficiency from when switching the target air-fuel ratio to the rich air-fuel ratio (however, before the output air-fuel ratio of the downstream side air-fuel ratio sensor 41 becomes the rich judged air-fuel ratio or less), that is, the rich switched oxygen cumulative value, becomes extremely large. Therefore, when the absolute value of the cumulative oxygen excess/deficiency from when switching the target air-fuel ratio to the rich air-fuel ratio with respect to the first oxygen cumulative value becomes larger by a predetermined value or more, it is possible to update the learning value as explained above. That is, when the rich switched oxygen cumulative value minus the first oxygen cumulative value is a predetermined value or more, the above-mentioned learning value is updated.

<Rich/Lean Stuck Learning>

Figure 13:
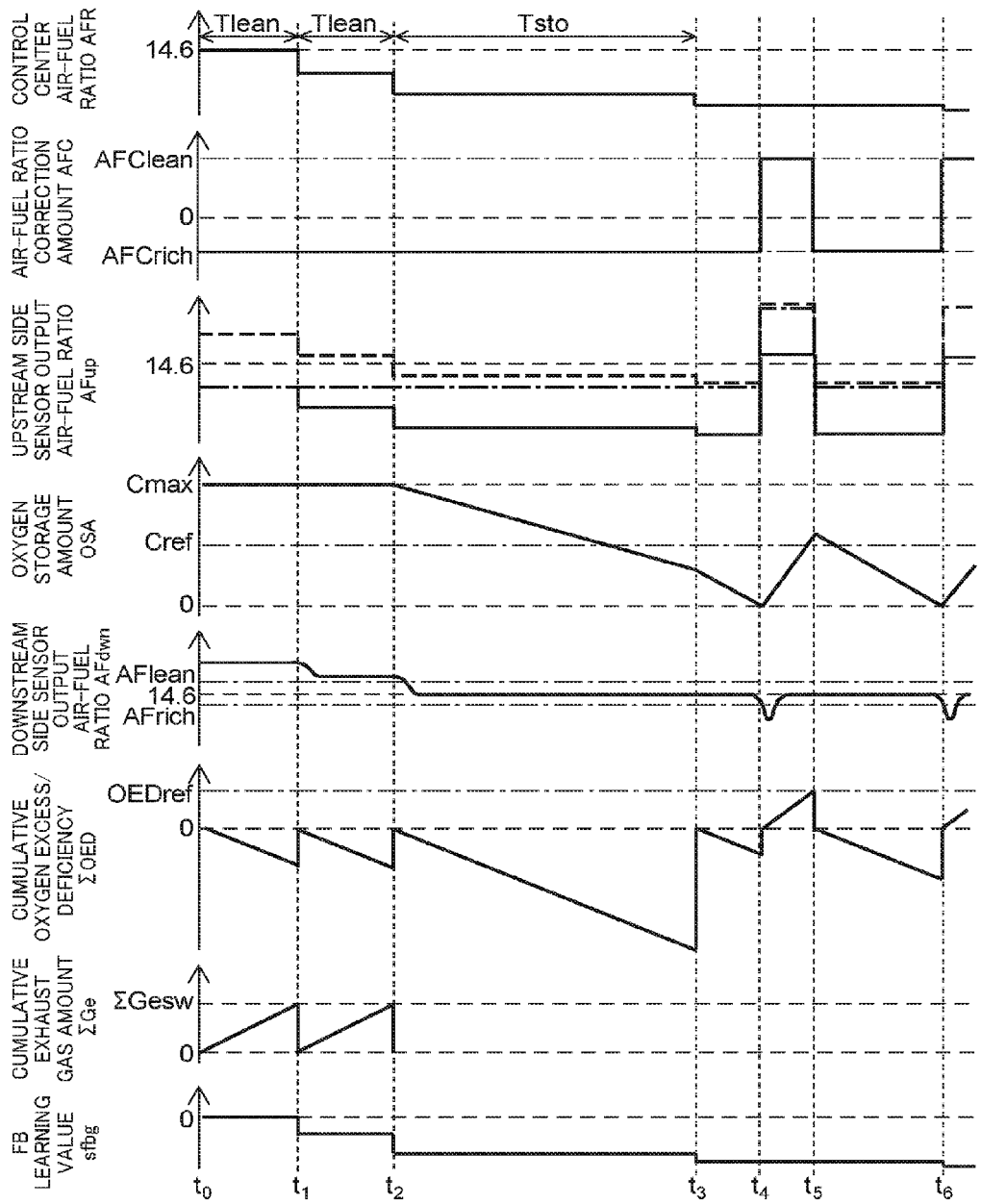
FIG. 13 is a time chart of an air-fuel ratio correction amount etc. when performing lean stuck learning etc.

Next, lean stuck learning control will be explained. The lean stuck learning control is learning control which is performed in the case where, as shown in the example of FIG. 11, although the target air-fuel ratio is set to the rich air-fuel ratio, the air-fuel ratio detected by the downstream side air-fuel ratio sensor 41 is stuck at the lean air-fuel ratio. In lean stuck learning control, it is judged if the output air-fuel ratio AFdwn of the downstream side air-fuel ratio sensor 41 has been maintained at the lean air-fuel ratio for a predetermined lean air-fuel ratio maintenance judgement time or more after the air-fuel ratio correction amount AFC is switched to the rich set correction amount AFCrich, that is, after the target air-fuel ratio is switched to the rich set air-fuel ratio. Further, when it is maintained at the lean air-fuel ratio for the lean air-fuel ratio maintenance judgement time or more, the learning value sfbg is decreased so that the air-fuel ratio of the exhaust gas flowing into the upstream side exhaust purification catalyst 20 changes to the rich side. FIG. 13 shows this state.

FIG. 13 is a view, similar to FIG. 9, which shows a time chart of the air-fuel ratio correction amount AFC, etc. FIG. 13, like FIG. 11, shows the case where the output air-fuel ratio AFup of the upstream side air-fuel ratio sensor 40 deviates extremely greatly to the low side (rich side).

In the example shown in the figure, at the time $t_0$, the air-fuel ratio correction amount AFC is switched from the lean set correction amount AFClean to the rich set correction amount AFCrich. However, since the output air-fuel ratio of the upstream side air-fuel ratio sensor 40 deviates extremely greatly to the rich side, similarly to the example shown in FIG. 11, the actual air-fuel ratio of the exhaust gas becomes the lean air-fuel ratio. Therefore, after the time $t_0$, the output air-fuel ratio AFdwn of the downstream side air-fuel ratio sensor 41 is maintained at the lean air-fuel ratio.

Therefore, in the present embodiment, when the output air-fuel ratio AFdwn of the downstream side air-fuel ratio sensor 41 has been maintained at the lean air-fuel ratio for the predetermined lean air-fuel ratio maintenance judgement time Tlean or more after the air-fuel ratio correction amount AFC is set to the rich set correction amount AFCrich, the air-fuel ratio correction amount AFC is corrected. In particular, in the present embodiment, the learning value sfbg is corrected so that the air-fuel ratio of the exhaust gas flowing into the upstream side exhaust purification catalyst 20 changes to the rich side.

Specifically, in the present embodiment, the learning value sfbg is calculated by using the following formula (5) and the control center air-fuel ratio AFR is corrected based on the learning value sfbg by using the above formula (3).

$$sfbg(n)=sfbg(n-1)+k_3\cdot(\text{AFCrich}-(\text{AFdwn}-14.6)) \quad (5)$$

Note that in the above formula (5), $k_3$ is the gain which expresses the extent of correction of the control center air-fuel ratio AFR ($0 < k_3 \leq 1$). The larger the value of the gain $k_3$, the larger the correction amount of the control center air-fuel ratio AFR.

In this regard, in the example shown in FIG. 13, when the air-fuel ratio correction amount AFC is set to the rich set correction amount AFCrich, the output air-fuel ratio AFdwn of the downstream side air-fuel ratio sensor 41 is maintained at the lean air-fuel ratio. In this case, the deviation in the upstream side air-fuel ratio sensor 40 corresponds to the difference between the target air-fuel ratio and the output air-fuel ratio of the downstream side air-fuel ratio sensor 41. If breaking this down, the deviation in the upstream side air-fuel ratio sensor 40 can be said to be of the same extent as a value acquired by adding the difference between the target air-fuel ratio and the stoichiometric air-fuel ratio (corresponding to the rich set correction amount AFCrich) to the difference between the stoichiometric air-fuel ratio and the output air-fuel ratio of the downstream side air-fuel ratio sensor 41. Therefore, in the present embodiment, as shown in the above formula (5), the learning value sfbg is updated based on the value acquired by adding the rich set correction amount AFCrich to the difference between the output air-fuel ratio of the downstream side air-fuel ratio sensor 41 and the stoichiometric air-fuel ratio. In particular, in the above-mentioned stoichiometric air-fuel ratio stuck learning, the learning value is corrected by an amount corresponding to the rich set correction amount AFCrich, while in lean stuck learning, the learning value is corrected by this amount plus a value corresponding to the output air-fuel ratio AFdwn of the downstream side air-fuel ratio sensor 41. Further, the gain $k_3$ is set to a similar extent to the gain $k_3$. Therefore, the correction amount in the lean stuck learning is larger than the correction amount in stoichiometric air-fuel ratio stuck learning.

In the example shown in FIG. 13, if the formula (5) is used, the learning value sfbg is decreased at the time $t_1$. As a result, the actual air-fuel ratio of the exhaust gas flowing into the upstream side exhaust purification catalyst 20 changes to the rich side. Due to this, after the time $t_1$, the deviation of the actual air-fuel ratio of the exhaust gas flowing into the upstream side exhaust purification catalyst 20 from the target air-fuel ratio becomes smaller, compared with before the time $t_1$. Therefore, after the time $t_1$, the difference between the broken line which shows the actual air-fuel ratio and the one-dot chain line which shows the target air-fuel ratio becomes smaller than the difference before the time $t_1$.

In FIG. 13 shows the example where the gain $k_3$ is set to relatively small value. Therefore, even if the learning value sfbg is updated at the time $t_1$, the deviation remains in the output air-fuel ratio of the upstream side air-fuel ratio sensor 40. In particular, in the example shown in the figure, the actual air-fuel ratio of the exhaust gas remains to be the lean air-fuel ratio. As a result, in the illustrated example, after the time $t_1$, the output air-fuel ratio AFdwn of the downstream side air-fuel ratio sensor is maintained at the lean air-fuel ratio for the lean air-fuel ratio maintenance judgement time Tlean. Therefore, in the example shown in FIG. 13, at the time $t_2$, due to the lean stuck learning, the learning value sfbg is corrected by using the above formula (5).

If, at the time $t_2$, the learning value sfbg is corrected, the deviation of the actual air-fuel ratio of the exhaust gas flowing into the upstream side exhaust purification catalyst 20, from the target air-fuel ratio, becomes smaller. Due to this, in the example shown in the figure, after the time $t_2$, the actual air-fuel ratio of the exhaust gas becomes slightly richer than the stoichiometric air-fuel ratio. Along with this, the output air-fuel ratio AFdwn of the downstream side air-fuel ratio sensor 41 changes from the lean air-fuel ratio to substantially the stoichiometric air-fuel ratio. In particular, in the example shown in FIG. 13, from the time $t_2$ to the time $t_3$, the output air-fuel ratio AFdwn of the downstream side air-fuel ratio sensor 41 is maintained at substantially the stoichiometric air-fuel ratio, that is, in the intermediate region M, for the stoichiometric air-fuel ratio maintenance judgement time Tsto. Therefore, at the time $t_3$, by the stoichiometric air-fuel ratio stuck learning, the learning value sfbg is corrected by using the above formula (4).

By updating the learning value sfbg in this way by lean stuck learning control, it is possible to update the learning value even if the deviation of the output air-fuel ratio AFup of the upstream side air-fuel ratio sensor 40 is extremely large. Due to this, it is possible to reduce the deviation in the output air-fuel ratio of the upstream side air-fuel ratio sensor 40.

Note that, in the above embodiment, the lean air-fuel ratio maintenance judgement time Tlean is a predetermined time. In this case, the lean air-fuel ratio maintenance judgement time Tlean is set to equal to or greater than the delayed response time of the downstream side air-fuel ratio sensor which is usually taken from when switching the target air-fuel ratio to the rich air-fuel ratio to when the output air-fuel ratio of the downstream side air-fuel ratio sensor 41 changes. Specifically, it is preferably set to two times to four times of that time. Further, the lean air-fuel ratio maintenance judgement time Tlean is shorter than the time usually taken from when switching the target air-fuel ratio to the rich air-fuel ratio to when the absolute value of the cumulative oxygen excess/deficiency ΣOED reaches the maximum storable oxygen amount of the upstream side exhaust purification catalyst 20 at the time when the catalyst is new. Therefore, the lean air-fuel ratio maintenance judgement time Tlean is set shorter than the above-mentioned stoichiometric air-fuel ratio maintenance judgement time Tsto.

Alternatively, the lean air-fuel ratio maintenance judgement time Tlean may be changed in accordance with another parameter, such as the exhaust gas flow amount which is cumulatively added from when the target air-fuel ratio is switched to the rich air-fuel ratio. Specifically, for example, the larger the cumulative exhaust gas flow amount ΣGe, the shorter the lean air-fuel ratio maintenance judgement time Tlean is set. Due to this, when the cumulative exhaust gas flow from when switching the target air-fuel ratio to the rich air-fuel ratio, becomes a given amount (for example, ΣGesw in FIG. 13), the above-mentioned learning value sfbg can be updated. Further, in this case, the given amount has to be equal to or greater than the total amount of flow of the exhaust gas which is required from when switching the target air-fuel ratio to when the output air-fuel ratio of the downstream side air-fuel ratio sensor 41 changes according to the switch. Specifically, it is preferably set to an amount of 2 to 4 times of that total flow.

Next, rich stuck learning control will be explained. The rich stuck learning control is control similar to the lean stuck learning control, and is learning control which is performed in the case where although the target air-fuel ratio is set to the lean air-fuel ratio, the air-fuel ratio detected by the downstream side air-fuel ratio sensor 41 is stuck at the rich air-fuel ratio. In rich stuck learning control, it is judged if the output air-fuel ratio AFdwn of the downstream side air-fuel ratio sensor 41 is maintained at the rich air-fuel ratio for a predetermined rich air-fuel ratio maintenance judgement time (similar to lean air-fuel ratio maintenance judgement time) or more, after switching the air-fuel ratio correction amount AFC to the lean set correction amount AFClean, i.e., after switching the target air-fuel ratio to the lean set air-fuel ratio. Further, when maintained at the rich air-fuel ratio for the rich air-fuel ratio maintenance judgement time or more, the learning value sfbg is increased so that the air-fuel ratio of the exhaust gas flowing into the upstream side exhaust purification catalyst 20 changes to the lean side. That is, in rich stuck learning control, control is performed with rich and lean reversed from the above lean stuck learning control.

<Learning Acceleration Control>

In this regard, if there is a large deviation in the output air-fuel ratio AFup of the upstream side air-fuel ratio sensor 40, to quickly eliminate this deviation, it becomes necessary to update the learning valve sfbg by learning control.

Therefore, in the present embodiment, when it is necessary to accelerate updating of the learning value sfbg by the learning control, compared to when it is not necessary to accelerate it, the rich degree of the rich set air-fuel ratio is increased. In addition, when it is necessary to accelerate the updating of the learning value sfbg by learning control, compared to when it is not necessary to accelerate it, the switching reference storage amount is decreased. Below, such control will be called "learning acceleration control".

In particular, in the present embodiment, when the difference ΔΣOED between the absolute value $R_1$ of the cumulative oxygen excess/deficiency ΣOED in the oxygen increase time period Tinc (lean oxygen cumulative value) and the absolute value $F_1$ of the cumulative oxygen excess/deficiency ΣOED in the oxygen decrease time period Tdec (rich oxygen cumulative value) is a predetermined accelerated judgment reference value or more, it is judged necessary to accelerate updating of the learning valve sfbg by learning control. In addition, in the present embodiment, when after the air-fuel ratio correction amount AFC is switched to the rich set correction amount AFCrich, that is, after the target air-fuel ratio is set to the rich set air-fuel ratio, the output air-fuel ratio AFdwn of the downstream side air-fuel ratio sensor 41 is maintained at the middle region M over a predetermined stoichiometric air-fuel ratio accelerated judgment time (preferably stoichiometric air-fuel ratio maintenance judgment time or less) or more, it is judged necessary to accelerate updating of the learning value sfbg by the learning control. Furthermore, in the present embodiment, after switching the air-fuel ratio correction amount AFC to the rich set correction amount AFCrich, when the output air-fuel ratio AFdwn of the downstream side air-fuel ratio sensor 41 is maintained at the lean air-fuel ratio over a predetermined lean air-fuel ratio maintenance judgment time or more, it is judged necessary to accelerate updating of the learning valve sfbg by learning control. In the same way, when the output air-fuel ratio AFdwn of the downstream side air-fuel ratio sensor 41 is maintained at the rich air-fuel ratio over a predetermined rich air-fuel ratio maintenance judgment time or more after switching the air-fuel ratio correction amount AFC to the lean set correction amount AFClean, it is judged necessary to accelerate updating of the learning valve sfbg by learning control.

Figure 14:
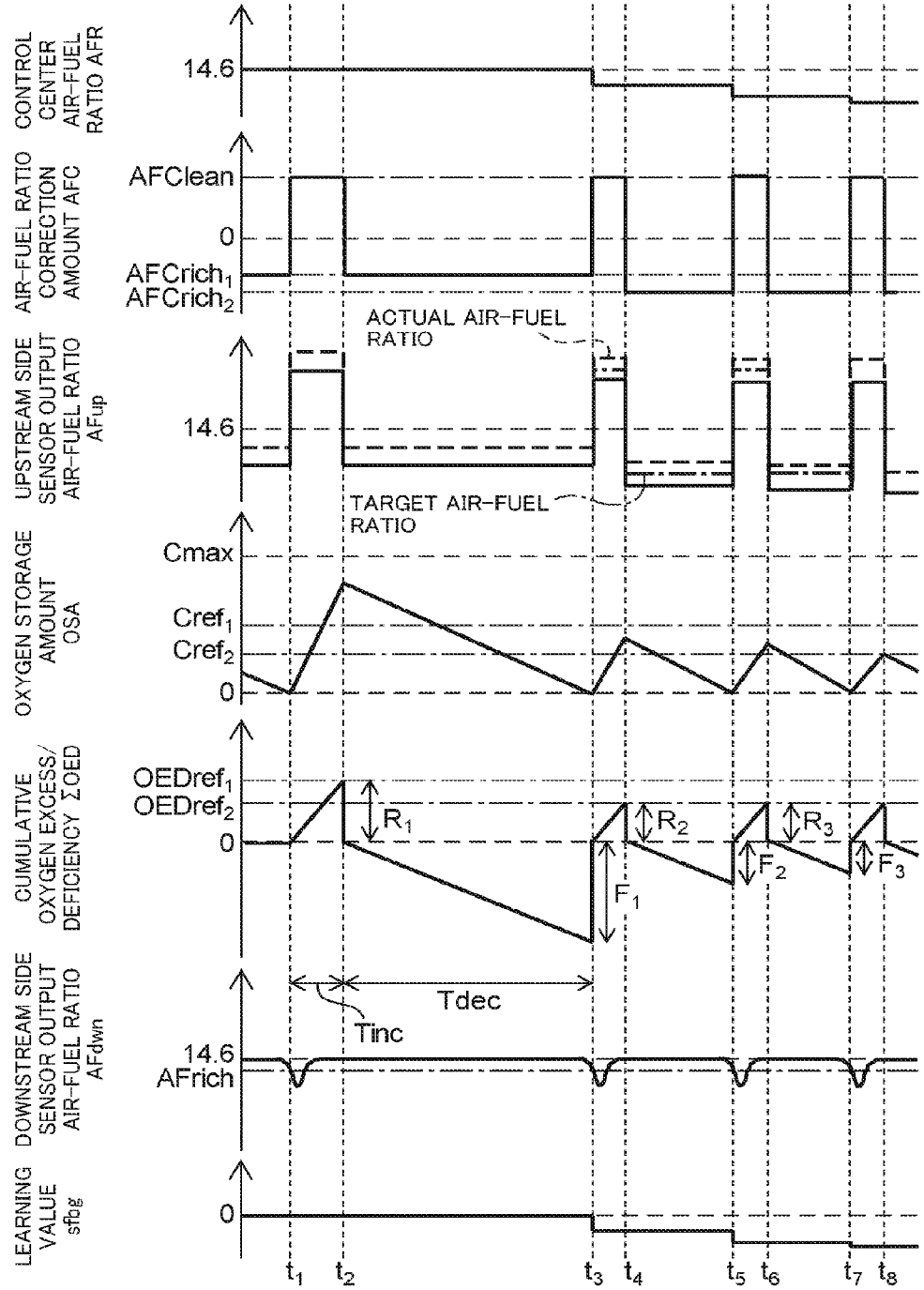
FIG. 14 is a time chart of an air-fuel ratio correction amount etc. when performing learning acceleration control.

FIG. 14 is a time chart of the control center air-fuel ratio AFR, air-fuel ratio correction amount AFC, output air-fuel ratio AFup of the upstream side air-fuel ratio sensor 40, oxygen storage amount OSA of the upstream side exhaust purification catalyst 20, cumulative oxygen excess/deficiency ΣOED, output air-fuel ratio AFdwn of the downstream side air-fuel ratio sensor 41, and learning value sfbg similar to FIG. 9 etc. FIG. 14, in the same way as FIG. 9 etc., shows the case where the output air-fuel ratio AFup of the upstream side air-fuel ratio sensor 4 deviates to the lean side (rich side).

In the illustrated example, in the state before the time $t_1$, the control center air-fuel ratio is made the stoichiometric air-fuel ratio while the air-fuel ratio correction amount AFC is made a rich set correction amount $AFCrich_1$ (value of same extent as the rich set correction amount AFCrich of example shown in FIG. 9). At this time, the output air-fuel ratio AFup of the upstream side air-fuel ratio sensor 40 becomes an air-fuel ratio corresponding to the rich set air-fuel ratio. However, due to the deviation of the output air-fuel ratio of the upstream side air-fuel ratio sensor 40, the actual air-fuel ratio of the exhaust gas becomes an air-fuel ratio leaner than the rich set air-fuel ratio (broken line in FIG. 14).

In the example shown in FIG. 14, at the time $t_1$ to the time $t_3$, similar control to the example shown in FIG. 9 is performed. Therefore, at the time $t_1$ when the output air-fuel ratio AFdwn of the downstream side air-fuel ratio sensor 41 reaches the rich judged air-fuel ratio AFrich, the air-fuel ratio correction amount AFC is switched to the lean set correction amount AFClean. After that, at the time $t_2$ when the cumulative oxygen excess/deficiency ΣOED reaches the switching reference value $OEDref_1$ (value of same extent as the switching reference value OEDref shown in FIG. 9), the air-fuel ratio correction amount AFC is switched to the rich set correction amount $AFCrich_1$. After that, the output air-fuel ratio AFdwn of the downstream side air-fuel ratio sensor 41 again reaches the rich judged air-fuel ratio AFrich.

At this time, the absolute value of the cumulative oxygen excess/deficiency ΣOED in the oxygen increase time period Tinc (the time $t_1$ to the time $t_2$) is calculated as $R_1$. In the same way, the absolute value of the cumulative oxygen excess/deficiency ΣOED in the oxygen decrease time period Tdec (time $t_2$ to the time $t_3$) is calculated as $F_1$. Further, in the example shown in FIG. 14, the difference (excess/deficiency error) ΔΣOED between the absolute value $R_1$ of the cumulative oxygen excess/deficiency in the oxygen increase time period Tinc and the absolute value $F_1$ of the cumulative oxygen excess/deficiency in the oxygen decrease time period Tdec is a predetermined accelerated judgment reference value or more. For this reason, in the example shown in FIG. 14, at the time $t_3$, it is judged that the updating of the learning value sfbg by the learning control has to be accelerated.

Therefore, in the present embodiment, at the time $t_3$, learning acceleration control started. Specifically, at the time $t_3$, the rich set correction amount AFCrich is increased from $AFCrich_1$ to $AFCrich_2$ and accordingly the rich degree of the rich set air-fuel ratio is made to increase. In addition, at the time $t_3$, the switching reference storage amount Cref is decreased from $Cref_1$ to $Cref_2$. Along with this, the switching reference value OEDref is also decreased from $OEDref_1$ corresponding to $Cref_1$ to $OEDref_2$ corresponding to $Cref_2$.

Further, in the present embodiment, in the same way as the example shown in FIG. 9, at the time $t_3$, the learning value sfbg is updated by the above formula (2) and the control center air-fuel ratio AFR is corrected by the above formula (3). As a result, at the time $t_3$, the learning value sfbg is decreased and the control center air-fuel ratio AFR is corrected to the rich side.

If, at the time $t_3$, the air-fuel ratio correction amount AFC is switched to the lean set correction amount AFClean, the oxygen storage amount OSA of the upstream side exhaust purification catalyst 20 increases. Along with this, the cumulative oxygen excess/deficiency ΣOED also increases. Further, if the cumulative oxygen excess/deficiency ΣOED reaches the decreased switching reference value $OEDref_2$, the air-fuel ratio correction amount AFC is switched to the increased rich set correction amount $AFCrich_2$ (time $t_4$). Here, at the time $t_3$ on, the switching reference value OEDref is decreased to $ΣOEDref_2$. For this reason, the time from when the air-fuel ratio correction amount AFC is switched to the lean set correction amount AFClean at the time $t_3$ to when the cumulative oxygen excess/deficiency ΣOED reaches the switching reference value $OEDref_2$ at the time $t_4$ becomes shorter.

After that, if, at the time $t_4$, the air-fuel ratio correction amount AFC is switched to the rich set correction amount $AFCrich_2$, the oxygen storage amount OSA of the upstream side exhaust purification catalyst 20 decreases. As a result, at the time $t_5$, the output air-fuel ratio AFdwn of the downstream side air-fuel ratio sensor 41 reaches the rich judged air-fuel ratio AFrich. Here, at the time $t_3$ on, the rich set correction amount AFCrich is increased to $AFCrich_2$. For this reason, the speed of decrease of the oxygen storage amount OSA of the upstream side exhaust purification catalyst 20 becomes faster. As a result, the time from when the air-fuel ratio correction amount AFC is switched to the rich set correction amount $AFCrich_2$ at the time $t_4$ to when the output air-fuel ratio AFdwn of the downstream side air-fuel ratio sensor 41 reaches the rich judged air-fuel ratio AFrich at the time $t_5$ becomes shorter.

At the time $t_5$, the learning value sfbg is updated in the same way as the example shown in FIG. 9. That is, the time $t_3$ to the time $t_4$ correspond to the oxygen increase time period Tinc. Accordingly, the absolute value of the cumulative oxygen excess/deficiency ΣOED during this time is expressed by $R_2$ at FIG. 14. Further, the time $t_4$ to the time $t_5$ corresponds to the oxygen decrease time period Tdec. Accordingly, the absolute value of the cumulative oxygen excess/deficiency ΣOED during this time is expressed by $F_2$ at FIG. 14. Further, the learning value sfbg is updated based on the difference $\Delta\Sigma OED (=R_2-F_2)$ of these absolute values $R_2$ and $F_2$ using the above formula (2). In the present embodiment, at the time $t_5$ on as well, similar control is repeated. Due to this, the learning value sfbg is repeatedly updated.

After that, the learning acceleration control is made to end after the cycle from when the output air-fuel ratio AFdwn of the downstream side air-fuel ratio sensor 41 reaches the rich judged air-fuel ratio AFrich or less to when it again reaches the rich judged air-fuel ratio AFrich or less (for example, the time $t_3$ to $t_5$ of FIG. 14) is repeated a predetermined number of times. Alternatively, the learning acceleration control may be made to end after a predetermined time has elapsed from the start of the learning acceleration control. If the learning acceleration control is made to end, the rich set correction amount AFCrich is decreased from $AFCrich_2$ to $AFCrich_1$. Accordingly, the rich degree of the rich set air-fuel ratio is decreased. Further, the switching reference value OEDref is increased from $OEDref_2$ to $OEFref_1$.

Here, as explained above, when learning acceleration control is performed, the switching reference value OEDref is decreased to $OEDref_2$, whereby the time from the time $t_3$ to the time $t_4$ becomes shorter. In the same way, by increasing the rich set correction amount AFCrich to increase the rich degree of the rich set air-fuel ratio, the time from the time $t_4$ to the time $t_5$ becomes shorter. Therefore, if considering these together, the time from the time $t_3$ to the time $t_5$ becomes shorter. On the other hand, as explained above, to update the learning value sfbg, a cycle including the oxygen increase time period Tinc and the oxygen decrease time period Tdec becomes necessary. Therefore, in the present embodiment, it is possible to shorten the time of the one cycle required for updating the learning value sfbg (for example, from the time $t_3$ to the time $t_5$) and possible to accelerate updating of the learning value.

Further, as the method of accelerating updating of the learning value, increasing the gains $k_1$, $k_2$, and $k_3$ in the above formulas (2), (4), and (5) may be considered. However, these gains $k_1$, $k_2$, and $k_3$ are usually set to values where the learning value sfbg will quickly be determined to the optimum value. Therefore, if increasing these gains $k_1$, $k_2$, and $k_3$, the determination of the learning value sfbg will end up being delayed. As opposed to this, by changing the switching reference value OEDref and rich set correction amount AFCrich, these gains $k_1$, $k_2$, and $k_3$ are not changed, so delay in the determination of the learning value sfbg is suppressed.

Note that, in the above embodiment, in the learning acceleration control, the switching reference value OEDref is decreased and the rich set correction amount AFCrich is increased. However, in learning acceleration control, these do not necessarily have to be simultaneously performed. Therefore, when performing learning acceleration control, compared with when not performing learning acceleration control, it is also possible to decrease just the switching reference value OEDref and not change the rich set correction amount AFCrich. Alternatively, during learning acceleration control, compared with when not performing learning acceleration control, it is also possible to increase just the rich set correction amount AFCrich and not change the switching reference value OEDref.

Further, in the above embodiment, the lean set correction amount AFCrich is not changed from when learning acceleration control is not performed even when learning acceleration control is performed, and is maintained at the same value when learning acceleration control is not performed. Here, even if performing the control such as shown in FIG. 5, unintentionally due to some sort of reason, the oxygen storage amount OSA of the upstream side exhaust purification catalyst 20 will sometimes end up reaching the maximum storable oxygen amount Cmax and exhaust gas of a lean air-fuel ratio will flow out from the upstream side exhaust purification catalyst 20. If making the lean set correction amount AFCrich increase, that is, if making the lean degree of the lean set air-fuel ratio larger, in such a case, the amount of $NO_x$ contained in the outflowing exhaust gas ends up becoming greater. For this reason, in the above embodiment, even during learning acceleration control, the lean set correction amount AFCrich is not increased.

However, when learning acceleration control is performed, if making the lean set correction amount AFCrich increase, that is, if making the lean degree of the lean set air-fuel ratio larger, it is possible to accelerate the updating of the learning value sfbg. For this reason, from the viewpoint of accelerating updating of the learning value sfbg, it is also possible to increase the lean set correction amount AFCrich during learning acceleration control.

Further, in the above embodiment, even when learning acceleration control is performed, the gains $k_1$, $k_2$, and $k_3$ in the above formulas (2), (4), and (5) are not changed. However, when learning acceleration control is performed, compared to when learning acceleration control is not performed, the gains $k_1$, $k_2$, and $k_3$ can be increased. In this case as well, in the present embodiment, when learning acceleration control is performed, the switching reference value and rich set correction amount are changed, so compared with when increasing only the gains $k_1$, $k_2$, and $k_3$, the extents of increasing the gains $k_1$, $k_2$, and $k_3$ are kept low. Therefore, a delay in determination of the learning value sfbg is suppressed.

<Explanation of Specific Control>

Figure 15:
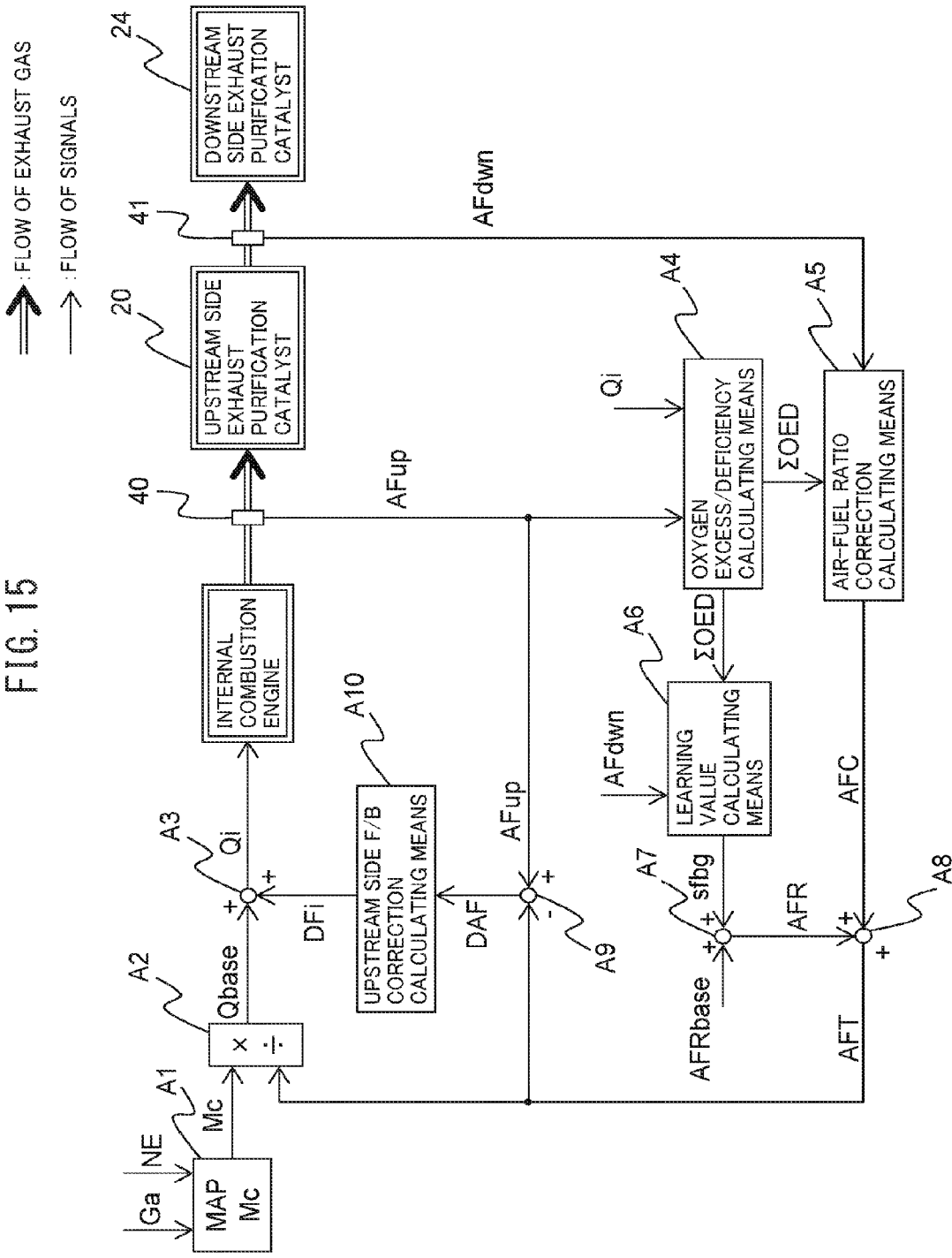
FIG. 15 is a functional block diagram of a control system.

Next, referring to FIG. 15 to FIG. 19, the control system in the present embodiment will be specifically explained. The control system in the present embodiment, as shown in the functional block diagram of FIG. 15, is comprised of functional blocks A1 to A11. Below, referring to FIG. 15, the functional blocks will be explained. The operations of these functional blocks A1 to A11 are basically performed by the ECU 31.

<Calculation of Fuel Injection Amount>

First, the calculation of the fuel injection amount will be explained. In calculating the fuel injection amount, the cylinder intake air calculating means A1, base fuel injection calculating means A2, and fuel injection calculating means A3 are used.

The cylinder intake air calculating means A1 calculates the intake air amount Mc to the cylinders based on the intake air flow Ga, engine speed NE, and maps or calculation formulas stored in the ROM 34 of the ECU 31. The intake air flow Ga is measured by the air flowmeter 39, while the engine speed NE is calculated based on the output of the crank angle sensor 44.

The base fuel injection amount calculating means A2 divides the cylinder intake air amount Mc calculated by the cylinder intake air calculating means A1 by the target air-fuel ratio AFT to thereby calculate the base fuel injection amount Qbase (Qbase=Mc/AFT). The target air-fuel ratio AFT is calculated by a later explained target air-fuel ratio setting means A8.

The fuel injection amount calculating means A3 adds the later explained feedback correction amount DQi to the base fuel injection amount Qbase calculated by the base fuel injection calculating means A2 to calculate the fuel injection amount Qi (Qi=Qbase+DQi). Each fuel injector 11 is instructed to perform an injection action so that fuel of the thus calculated fuel injection amount Qi is injected from the fuel injector 11.

<Calculation of Target Air-Fuel Ratio>

Next, the calculation of the target air-fuel ratio will be explained. In calculating the target air-fuel ratio, the oxygen excess/deficiency calculating means A4, air-fuel ratio correction calculating means A5, learning value calculating means A6, control center air-fuel ratio calculating means A7, and target air-fuel ratio setting means A8 are used.

The oxygen excess/deficiency calculating means A4 calculates the cumulative oxygen excess/deficiency $\Sigma OED$ based on the amount of fuel injection Qi calculated by the fuel injection calculating means A3 and the output air-fuel ratio AFup of the upstream side air-fuel ratio sensor 40. The oxygen excess/deficiency calculating means A4, for example, multiplies the difference of the output air-fuel ratio of the upstream side air-fuel ratio sensor 40 and the control center air-fuel ratio with the amount of fuel injection Qi and cumulatively adds the found values to calculate the cumulative oxygen excess/deficiency $\Sigma OED$.

In the air-fuel ratio correction calculating means A5, the air-fuel ratio correction amount AFC of the target air-fuel ratio is calculated based on the cumulative oxygen excess/deficiency $\Sigma OED$ calculated by the oxygen excess/deficiency calculating means A4 and the output air-fuel ratio AFdwn of the downstream side air-fuel ratio sensor 41. Specifically, the air-fuel ratio correction amount AFC is calculated based on the flow chart shown in FIG. 16 and the flow chart shown in FIG. 19.

In the learning value calculating means A6, the learning value sfbg is calculated based on the output air-fuel ratio AFdwn of the downstream side air-fuel ratio sensor 41, the cumulative oxygen excess/deficiency $\Sigma OED$ calculated by the oxygen excess/deficiency calculating means A4, etc. Specifically, the learning value sfbg is calculated based on the flow chart of normal learning control shown in FIG. 17 and the flow chart of stuck learning control shown in FIG. 18. The learning value sfbg calculated in this way is stored in a storage medium in the RAM 33 of the ECU 31 which is not erased even if the ignition switch of a vehicle carrying the internal combustion engine is turned off.

At the control center air-fuel ratio calculating means A7, the control center air-fuel ratio AFR is calculated based on the base control center air-fuel ratio AFRbase (for example, stoichiometric air-fuel ratio) and learning value sfbg calculated by the learning value calculating means A6. Specifically, as shown by the above-mentioned formula (3), the learning value sfbg is added to the base control center air-fuel ratio AFRbase to calculate the control center air-fuel ratio AFR.

The target air-fuel ratio setting means A8 adds the air-fuel ratio correction amount AFC calculated by the air-fuel ratio correction calculating means A5 to the control center air-fuel ratio AFR calculated by the control center air-fuel ratio calculating means A7 to thereby calculate the target air-fuel ratio AFT. The thus calculated target air-fuel ratio AFT is input into the base fuel injection calculating means A2 and the later explained air-fuel ratio difference calculating means A9.

<Calculation of Feedback Correction Amount>

Next, the calculation of the feedback correction amount based on the output air-fuel ratio AFup of the upstream side air-fuel ratio sensor 40 will be explained. In calculating the feedback correction amount, an air-fuel ratio difference calculating means A9 and a feedback correction calculating means A10 are used.

The air-fuel ratio difference calculating means A9 subtracts the target air-fuel ratio AFT calculated by the target air-fuel ratio setting means A8 from the output air-fuel ratio AFup of the upstream side air-fuel ratio sensor 40 to thereby calculate the air-fuel ratio difference DAF (DAF=AFup− AFT). This air-fuel ratio difference DAF is a value expressing the excess/deficiency of the amount of feed of fuel with respect to the target air-fuel ratio AFT.

The feedback correction calculating means A10 processes the air-fuel ratio difference DAF calculated by the air-fuel ratio difference calculating means A9 by proportional-integral-differential processing (PID processing) to thereby calculate the feedback correction amount DFi for compensating for the excess/deficiency of the amount of feed of fuel based on the following formula (6). The feedback correction amount DFi calculated in this way is input to the fuel injection calculating means A3.

$$DFi = Kp \cdot DAF + Ki \cdot SDAF + Kd \cdot DDAF \quad (6)$$

Note that, in the above formula (6), Kp is a preset proportional gain (proportional constant), Ki is a preset integral gain (integral constant), and Kd is a preset differential gain (differential constant). Further, DDAF is the time differential value of the air-fuel ratio difference DAF and is calculated by dividing the difference between the currently updated air-fuel ratio difference DAF and the previously updated air-fuel ratio difference DAF by the time corresponding to the updating interval. Further, SDAF is the time integrated value of the air-fuel ratio difference DAF. This time integrated value DDAF is calculated by adding the currently updated air-fuel ratio difference DAF to the previously updated time integrated value DDAF (SDAF=DDAF+DAF).

<Flow Chart of Control for Calculating Air-Fuel Ratio Correction Amount>

Figure 16:
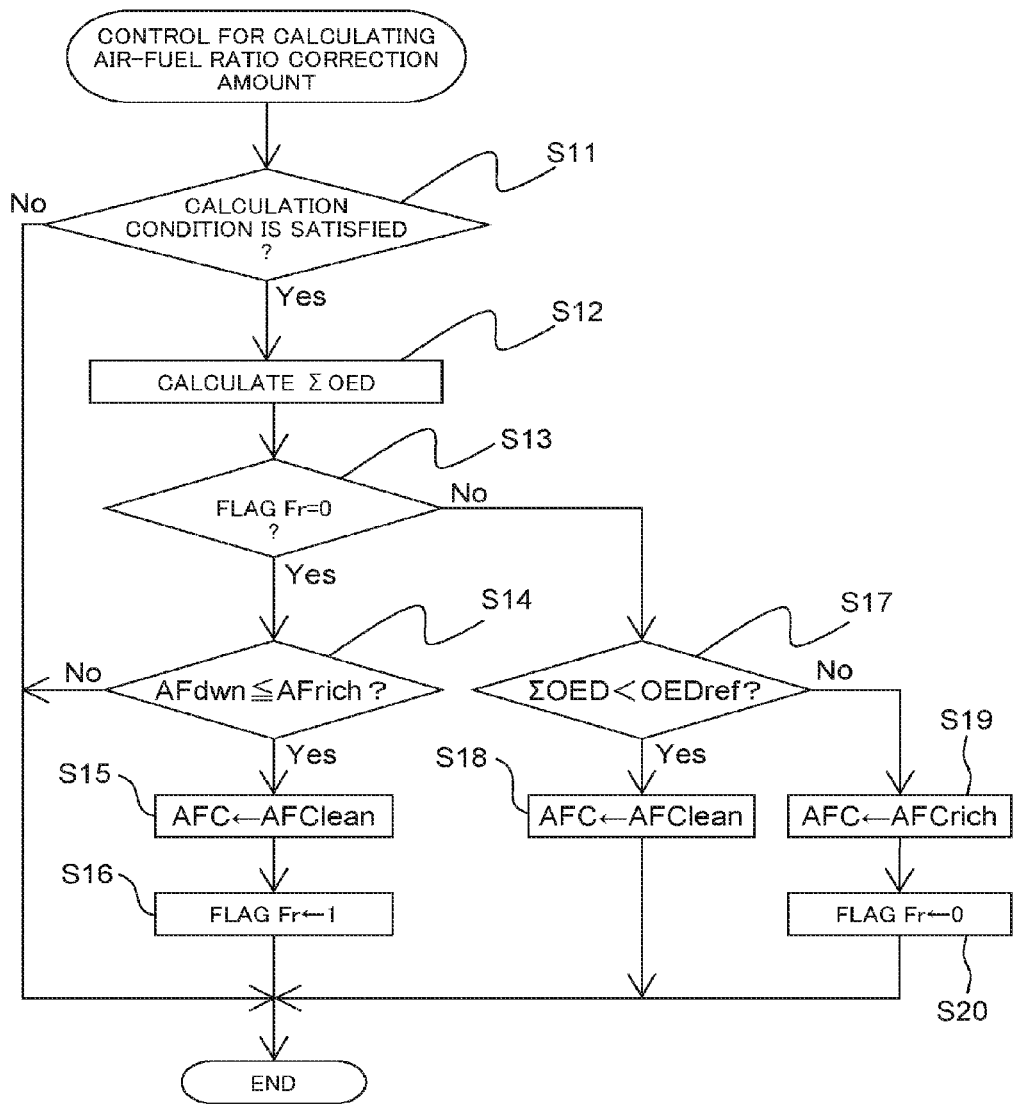
FIG. 16 is a flow chart showing a control routine of control for calculating an air-fuel ratio correction amount.

FIG. 16 is a flow chart showing the control routine for control for calculating the air-fuel ratio correction amount AFC. The illustrated control routine is performed by interruption at certain time intervals.

As shown in FIG. 16, first, at step S11, it is judged if the condition for calculating the air-fuel ratio correction amount AFC is satisfied. As the case where the condition for calculating the air-fuel ratio correction amount AFC is satisfied, being in the middle of normal control where feedback control is performed, for example, not being in the middle of fuel cut control etc. may be mentioned. If, at step S11, it is judged that the condition for calculating the target air-fuel ratio is satisfied, the routine proceeds to step S12. At step S12, the cumulative oxygen excess/deficiency ΣOED is calculated based on the output air-fuel ratio AFup of the upstream side air-fuel ratio sensor 40 and the amount of fuel injection Qi.

Next, at step S13, it is judged if the lean set flag Fr is set to "0". The lean set flag Fr is set to "1" if the air-fuel ratio correction amount AFC is set to the lean set correction amount AFClean and is set to "0" otherwise. If, at step S13, the lean set flag Fr is set to "0", the routine proceeds to step S14. At step S14, it is judged if the output air-fuel ratio AFdwn of the downstream side air-fuel ratio sensor 41 is the rich judged air-fuel ratio AFrich or less. If it is judged that the output air-fuel ratio AFdwn of the downstream side air-fuel ratio sensor 41 is larger than the rich judged air-fuel ratio AFrich, the control routine is made to end.

On the other hand, if the oxygen storage amount OSA of the upstream side exhaust purification catalyst 20 decreases and the air-fuel ratio of the exhaust gas flowing out from the upstream side exhaust purification catalyst 20 falls, at step S14, it is judged that the output air-fuel ratio AFdwn of the downstream side air-fuel ratio sensor 41 is the rich judged air-fuel ratio AFrich or less. In this case, the routine proceeds to step S15 where the air-fuel ratio correction amount AFC is made the lean set correction amount AFClean. Next, at step S16, the lean set flag Fr is set to "1", and the control routine is made to end.

At the next control routine, at step S13, it is judged that the lean set flag Fr is not set to "0" and the routine proceeds to step S17. At step S17, it is judged if the cumulative oxygen excess/deficiency ΣOED calculated at step S12 is smaller than the judgment reference value OEDref. If it is judged that the cumulative oxygen excess/deficiency ΣOED is smaller than the judgment reference value OEDref, the routine proceeds to step S18 where the air-fuel ratio correction amount AFC continues to be made the lean set correction amount AFClean. On the other hand, if the oxygen storage amount of the upstream side exhaust purification catalyst 20 increases, finally, at step S17, it is judged that the cumulative oxygen excess/deficiency ΣOED is the judgment reference value OEDref or more and the routine proceeds to step S19. At step S19, the air-fuel ratio correction amount AFC is made the rich set correction amount AFCrich, next, at step S20, the lean set flag Fr is reset to "0" and the control routine is made to end.

<Flow Chart of Normal Learning Control>

Figure 17:
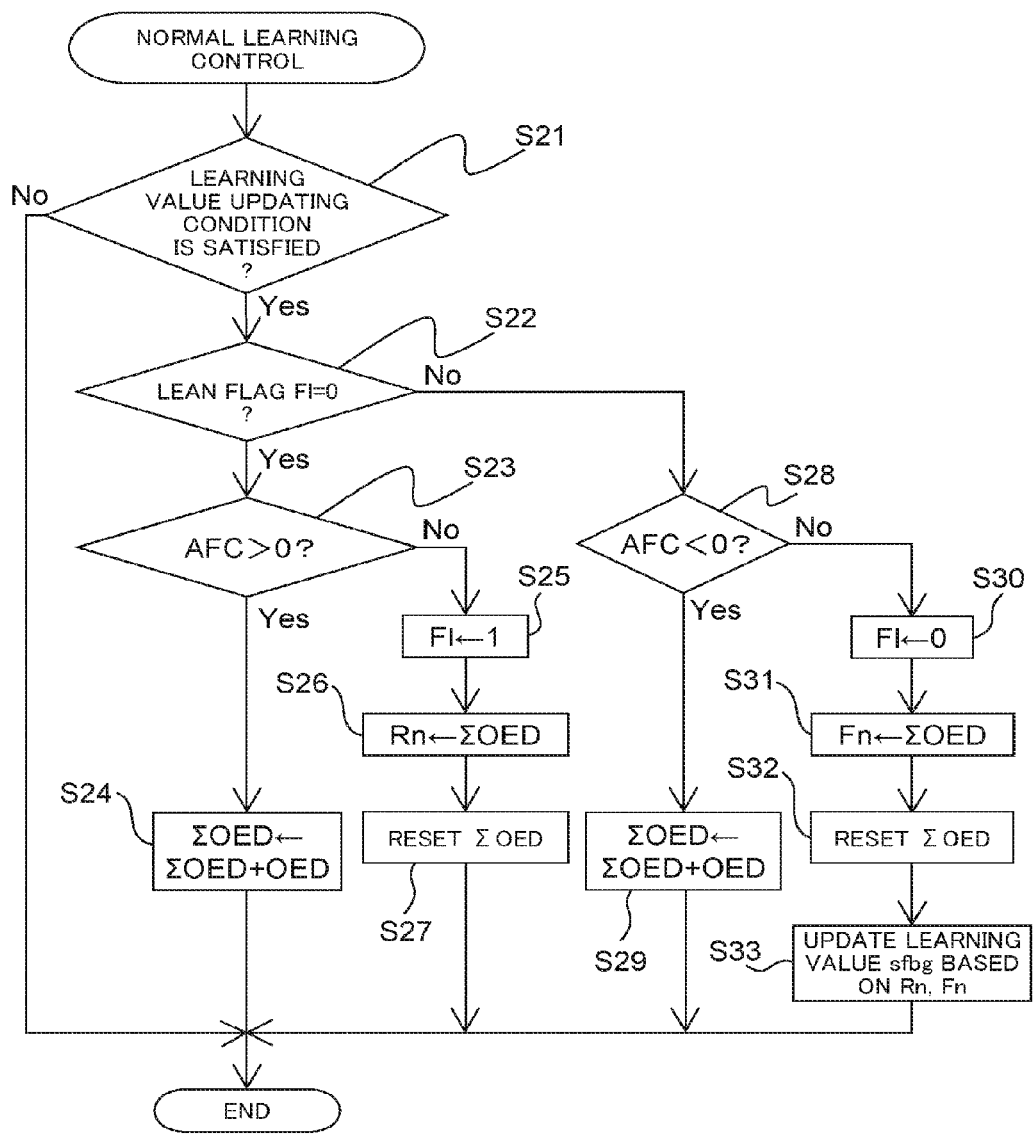
FIG. 17 is a flow chart showing a control routine of normal learning control.

FIG. 17 is a flow chart showing the control routine of normal learning control. The illustrated control routine is performed by interruption at certain time intervals.

As shown in FIG. 17, first, at step S21, it is judged if the condition for updating the learning value sfbg is satisfied. As the case where the condition for updating is satisfied, for example, being in the middle of normal control etc. may be mentioned. If, at step S21, it is judged that the condition for updating the learning value sfbg is satisfied, the routine proceeds to step S22. At step S22, it is judged if the lean flag Fl is set to "0". If, at step S22, it is judged that the lean flag Fl is set to "0", the routine proceeds to step S23.

At step S23, it is judged if the air-fuel ratio correction amount AFC is larger than "0", that is, it is judged if the target air-fuel ratio is the lean air-fuel ratio. If, at step S23, it is judged that the air-fuel ratio correction amount AFC is larger than "0", the routine proceeds to step S24. At step S24, the cumulative oxygen excess/deficiency ΣOED is increased by addition of the oxygen excess/deficiency OED.

After that, if the target air-fuel ratio is switched to the rich air-fuel ratio, at the next control routine, at step S23, it is judged that the air-fuel ratio correction amount AFC is "0" or less and the routine proceeds to step S25. At step S25, the lean flag Fl is set to "1", next, at step S26, Rn is made the absolute value of the current cumulative oxygen excess/deficiency ΣOED. Next, at step S27, the cumulative oxygen excess/deficiency ΣOED is reset to "0", and the control routine is made to end.

On the other hand, if the lean flag Fl is set to "1", at the next control routine, the routine proceeds from step S22 to step S28. At step S28, it is judged if the air-fuel ratio correction amount AFC is smaller than "0", that is, it is judged if the target air-fuel ratio is a rich air-fuel ratio. If, at step S28, it is judged that the air-fuel ratio correction amount AFC is smaller than "0", the routine proceeds to step S29. At step S29, the current oxygen excess/deficiency OED is added to the cumulative oxygen excess/deficiency ΣOED.

After that, if the target air-fuel ratio is switched to the lean air-fuel ratio, at the next control routine, it is judged at step S28 that the air-fuel ratio correction amount AFC is 0 or more and the routine proceeds to step S30. At step S30, the lean flag Fl is set to "0", next, at step S31, Fn is made the current absolute value of the cumulative oxygen excess/deficiency ΣOED. Next, at step S32, the cumulative oxygen excess/deficiency ΣOED is reset to 0. Next, at step S33, the learning value sfbg is updated based on the Rn calculated at step S26 and the Fn calculated at step S31, and the control routine is made to end.

<Flow Chart of Stuck Learning Control>

Figure 18:
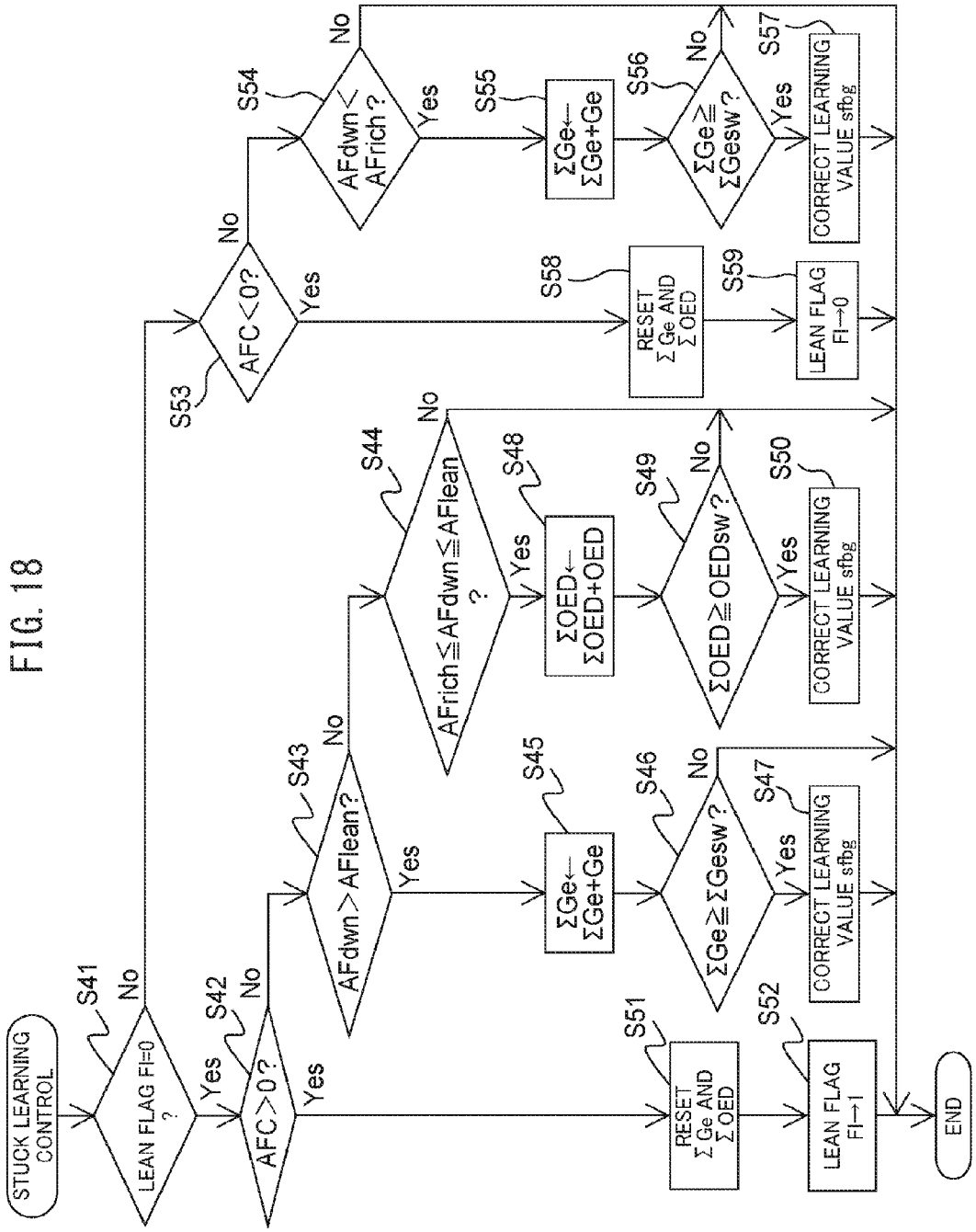
FIG. 18 is a flow chart showing a control routine of stuck learning control.

FIG. 18 is a flow chart showing the control routine of stuck learning control (stoichiometric air-fuel ratio stuck control, rich stuck control, and lean stuck control). The illustrated control routine is performed by interruption at certain time intervals.

As shown in FIG. 18, first, at step S41, it is judged if the lean flag Fl is set to "0". When, at step S41, it is judged that the lean flag Fl is set to "0", the routine proceeds to step S42. At step S42, it is judged if the air-fuel ratio correction amount AFC is larger than 0, that is, if the target air-fuel ratio is the lean air-fuel ratio. If, at step S42, it is judged that the air-fuel ratio correction amount AFC is 0 or less, the routine proceeds to step S43.

At step S43, it is judged if the output air-fuel ratio AFdwn of the downstream side air-fuel ratio sensor 41 is larger than the lean judged air-fuel ratio AFlean. At step S44, it is judged if the output air-fuel ratio AFdwn is a value between the rich judged air-fuel ratio AFrich and the lean judged air-fuel ratio AFlean. If, at steps S43 and S44, it is judged that the output air-fuel ratio AFdwn is smaller than the rich judged air-fuel ratio AFrich, that is, if it is judged that the output air-fuel ratio is a rich air-fuel ratio, the control routine is made to end. On the other hand, if, at steps S43 and S44, it is judged that the output air-fuel ratio AFdwn is larger than the lean judged air-fuel ratio AFlean, that is, if it is judged that the output air-fuel ratio is a lean air-fuel ratio, the routine proceeds to step S45.

At step S45, the cumulative exhaust gas flow ΣGe plus the current exhaust gas flow Ge is made the new cumulative exhaust gas flow ΣGe. Note that, the exhaust gas flow Ge is, for example, calculated based on the output of the air flowmeter 39 etc. Next, at step S46, it is judged if the cumulative exhaust gas flow ΣGe calculated at step S45 is a predetermined amount ΣGesw or more. If, at step S46, it is judged that ΣGe is smaller than ΣGesw, the control routine is made to end. On the other hand, if the cumulative exhaust gas flow ΣGe increases and, at step S46, it is judged that ΣGe is ΣGesw or more, the routine proceeds to step S47. At step S47, the above-mentioned formula (5) is used to correct the learning value sfbg.

On the other hand, when at steps S43 and S44 it is judged that the output air-fuel ratio AFdwn is a value between the rich judged air-fuel ratio AFrich and the lean judged air-fuel ratio AFlean, the routine proceeds to step S48. At step S48, the cumulative oxygen excess/deficiency ΣOED plus the current oxygen excess/deficiency OED is made the new cumulative oxygen excess/deficiency ΣOED. Next, at step S49, it is judged if the cumulative oxygen excess/deficiency ΣOED calculated at step S48 is a predetermined amount OEDsw or more. If, at step S49, it is judged that ΣOED is smaller than OEDsw, the control routine is made to end. On the other hand, if the cumulative oxygen excess/deficiency ΣOED increases and, at step S49, it is judged that ΣOED is OEDsw or more, the routine proceeds to step S50. At step S50, the above formula (4) is used to correct the learning value sfbg.

After that, if the target air-fuel ratio is switched and, at step S42, it is judged that the air-fuel ratio correction amount AFC is larger than 0, the routine proceeds to step S51. At step S51, the cumulative exhaust gas flow ΣGe and cumulative oxygen excess/deficiency ΣOED are reset to 0. Next, at step S52, the lean flag Fl is set to "1".

If the lean flag Fl is set to "1", at the next control routine, the routine proceeds from step S41 to step S53. At step S53, it is judged if the air-fuel ratio correction amount AFC is smaller than "0", that is, it is judged if the target air-fuel ratio is the rich air-fuel ratio. If, at step S53, it is judged that the air-fuel ratio correction amount AFC is 0 or more, the routine proceeds to step S54.

At step S54, it is judged if the output air-fuel ratio AFdwn of the downstream side air-fuel ratio sensor 41 is smaller than the rich judged air-fuel ratio AFrich. If, at step S54, it is judged that the output air-fuel ratio AFdwn is the rich judged air-fuel ratio AFrich or more, that is, if it is judged that the output air-fuel ratio is the lean air-fuel ratio, the control routine is made to end. On the other hand, if, at step S54, it is judged that the output air-fuel ratio AFdwn is smaller than the rich judged air-fuel ratio AFrich, that is, if it is judged that the output air-fuel ratio is the rich air-fuel ratio, the routine proceeds to step S55.

At step S55, the cumulative exhaust gas flow ΣGe plus the current exhaust gas flow Ge is made the new cumulative exhaust gas flow ΣGe. Next, at step S56, it is judged if the cumulative exhaust gas flow ΣGe calculated at step S55 is a predetermined amount ΣGesw or more. When, at step S56, it is judged that ΣGe is smaller than ΣGesw, the control routine is made to end. On the other hand, when the cumulative exhaust gas flow ΣGe increases and, at step S56, it is judged that ΣGe is ΣGesw or more, the routine proceeds to step S57. At step S57, the above-mentioned formula (5) is used to correct the learning value sfbg.

After that, the target air-fuel ratio is switched. When, at step S53, it is judged that the air-fuel ratio correction amount AFC is smaller than 0, the routine proceeds to step S58. At step S58, the cumulative exhaust gas flow ΣGe and cumulative oxygen excess/deficiency ΣOED are reset to 0. Next, at step S59, the lean flag Fl is set to "0" and the control routine is made to end.

<Flow Chart of Learning Acceleration Control>

Figure 19:
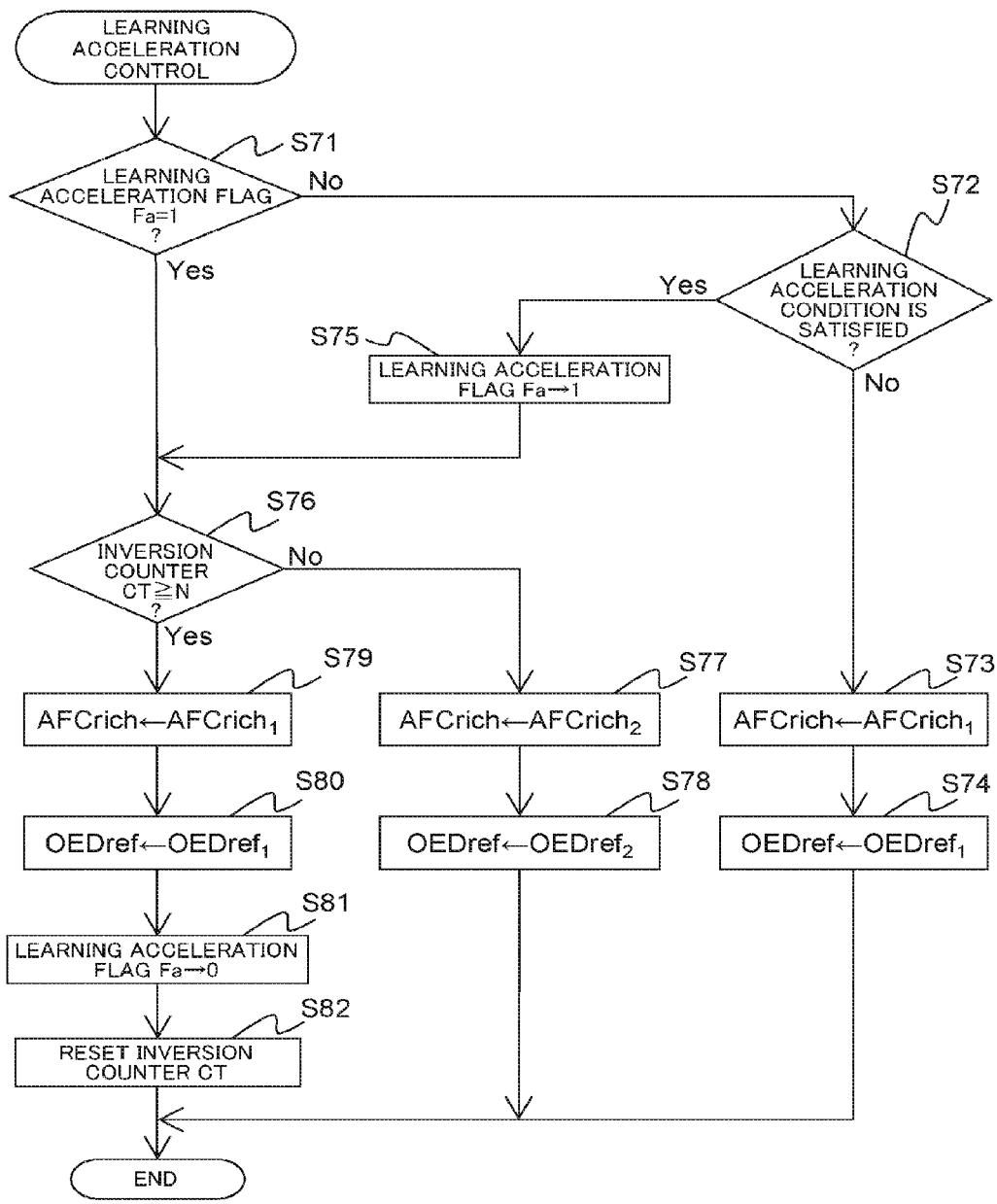
FIG. 19 is a flow chart showing a control routine of learning acceleration control.

FIG. 19 is a flow chart showing the control routine of the learning acceleration control. The control routine shown in FIG. 19 is performed by interruption at certain time intervals. As shown in FIG. 19, first, at step S71, it is judged if the learning acceleration flag Fa has been set to "1". The learning acceleration flag Fa is set to "1" when performing learning acceleration control, while in other cases, it is set to "0". At step S71, if it is judged that the learning acceleration flag Fa has been set to "0", the routine proceeds to step S72.

At step S72, it is judged if the learning acceleration condition is not satisfied. The learning acceleration condition is satisfied when it is necessary to accelerate the updating of the learning value by learning control. Specifically, when the above-mentioned excess/deficiency error ΔΣOED is the accelerated judgment reference value or more, when the output air-fuel ratio AFdwn of the downstream side air-fuel ratio sensor 41 is maintained in the middle region M over the stoichiometric air-fuel ratio accelerated judgment time or more, when the output air-fuel ratio AFdwn of the downstream side air-fuel ratio sensor 41 is maintained at the lean air-fuel ratio or rich air-fuel ratio over the lean air-fuel ratio maintenance judgment time or rich air-fuel ratio maintenance judgment time or more, etc., the condition for learning acceleration is satisfied. Alternatively, the learning acceleration condition may be considered to be satisfied when the value of the amount of updating of the learning value added at sfbg(n−1) at the above formulas (2), (4), and (5) is a predetermined reference value or more.

If, at step S72, it is judged that the learning acceleration condition is not satisfied, the routine proceeds to step S73. At step S73, the rich set correction amount AFCrich is set to AFCrich$_1$. Next, at step S74, the switching reference value OEDref is set to OEDref$_1$ and the control routine is made to end.

On the other hand, when, at step S72, it is judged that the learning acceleration conditions are satisfied, the routine proceeds to step S75. At step S75, the learning acceleration flag Fa is set to "1". Next, at step S76, it is judged if the inversion counter CT is N or more. The inversion counter CT is a counter which is incremented by "1" each time the target air-fuel ratio is inverted between the rich air-fuel ratio and lean air-fuel ratio.

At step S76, when it is judged that the inversion counter CT is less than N, that is, when the number of times of inversion of the target air-fuel ratio is less than N times, the routine proceeds to step S77. At step S77, the rich set correction amount AFCrich is set to AFCrich$_2$ larger than AFCrich$_1$. Next, at step S78, the switching reference value OEDref is set to OEDref$_2$ smaller than OEDref$_1$, then the control routine is made to end.

After that, if the target air-fuel ratio is inverted a number of times, at the next control routine, at step S76, it is judged that the inversion counter CT is N or more and the routine proceeds to step S79. At step S79, the rich set correction amount AFCrich is set to AFCrich$_1$. Next, at step S80, the switching reference value OEDref is set to OEDref$_1$. Next, at step S81, the learning acceleration flag Fa is reset to "0" while at step S82, the reversal counter CT is reset to "0" and the control routine is ended.

Next, referring to FIG. 20 to FIG. 23, a control system of an internal combustion engine according to a second embodiment of the present invention will be explained. The configuration and control of the control system according to the second embodiment are similar to the configuration and control of the control system according to the first embodiment other than the points explained below.

In this regard, in the above first embodiment, the output air-fuel ratio of the upstream side air-fuel ratio sensor 40 ending up deviating as a whole to the rich side or lean side was considered a problem. On the other hand, in regard to the downstream side air-fuel ratio sensor 41, the exhaust gas flowing out from the upstream side exhaust purification catalyst 20 flows around the downstream side air-fuel sensor, so this is resistant to deviation of the air-fuel ratio of exhaust gas between cylinders and the effects of the hydrogen in the exhaust gas. Therefore, in the downstream side air-fuel ratio sensor 41, compared with the upstream side air-fuel ratio sensor 40, it is rarer for the output air-fuel ratio as a whole to end up deviating to the rich side or lean side.

Figure 20:
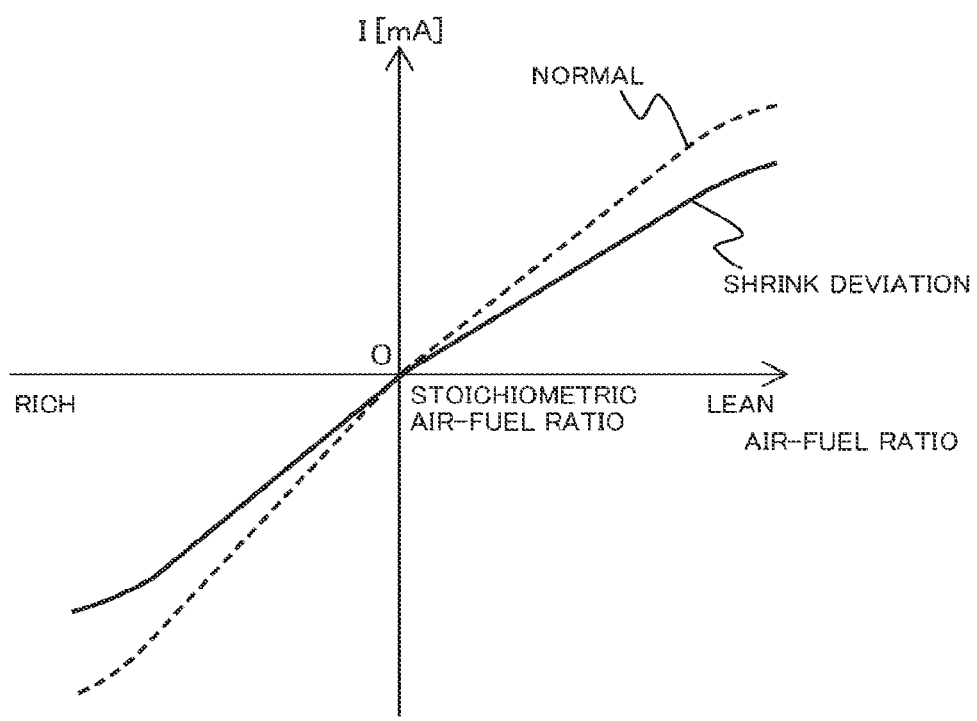
FIG. 20 is a view showing the relationship between an exhaust air-fuel ratio and output current when making the sensor applied voltage constant.

On the other hand, at the downstream side air-fuel ratio sensor 41 as well, if the period of use becomes long and the diffusion regulating layer of the downstream side air-fuel ratio sensor 41 becomes clogged etc., the output current of the downstream side air-fuel ratio sensor 41 will become smaller overall, that is, "shrink" deviation will occur. FIG. 20 shows the output current of the air-fuel ratio sensor in the case of such shrink deviation occurring. The solid line in the figure shows the output current of the air-fuel ratio sensor at which shrink deviation occurs, while the broken line in the figure shows the output current of a normal air-fuel ratio sensor. As will be understood from FIG. 20, in an air-fuel ratio sensor where shrink deviation occurs, the output current as a whole becomes smaller. As a result, the output air-fuel ratio of the air-fuel ratio sensor becomes an air-fuel ratio closer to the stoichiometric air-fuel ratio than the actual air-fuel ratio.

In this regard, if shrink deviation occurs in the downstream side air-fuel ratio sensor 41 in this way, when performing the above-mentioned stoichiometric air-fuel ratio stuck learning control, despite no deviation having occurred in the output air-fuel ratio of the upstream side air-fuel ratio sensor 40, sometimes the learning value will end up being mistakenly changed. Below, referring to FIG. 21, mistaken change of a learning value will be explained.

Figure 21:
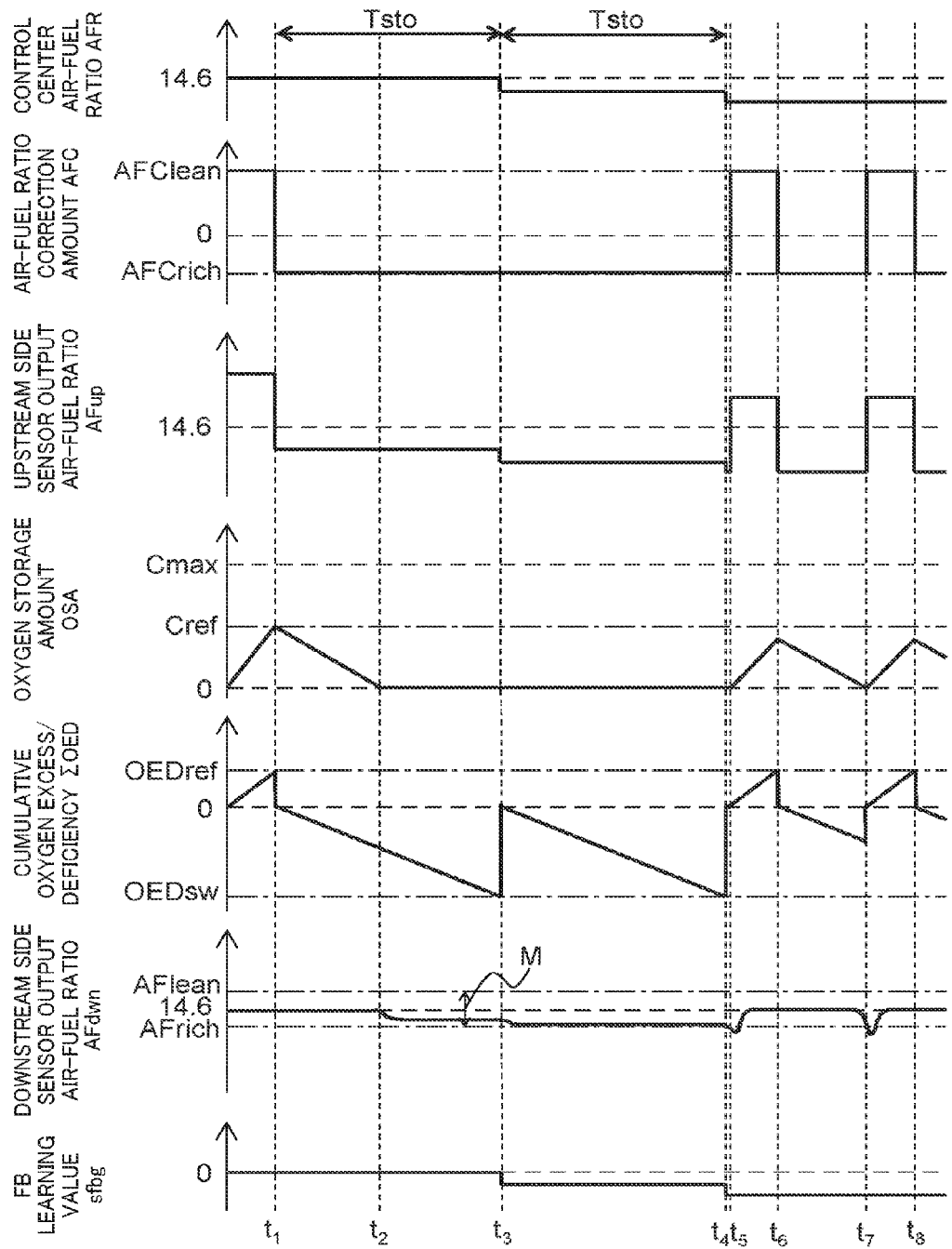
FIG. 21 is a time chart of an air-fuel ratio correction amount etc. when shrink deviation occurs in the output air-fuel ratio of the downstream side air-fuel ratio sensor.

FIG. 21 is a view showing a time chart of an air-fuel ratio correction amount AFC etc. similar to FIG. 12. FIG. 21 shows the case where shrink deviation occurs in the output air-fuel ratio AFdwn of the downstream side air-fuel ratio sensor 41 without deviation occurring in the output air-fuel ratio AFup of the upstream side air-fuel ratio sensor 40.

In the illustrated example, in the same way as FIG. 12, before the time $t_1$, the air-fuel ratio correction amount AFC is made the lean set correction amount AFClean. After that, at the time $t_1$, the cumulative oxygen excess/deficiency ΣOED reaches the switching reference value OEDref and the air-fuel ratio correction amount AFC is switched to the rich set correction amount AFCrich. Due to this, the air-fuel ratio of the exhaust gas flowing into the upstream side exhaust purification catalyst 20 becomes a rich air-fuel ratio, so the oxygen storage amount OSA of the upstream side exhaust purification catalyst 20 gradually decreases and at the time $t_2$ becomes substantially zero. As a result, exhaust gas of a rich set air-fuel ratio corresponding to the rich set correction amount AFCrich flows out from the upstream side exhaust purification catalyst 20.

As explained above, the rich judged air-fuel ratio is made an air-fuel ratio leaner than the rich set air-fuel ratio. For this reason, if no deviation occurs in the output air-fuel ratio AFdwn of the downstream side air-fuel ratio sensor 41, if exhaust gas of the rich set air-fuel ratio flows out from the upstream side exhaust purification catalyst 20, that output air-fuel ratio AFdwn becomes the rich judged air-fuel ratio AFrich or less. In this regard, if minor deviation occurs in the output air-fuel ratio AFdwn of the downstream side air-fuel ratio sensor 41, despite the actual air-fuel ratio being the rich judged air-fuel ratio or less, the output air-fuel ratio AFdwn becomes an air-fuel ratio larger than the rich judged air-fuel ratio. As a result, in the example shown in FIG. 21, at the time $t_2$, the oxygen storage amount OSA of the upstream side exhaust purification catalyst 20 becomes substantially zero and exhaust gas of a rich set air-fuel ratio flows out from the upstream side exhaust purification catalyst 20. Despite this, the output air-fuel ratio AFdwn of the downstream side air-fuel ratio sensor 41 ends up remaining higher than the rich judged air-fuel ratio AFrich. For this reason, the output air-fuel ratio AFdwn of the downstream side air-fuel ratio sensor 41 is maintained in the middle region M from the time $t_2$ on as well.

As a result, in the example shown in FIG. 21, at the time $t_1$, the output air-fuel ratio AFdwn of the downstream side air-fuel ratio sensor 41 is maintained in the middle region M after the air-fuel ratio correction amount AFC is switched to the rich set correction amount AFCrich over the stoichiometric air-fuel ratio maintenance judgment time Tsto or more. For this reason, as explained above, due to the stoichiometric air-fuel ratio stuck learning control, at the time $t_3$, the learning value sfbg is changed so that the air-fuel ratio of the exhaust gas flowing into the upstream side exhaust purification catalyst 20 changes to the rich side.

In the example shown in FIG. 21, at the time $t_3$, the learning value sfbg is decreased. Due to this, even if the control center air-fuel ratio AFR deviates to the rich side, the output air-fuel ratio AFdwn of the downstream side air-fuel ratio sensor 41 is maintained in the middle region M. As a result, at the time $t_4$ after the stoichiometric air-fuel ratio maintenance judgment time Tsto elapses from the time $t_3$, the learning value sfbg is again decreased and accordingly the control center air-fuel ratio AFR again deviates to the rich side. In the example shown in FIG. 21, at the time $t_4$, if the control center air-fuel ratio AFR deviates to the rich side, the air-fuel ratio of the exhaust gas flowing out from the upstream side exhaust purification catalyst 20 also changes to the rich side. Accordingly, at the time $t_5$, the output air-fuel ratio AFdwn of the downstream side air-fuel ratio sensor 41 becomes the rich judged air-fuel ratio AFrich or less. For this reason, at the time $t_5$, the air-fuel ratio correction amount AFC is switched to the lean set correction amount AFClean. After that, the air-fuel ratio correction amount AFC is alternately switched between the rich set correction amount AFC and the lean set correction amount AFClean.

As will be understood from FIG. 21, if shrink deviation occurs in the output air-fuel ratio AFdwn of the downstream side air-fuel ratio sensor 41, when performing stoichiometric air-fuel ratio stuck learning control, regardless of no deviation occurring in the output air-fuel ratio AFdwn of the upstream side air-fuel ratio sensor 40, the learning value sfbg will end up being mistakenly decreased.

Therefore, in the present second embodiment, even if the output air-fuel ratio AFdwn of the downstream side air-fuel ratio sensor 41 is maintained in the middle region M over the stoichiometric air-fuel ratio maintenance judgment time Tsto or more, the learning value sfbg is not decreased. In addition, in the present embodiment, if the output air-fuel ratio AFdwn of the downstream side air-fuel ratio sensor 41 is maintained in the middle region in this way, the rich degree of the rich set air-fuel ratio is increased in the same way as the above-mentioned learning acceleration control. Below, referring to FIG. 22, the case of performing such control will be explained.

Figure 22:
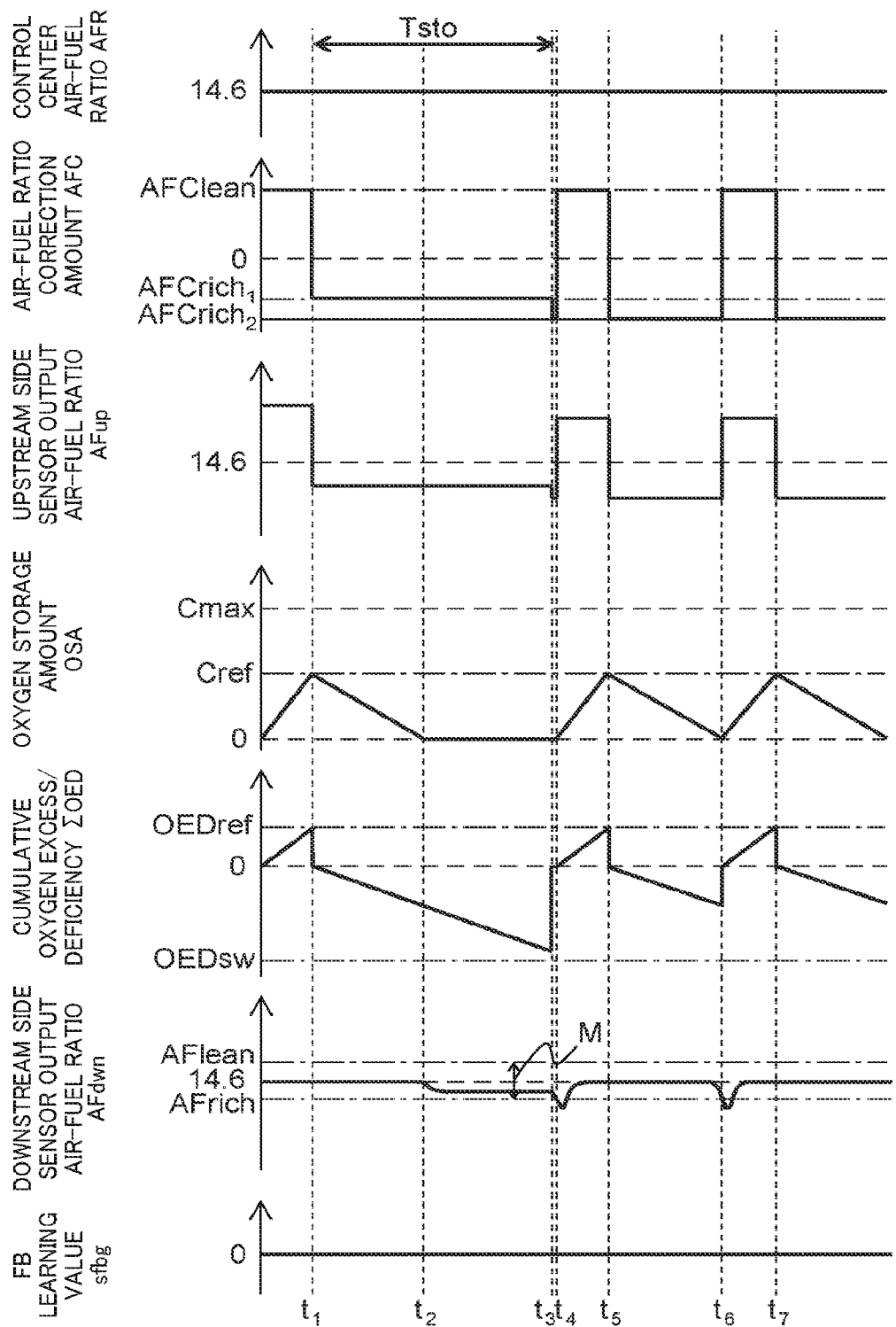
FIG. 22 is a time chart of an air-fuel ratio correction amount etc. when shrink deviation occurs in the output air-fuel ratio of the downstream side air-fuel ratio sensor.

FIG. 22 shows a time chart of the air-fuel ratio correction amount AFC etc. similar to FIG. 21. FIG. 22, in the same way as FIG. 21, shows the case where no deviation occurs in the output air-fuel ratio AFup of the upstream side air-fuel ratio sensor 40, but shrink deviation occurs in the output air-fuel ratio AFdwn of the downstream side air-fuel ratio sensor 41.

In the illustrated example, similar control as the example shown in FIG. 21 is performed before the time $t_2$. Therefore, at the time $t_1$, the air-fuel ratio correction amount AFC is switched from the lean set correction amount AFClean to the rich set correction amount AFCrich. Due to this, the oxygen storage amount OSA of the upstream side exhaust purification catalyst 20 becomes substantially 0 at the time $t_2$. After this, exhaust gas of the rich set air-fuel ratio corresponding to the rich set correction amount AFCrich flows out from the upstream side exhaust purification catalyst 20. However, shrink deviation occurs in the output air-fuel ratio AFdwn of the downstream side air-fuel ratio sensor 41, so the output air-fuel ratio AFdwn is maintained in the middle region M even from the time $t_2$ on. As a result, in the example shown in FIG. 22 as well, from the time $t_1$ to the time $t_3$, the output air-fuel ratio AFdwn of the downstream side air-fuel ratio sensor 41 is maintained in the middle region M over the stoichiometric air-fuel ratio maintenance judgment time Tsto or more.

However, in the present embodiment, even at the time $t_3$, the learning value sfbg is not changed by the stoichiometric air-fuel ratio stuck learning control. On the other hand, in the present embodiment, at the time $t_1$, the air-fuel ratio correction amount AFC is switched to the rich set correction amount AFCrich, then the output air-fuel ratio AFdwn of the downstream side air-fuel ratio sensor 41 is maintained in the middle region M over the stoichiometric air-fuel ratio maintenance judgment time Tsto or more, so the rich set correction amount AFCrich is increased from $AFCrich_1$ to $AFCrich_2$ by the learning acceleration control at the time $t_3$. Accordingly, the rich degree of the rich set air-fuel ratio is increased.

If, at the time $t_3$, the rich set correction amount AFC is increased, the air-fuel ratio of the exhaust gas flowing into and flowing out from the upstream side exhaust purification catalyst 20 changes to the rich side and accordingly the output air-fuel ratio AFdwn of the downstream side air-fuel ratio sensor 41 also changes to the rich side. As a result, in the example shown in FIG. 22, at the time $t_4$, the output air-fuel ratio AFdwn of the downstream side air-fuel ratio sensor 41 becomes the rich judged air-fuel ratio AFrich or less. For this reason, at the time $t_4$, the air-fuel ratio correction amount AFC is switched to the lean set correction amount AFClean. After that, the air-fuel ratio correction amount AFC is alternately switched between the rich set correction amount AFC and the lean set correction amount AFClean.

As will be understood from FIG. 22, in the present embodiment, by not performing the stoichiometric air-fuel ratio stuck control, the learning value sfbg is prevented from being decreased mistakenly when shrink deviation occurs in the output air-fuel ratio AFdwn of the downstream side air-fuel ratio sensor 41. In addition, learning acceleration control enables the rich degree of the rich set air-fuel ratio to be increased, so without performing stoichiometric air-fuel ratio stuck control, the output air-fuel ratio AFdwn of the downstream side air-fuel ratio sensor 41 is prevented from ending up being maintained in the middle region M.

<Flow Chart>

Figure 23:
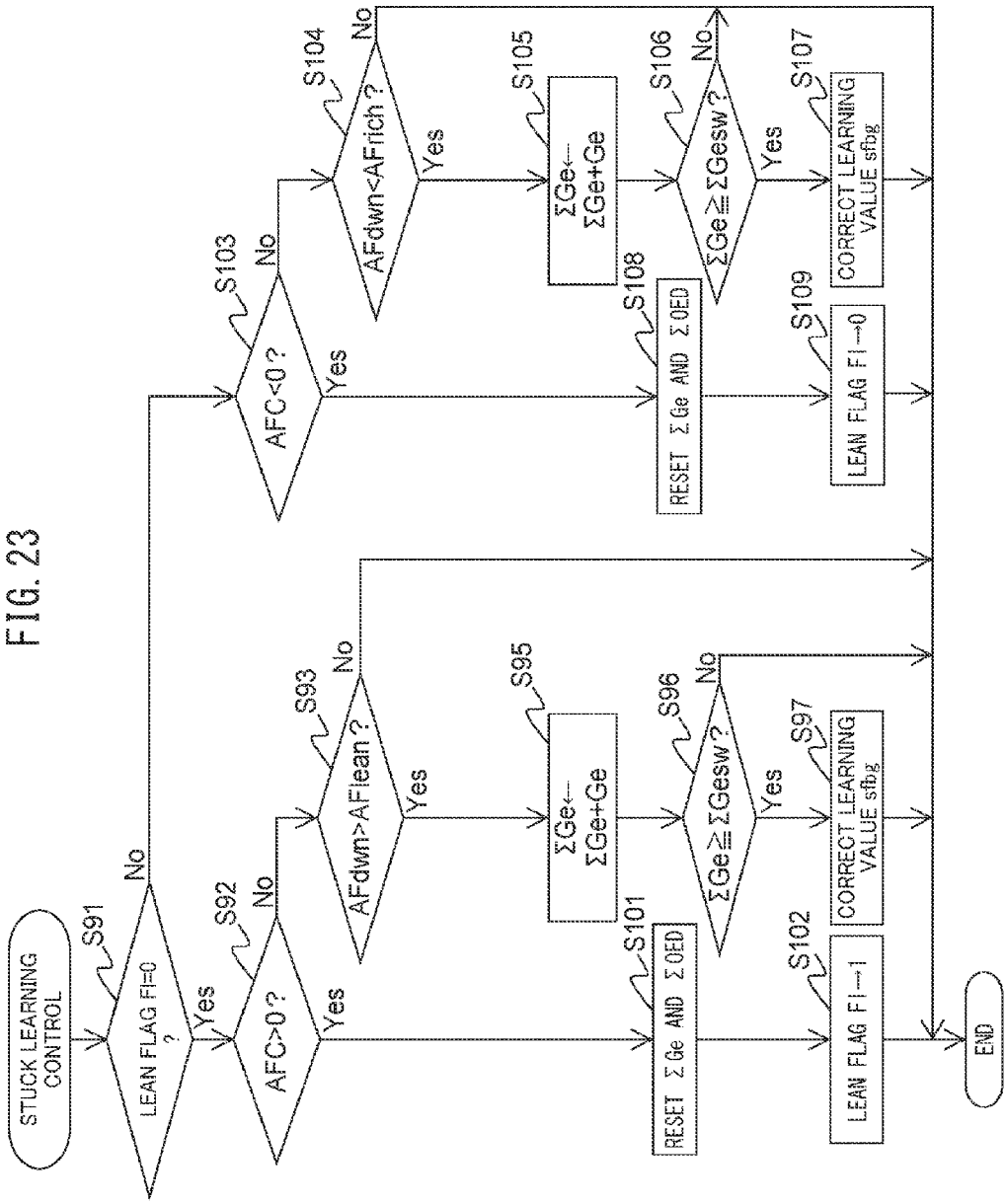
FIG. 23 is a flow chart showing a control routine of stuck learning control according to a second embodiment.

FIG. 23 is a flow chart showing a control routine of stuck learning control in the present embodiment. The illustrated control routine is performed by interruption at certain time intervals. As will be understood from FIG. 23, in the stuck learning control in the present embodiment, steps S44 and S8 to step S50 of the stuck learning control shown in FIG. 18 are not performed. Note that, steps S91 to S93, S95 to S97, and S101 to S109 of FIG. 23 are the same as steps S41 to S43, S45 to S47, and S51 to S59 of FIG. 18, so explanations will be omitted. Note that, in the present embodiment, learning acceleration control the same as the learning acceleration control shown in FIG. 19 is performed.

REFERENCE SIGNS LIST 1. engine body
5. combustion chamber
7. intake port
9. exhaust port
19. exhaust manifold
20. upstream side exhaust purification catalyst
24. downstream side exhaust purification catalyst
31. ECU
40. upstream side air-fuel ratio sensor
41. downstream side air-fuel ratio sensor

The invention claimed is:

1. An internal combustion engine comprising an exhaust purification catalyst arranged in an exhaust passage of the internal combustion engine and able to store oxygen, a downstream side air-fuel ratio sensor arranged at a downstream side, in a direction of exhaust flow, of the exhaust purification catalyst and detecting an air-fuel ratio of exhaust gas flowing out from the exhaust purification catalyst, and an ECU, wherein
the ECU is configured to perform air-fuel ratio control for feedback-controlling an amount of fuel fed to a combustion chamber of the internal combustion engine so that an air-fuel ratio of exhaust gas flowing into the exhaust purification catalyst becomes a target air-fuel ratio and performs learning control to correct a parameter relating to air-fuel ratio based on an air-fuel ratio of exhaust gas detected by the downstream side air-fuel ratio sensor;
the target air-fuel ratio is switched between a plurality of different air-fuel ratios other than the stoichiometric air-fuel ratio, and
the learning control includes stoichiometric air-fuel ratio stuck learning wherein when the target air-fuel ratio is set to an air-fuel ratio deviated to one side of the stoichiometric air-fuel ratio, if the air-fuel ratio detected by the downstream side air-fuel sensor is maintained in a region of air-fuel ratio near the stoichiometric air-fuel ratio, between a rich judgement air-fuel ratio richer than the stoichiometric air-fuel ratio and a lean judgement air-fuel ratio leaner than the stoichiometric air-fuel ratio, for a stoichiometric air-fuel ratio maintenance judgement time or more, the parameter relating to an air-fuel ratio is corrected so that the air-fuel ratio of the exhaust gas flowing into the exhaust purification catalyst changes to said one side in the air-fuel ratio control.

2. The internal combustion engine according to claim 1, wherein
the ECU is configured to calculate oxygen excess/deficiency in the exhaust gas flowing into the exhaust purification catalyst; and
the stoichiometric air-fuel ratio maintenance judgement time is changed in accordance with the oxygen excess/deficiency which is cumulatively added from when the target air-fuel ratio is switched to the air-fuel ratio deviated to said one side of the stoichiometric air-fuel ratio.

3. The internal combustion engine according to claim 2, wherein
the stoichiometric air-fuel ratio maintenance judgement time is set equal to or greater than the time taken from when the target air-fuel ratio is switched to the air-fuel ratio deviated to said one side of the stoichiometric air-fuel ratio to when an absolute value of a cumulative oxygen excess/deficiency reaches the maximum storable oxygen amount of the exhaust purification catalyst at the time when it is unused.

4. The control system of an internal combustion engine according to claim 1, wherein
the learning control includes lean stuck learning wherein when the target air-fuel ratio is set to the rich air-fuel ratio richer than the stoichiometric air-fuel ratio, if the air-fuel ratio detected by the downstream side air-fuel ratio sensor is maintained at an air-fuel ration leaner than the lean judgement air-fuel ratio for a lean air-fuel ratio maintenance judgement time or more, the parameter relating to an air-fuel ratio is corrected so that the air-fuel ratio of the exhaust gas flowing into the exhaust purification catalyst changes to the rich side.

5. The internal combustion engine according to claim 4, wherein
the lean air-fuel ratio maintenance judgement time is shorter than the stoichiometric air-fuel ratio maintenance judgement time.

6. The internal combustion engine according to claim 4, wherein
the correction amount in the lean stuck learning is larger than the correction amount in the stoichiometric air-fuel ratio stuck learning.

7. The internal combustion engine according to claim 4, wherein
the lean air-fuel ratio maintenance judgement time is changed in accordance with an exhaust gas flow amount which is cumulatively added from when the target air-fuel ratio is switched to the rich air-fuel ratio.

8. The internal combustion engine according to claim 4, wherein
the lean air-fuel ratio maintenance judgement time is set equal to or greater than the delayed response time of the downstream side air-fuel ratio sensor which is taken from when the target air-fuel ratio is switched to when the air-fuel ratio detected by the downstream side air-fuel ratio sensor changes accordingly.

9. The internal combustion engine according to claim 1, wherein
the learning control includes rich stuck learning wherein when the target air-fuel ratio is set to the lean air-fuel ratio leaner than the stoichiometric air-fuel ratio, if the air-fuel ratio detected by the downstream side air-fuel ratio sensor is maintained at an air-fuel ration richer than the rich judgement air-fuel ratio for a rich air-fuel ratio maintenance judgement time or more, the parameter relating to an air-fuel ratio is corrected so that the air-fuel ratio of the exhaust gas flowing into the exhaust purification catalyst changes to the lean side.

10. The internal combustion engine according to claim 4, wherein
the learning control includes rich stuck learning wherein when the target air-fuel ratio is set to the lean air-fuel ratio leaner than the stoichiometric air-fuel ratio, if the air-fuel ratio detected by the downstream side air-fuel ratio sensor is maintained at an air-fuel ration richer than the rich judgement air-fuel ratio for a rich air-fuel ratio maintenance judgement time or more, the parameter relating to the air-fuel ratio is corrected so that the air-fuel ratio of the exhaust gas flowing into the exhaust purification catalyst changes to the lean side.

11. The internal combustion engine according to claim 9, wherein the rich air-fuel ratio maintenance judgement time is shorter than the stoichiometric air-fuel ratio maintenance judgement time.

12. The internal combustion engine according to claim 1, wherein the target air-fuel ratio is switched to lean air-fuel ratio when the air-fuel ratio detected by the downstream side air-fuel ratio sensor reaches the rich judgement air-fuel ratio, and is switched to rich air-fuel ratio when an oxygen storage amount of the exhaust purification catalyst becomes a given switching reference storage amount or more.

13. The internal combustion engine according to claim 12, wherein
the learning control includes normal learning which is performed when the air-fuel ratio detected by the downstream side air-fuel ratio reaches the rich judgement air-fuel ratio within the stoichiometric air-fuel ratio maintenance judgement time from when the target air-fuel ratio is switched to the rich air-fuel ratio;

in the normal learning, the parameter relating to the air-fuel ratio is corrected based on first oxygen cumulative value and second oxygen cumulative value so that a difference between the first oxygen cumulative value and the second oxygen cumulative value becomes smaller;

the first oxygen cumulative value corresponds to an absolute value of the cumulative oxygen excess/deficiency in a first time period from when the target air-fuel ratio is switched to the lean air-fuel ratio to when the oxygen storage amount becomes the switching reference storage amount; and the second oxygen cumulative value corresponds to an absolute value of the cumulative oxygen excess/deficiency in a second time period from when the target air-fuel ratio is switched to the rich air-fuel ratio to when the air-fuel ratio detected by the downstream air-fuel sensor becomes the rich judgement air-fuel ratio or less.

14. The internal combustion engine according to claim 1, wherein the parameter relating to the air-fuel ratio is one of the target air-fuel ratio, a fuel feed amount, an air-fuel ratio serving as a control center.

15. The internal combustion engine according to claim 4, wherein the parameter relating to the air-fuel ratio is one of the target air-fuel ratio, a fuel feed amount, an air-fuel ratio serving as a control center.

16. The internal combustion engine according to claim 9, wherein the parameter relating to the air-fuel ratio is one of the target air-fuel ratio, a fuel feed amount, an air-fuel ratio serving as a control center.

17. The internal combustion engine according to claim 1, wherein the internal combustion engine further comprises an upstream side air-fuel ratio sensor arranged at an upstream side, in a direction of exhaust flow, of the exhaust purification catalyst and detecting an air-fuel ratio of exhaust gas flowing into the exhaust purification catalyst, in the air-fuel ratio control, the amount of fuel fed to a combustion chamber of the internal combustion engine is feedback-controlled so that an air-fuel ratio detected by the upstream side air-fuel sensor becomes the target air-fuel ratio; and the parameter relating to the air-fuel ratio is the output of the upstream side air-fuel ratio sensor.

18. The internal combustion engine according to claim 4, wherein the internal combustion engine further comprises an upstream side air-fuel ratio sensor arranged at an upstream side, in a direction of exhaust flow, of the exhaust purification catalyst and detecting an air-fuel ratio of exhaust gas flowing into the exhaust purification catalyst, in the air-fuel ratio control, the amount of fuel fed to a combustion chamber of the internal combustion engine is feedback-controlled so that an air-fuel ratio detected by the upstream side air-fuel ratio sensor becomes the target air-fuel ratio; and the parameter relating to the air-fuel ratio is the output of the upstream side air-fuel ratio sensor.

19. The internal combustion engine according to claim 9, wherein

The internal combustion engine further comprises an upstream side air-fuel ratio sensor arranged at an upstream side, in a direction of exhaust flow, of the exhaust purification catalyst and detecting an air-fuel ratio of exhaust gas flowing into the exhaust purification catalyst, in the air-fuel ratio control, the amount of fuel fed to a combustion chamber of the internal combustion engine is feedback-controlled so that an air-fuel ratio detected by the upstream side air-fuel ratio sensor becomes the target air-fuel ratio; and the parameter relating to the air-fuel ratio is the output of the upstream side air-fuel ratio sensor.

* * * * *